US012461005B2

(12) United States Patent
Serdyuk et al.

(10) Patent No.: US 12,461,005 B2
(45) Date of Patent: Nov. 4, 2025

(54) APPARATUS AND METHOD TO MEASURE FLARE BURNER FALLOUT

(71) Applicant: Schlumberger Technology Corporation, Sugar Land, TX (US)

(72) Inventors: Konstantin Mikhailovich Serdyuk, Berdsk (RU); Roman Alexandrovich Skachkov, Quincy, MA (US); Dilara Ildusovna Serdyuk, Novosibirsk (RU); Grigory Yurievich Mikhalev, Novosibirsk (RU); Barbara Zielinska, Palaiseau (FR); Vitaly Valeryevich Singin, Florence, KY (US); Aleksander Yuryevich Moiseev, Novosibirsk (RU); Evgeny Aleksandrovich Domakhin, Novosibirsk (RU)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 226 days.

(21) Appl. No.: 18/259,144

(22) PCT Filed: Dec. 14, 2021

(86) PCT No.: PCT/US2021/063263
§ 371 (c)(1),
(2) Date: Jun. 23, 2023

(87) PCT Pub. No.: WO2022/140109
PCT Pub. Date: Jun. 30, 2022

(65) Prior Publication Data
US 2024/0060868 A1    Feb. 22, 2024

(30) Foreign Application Priority Data
Dec. 25, 2020 (RU) .......................... RU2020143141

(51) Int. Cl.
G01N 15/0227    (2024.01)
F23G 7/08       (2006.01)
(Continued)

(52) U.S. Cl.
CPC .......... *G01N 15/0227* (2013.01); *F23G 7/08* (2013.01); *G01N 2015/0026* (2013.01)

(58) Field of Classification Search
CPC ....... G01N 15/0227; G01N 2015/0026; G01N 15/1429; G01N 15/1433;
(Continued)

(56) References Cited

U.S. PATENT DOCUMENTS 6,122,053 A * 9/2000 Zwaal ................ G01N 21/8806
                                                356/337
10,739,241 B2  8/2020 Skachkov et al.
(Continued)

FOREIGN PATENT DOCUMENTS

WO    2016097785 A1    6/2016
WO    2022076514 A1    4/2022

OTHER PUBLICATIONS

Robert L. Beach; Kenneth R. Goldman, "Development of a Flaring Burner Oil Disposal System," International Oil Spill Conference Proceedings (1981) 1981 (1): 623-627. https://doi.org/10.7901/2169-3358-1981-1-623 (Year: 1981).*
(Continued)

*Primary Examiner* — Rebecca C Bryant
(74) *Attorney, Agent, or Firm* — Jeffrey D. Frantz

(57) ABSTRACT

Methods, apparatus, systems, and articles of manufacture are disclosed to measure fallout from a liquid flare burner. An example apparatus includes a device configurator to invoke a first control valve to isolate the liquid flare burner from a test fluid source, and invoke a second control valve to fluidly couple the liquid flare burner to a hydrocarbon
(Continued)

source to generate unburned fallout droplets to be captured by first and second measurement surfaces in first and second measurement regions, a parameter calculator to calculate first and second fallout volumes associated with the unburned fallout droplets captured by the first and second measurement surfaces, and determine a fallout efficiency of the liquid flare burner based on the first and second fallout volumes, and a burner configurator to, in response to the fallout efficiency not satisfying a fallout efficiency threshold, adjust a configuration of the liquid flare burner based on the fallout efficiency.

21 Claims, 18 Drawing Sheets

(51) Int. Cl.
*F23N 5/18* (2006.01)
*G01N 15/00* (2006.01)

(58) Field of Classification Search
CPC ... G01N 2015/1493; G01N 2021/8416; G01N 2021/945; F23G 7/08; G06T 7/40; G06T 7/62; F23J 2215/00; F23J 2900/15004
See application file for complete search history.

(56) References Cited

U.S. PATENT DOCUMENTS

| | | | |
|---|---|---|---|
| 2008/0297798 A1* | 12/2008 | Wyssen | ........ G01N 21/94 |
| | | | 356/244 |
| 2009/0133578 A1 | 5/2009 | Bras | |
| 2021/0003280 A1 | 1/2021 | Umair et al. | |
| 2024/0044765 A1 | 2/2024 | Serdyuk | |

OTHER PUBLICATIONS

"Parameters for Properly Designed and Operated Flares," U.S. EPA Office of Air Quality Planning and Standards, Apr. 2012 (Year: 2012).*
Search Report and Written Opinion of International Patent Application No. PCT/US2021/063466 dated May 9, 2022, 13 pages.
International Preliminary Report on Patentability of International Patent Application No. PCT/US2021/063466 dated Jul. 6, 2023, 8 pages.
Search Report and Written Opinion of International Patent Application No. PCT/US2021/063263 dated May 11, 2022, 13 pages.
International Preliminary Report on Patentability of International Patent Application No. PCT/US2021/063263 dated Jul. 6, 2023, 8 pages.
Office Action issued in Eurasian Patent Application No. 202391866 dated Aug. 9, 2023, 6 pages with English translation.

* cited by examiner

APPARATUS AND METHOD TO MEASURE FLARE BURNER FALLOUT

CROSS-REFERENCE TO RELATED APPLICATIONS

The present application is a national stage entry under 35 U.S.C. § 371 of International Application No. PCT/US2021/063263, filed on Dec. 14, 2021, which claims priority benefit of Russian Patent Application No. 2020143141, filed Dec. 25, 2020, the entirety of which is incorporated by reference herein and should be considered part of this specification.

BACKGROUND

This disclosure relates generally to pollution monitoring and, more particularly, to systems, methods, and apparatus to measure flare burner fallout.

DESCRIPTION OF THE RELATED ART

In the oil and gas industry, gas flaring or gas-liquid flaring using flare burners remains an economical approach for handling waste fluids produced in exploration wells or during well testing operations. Unburned liquid fallout and gaseous emissions are two kinds of environmental pollution linked to flaring operations. Measurement of such pollution can be used to evaluate an efficiency or a performance of the flare burners.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

An example apparatus disclosed herein for monitoring unburned fallout droplets from a liquid flare burner includes a device configurator to invoke a first control valve to isolate the liquid flare burner from a test fluid source, and invoke a second control valve to fluidly couple the liquid flare burner to a hydrocarbon source to generate the unburned fallout droplets, the unburned fallout droplets to be captured by first measurement surfaces in a first measurement region and second measurement surfaces in a second measurement region, a parameter calculator to calculate a first fallout volume associated with the unburned fallout droplets captured by the first measurement surfaces, calculate a second fallout volume associated with unburned fallout droplets captured by the second measurement surfaces, and determine a fallout efficiency of the liquid flare burner based on the first fallout volume and the second fallout volume, and a burner configurator to, in response to the fallout efficiency not satisfying a fallout efficiency threshold, adjust a configuration of the liquid flare burner based on the fallout efficiency.

An example method disclosed herein for monitoring unburned fallout droplets from a liquid flare burner includes invoking a first control valve to isolate the liquid flare burner from a test fluid source, invoking a second control valve to fluidly couple the liquid flare burner to a hydrocarbon source to generate the unburned fallout droplets, the unburned fallout droplets to be captured by first measurement surfaces in a first measurement region and second measurement surfaces in a second measurement region, calculating a first fallout volume associated with the unburned fallout droplets captured by the first measurement surfaces, calculating a second fallout volume associated with unburned fallout droplets captured by the second measurement surfaces, determining a fallout efficiency of the liquid flare burner based on the first fallout volume and the second fallout volume, and, in response to the fallout efficiency not satisfying a fallout efficiency threshold, adjusting a configuration of the liquid flare burner based on the fallout efficiency.

An example non-transitory computer readable storage medium disclosed herein includes instructions that, when executed, cause at least one processor to at least invoke a first control valve to isolate a liquid flare burner from a test fluid source, invoke a second control valve to fluidly couple the liquid flare burner to a hydrocarbon source to generate unburned fallout droplets, the unburned fallout droplets to be captured by first measurement surfaces in a first measurement region and second measurement surfaces in a second measurement region, calculate a first fallout volume associated with the unburned fallout droplets captured by the first measurement surfaces, calculate a second fallout volume associated with unburned fallout droplets captured by the second measurement surfaces, determine a fallout efficiency of the liquid flare burner based on the first fallout volume and the second fallout volume, and, in response to the fallout efficiency not satisfying a fallout efficiency threshold, adjust a configuration of the liquid flare burner based on the fallout efficiency.

Another example apparatus disclosed herein for monitoring unburned fallout droplets from a liquid flare burner includes a data collector to generate first coordinates to dispose first fallout collection devices in a first measurement region to measure first fallout from the liquid flare burner, generate second coordinates to dispose second fallout collection devices in a second measurement region to measure second fallout from the liquid flare burner, a device configurator to, in response the liquid flare burner reaching steady-state operation, direct the first fallout collection devices and the second fallout collection devices to move from a closed position to an open position, a parameter calculator to determine a fallout efficiency of the liquid flare burner based on a first volume of the first fallout and a second volume of the second fallout, and a burner configurator to, in response to the fallout efficiency not satisfying a fallout efficiency threshold, adjust a configuration of the liquid flare burner.

Another example method disclosed herein for monitoring unburned fallout droplets from a liquid flare burner includes generating first coordinates to dispose first fallout collection devices in a first measurement region to measure first fallout from the liquid flare burner, generating second coordinates to dispose second fallout collection devices in a second measurement region to measure second fallout from the liquid flare burner, in response the liquid flare burner reaching steady-state operation, directing the first fallout collection devices and the second fallout collection devices to move from a closed position to an open position, determining a fallout efficiency of the liquid flare burner based on a first volume of the first fallout and a second volume of the second fallout, and, in response to the fallout efficiency not satisfying a fallout efficiency threshold, adjusting a configuration of the flare burner.

Another example non-transitory computer readable storage medium disclosed herein includes instructions that, when executed, cause at least one processor to at least generate first coordinates to dispose first fallout collection devices in a first measurement region to measure first fallout from a liquid flare burner, generate second coordinates to dispose second fallout collection devices in a second measurement region to measure second fallout from the liquid flare burner, in response the liquid flare burner reaching steady-state operation, direct the first fallout collection devices and the second fallout collection devices to move from a closed position to an open position, determine a fallout efficiency of the liquid flare burner based on a first volume of the first fallout and a second volume of the second fallout, and in response to the fallout efficiency not satisfying a fallout efficiency threshold, adjust a configuration of the liquid flare burner.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
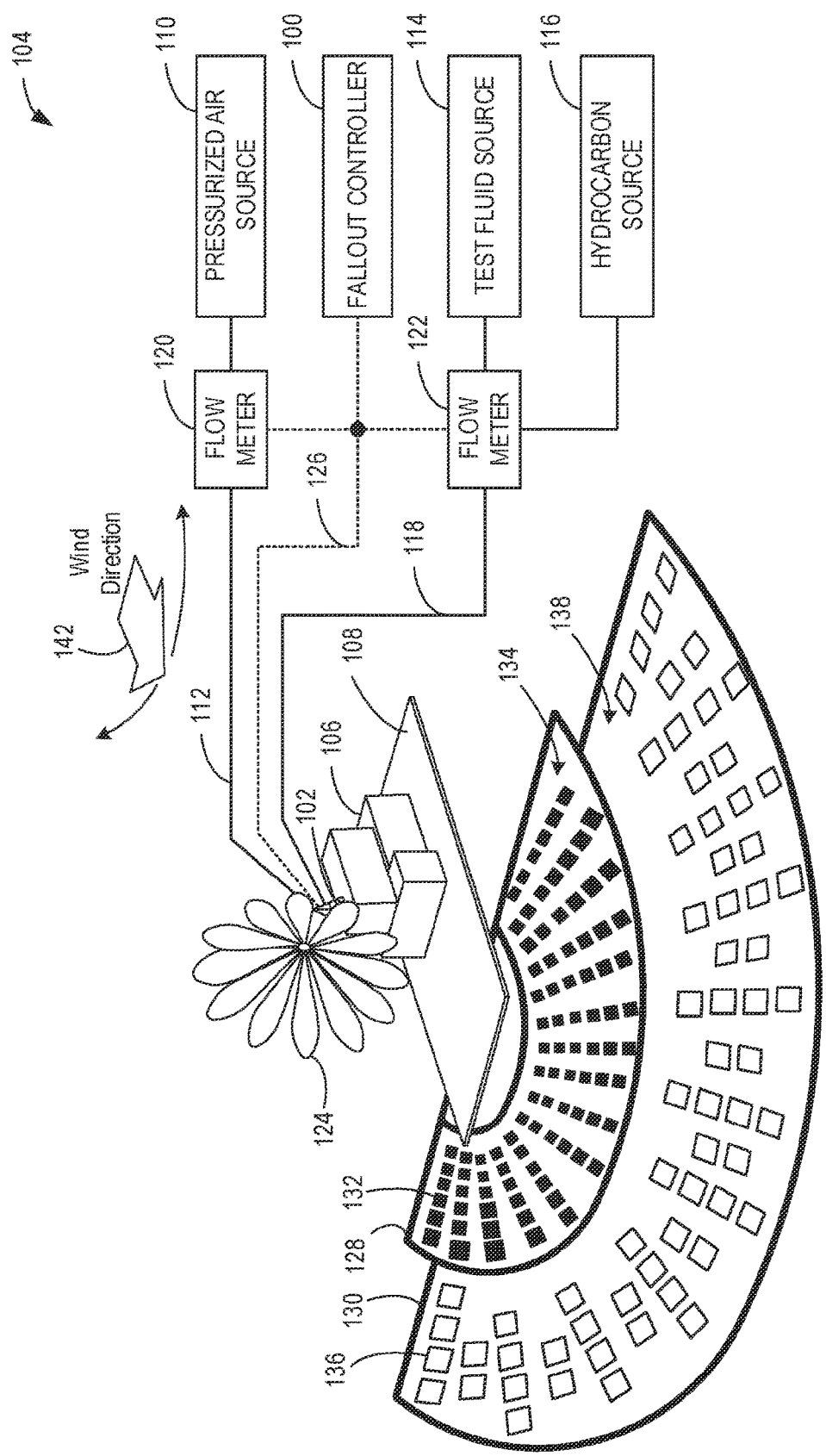
FIG. 1 is a schematic illustration of an example fallout controller monitoring an example flare burner in an example measurement environment.

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

In the oil and gas industry, there have been many advancements in gas flare equipment for gas combustion, and also in liquid and multiphase flare burners for combustion of fluid flows including gas condensate, crude oil with produced water, and crude oil without produced water. However, evaluating performance of such flare equipment or flare burners remains difficult. In prior implementations, well test operators used indirect visual evidence such as an absence of soot and absence of black smoke in the flame, which are indicators of proper fuel/oxygen ratio in the flaring mixture. Additionally or alternatively, well test operators have used other indirect visual evidence such as observing relatively small amounts of oily film on a surface (e.g., a ground surface, a water surface, etc.), which is an indicator of low fallout of oil droplets.

Conventional tools for combustion efficiency monitoring are not applicable for open-atmosphere flare burners. For open-air flare burners, such as gas flare and liquid-gas flare equipment, flare burning operations are complicated by external factors. For example, the content of waste fluid is unpredictable for some wells, and the completeness of fuel combustion depends on a variety of factors, such as the burner design, the fuel droplet size entering the flame, the fuel flow rate, and the atmospheric conditions for the flame (e.g., wind direction, wind strength, etc.). As a result, a configuration, a parameter, an operating condition, etc., of a flare burner may need to be adjusted for each flare burning operation to attempt increasing the combustion efficiency. For example, the configuration, the parameter, the operating condition, etc., to be adjusted can be selected from a list that includes assisting pressurized air flowrate, hydrocarbon fluid flowrate, hydrocarbon fluid temperature, a number of open burner nozzles, etc.

Pollution from conventional flare burners exists in several forms. A first form of flare burner pollution corresponds to hazardous gaseous emissions (e.g., carbon dioxide, carbon monoxide, nitrogen oxide (NOx) gases, etc.), which are gas substances generated from combustion of hydrocarbons in air. A second form of flare burner pollution is referred to as fallout and corresponds to droplets (e.g., fallout droplets, fluid deposits, fuel droplets, liquid droplets, etc.) that fall beyond the flame of the flare burner and remain unburned or not completely evaporated. As used herein, the terms "fallout" and "fallout droplet(s)" are used interchangeably and refer to one or more droplets that fall beyond a flame of a flare burner and onto a measurement surface (e.g., a fallout measurement surface). For example, a fallout droplet can be a droplet resulting from an incomplete combustion of a crude oil or gas condensate by the flare burner.

Droplet fallout can be conventionally categorized in two forms: near-field fallout and far-field fallout. Near-field fallout is generated when fuel droplets produced by the flare burner fall beyond the flame within a close vicinity of the flare burner (e.g., within several meters of the flare burner, 10 meters away from the flare burner, etc.). Far-field fallout is generated when fuel droplets produced by the flare burner pass through the flame (due to incomplete combustion of the fuel droplets) and travel a significant distance away from the flare burner (e.g., 50 meters away from the flare burner, 100 meters away from the flare burner, etc.) and are carried away by the wind. In other instances under different wind conditions and/or flare burner configurations, far-field fallout can fall in the near-field and/or otherwise a difference in distance traveled between the near-field fallout and the far-field fallout may be negligible.

Prior implementations of measuring near-field fallout included disposing a plurality of heat-resistant tiles in a near-field measurement zone of a monitored flare burner. In such prior implementations, the tiles were individually photographed with a camera and processed with image-analyzing software after a flare burner operation to determine information about the near-field fallout. However, prior implementations using the tiles to measure fallout were both extremely time and labor consuming for measurement of far-field fallout as many hundreds of tiles had to be distributed over a measurement grid within a vast area (e.g., a semicircle having a radius of 100 meters or more) in the far-field. Such a large measurement grid became obligatory for improved fallout measurements if the flare burner is elevated from the ground, the flare burner has a specific configuration and flame shape, or the wind speed is a relatively medium or high wind speed (e.g., more than a few meters per second). In such prior implementations, if an environmental condition changed, such as the wind direction, then the hundreds of tiles, which, in some examples were attached to heavy support structures such as cinderblocks and required extreme labor force to move, had to be relocated quickly to align with the new wind direction before the wind direction changed again.

Prior implementations of measuring near-field fallout did not allow for determinations of a contribution of fallout pollution generated during transition intervals or transition operations of a flare operation for a liquid flare burner (e.g., a crude oil flare burner). In some instances, the inability to determine the transition interval contributions led to inaccurate and/or otherwise erroneous results of fallout measurement. Prior implementations were unable to determine fallout for a continuous mode liquid flare burner operation (e.g., a continuous mode operation, a normal operation, a typical operation, etc., of the liquid flare burner). For example, prior fallout calculations included fallout generated during a start up and/or shut down of the liquid flare burner that skewed calculations of fallout-related parameters. For example, the liquid flare burner may spill significant amounts of unburned liquid fuel from the atomizing nozzles prior to the flame becoming stable during liquid flare burner startup. Similarly, the liquid flare burner may spill significant amounts of unburned liquid fuel from the atomizing nozzles when the flame becomes unstable during flare burner shutdown.

Examples disclosed herein include an example fallout controller to measure near-field and far-field fallout from a flare burner, such as a liquid flare burner. In some examples, a plurality of heat-resistant measurement surfaces, such as smooth ceramic tiles, is disposed in a near-field fallout measurement region (e.g., a heat zone, a high-temperature zone, etc.) to capture fallout droplets from a flare burner. In such examples, ones of the heat-resistant measurement surfaces can be included in respective ones of fallout collection devices (e.g., a box with a cover (e.g., a cap), a box having a slider or shell, a box capable of overturning, etc., that can be adjusted into an open or closed configuration). The example fallout controller can invoke the fallout collection device to an open configuration to expose the heat-resistant measurement surface to the environment. The example fallout controller can invoke the fallout collection device to a closed configuration to shield or isolate the heat-resistant measurement surface from the environment. By opening or closing the fallout collection device, the fallout controller can prevent fallout generated during a transition interval from being deposited on the heat-resistant measurement surface.

In some examples, a plurality of non-heat-resistant measurement surfaces, such as paper sheets, is disposed in a far-field fallout measurement region (e.g., a cold zone, an ambient temperature zone, etc.) to capture fallout droplets from the flare burner. In such examples, ones of the non-heat-resistant measurement surfaces can be included in respective ones of the fallout collection devices. The example fallout controller can invoke (e.g., invoke operation of, invoke to open, etc.) the fallout collection device to expose the paper sheet to the environment. The example fallout controller can invoke (e.g., invoke operation of, invoke to close, etc.) the fallout collection device to shield or isolate the paper sheet from the environment. By opening or closing the fallout collection device, the example fallout controller can prevent fallout generated during a transition interval from being deposited on the paper sheet. Alternatively, the heat-resistant measurement surfaces can be used in far-field zone as measurement surfaces instead of the paper sheets.

In some examples, usage of a test fluid (e.g., a combustible, non-hydrocarbon dissolvable fluid that is either colorless or has a color that contrasts with a hydrocarbon of interest) prevents hydrocarbon fallout generated during the transition intervals (e.g., using the clean test fluid during flare burner start-up and shutdown). Test fluid fallout generated during the transition intervals and deposited on the measurement surfaces can be distinguished from hydrocarbon fallout (e.g., crude oil fallout) based on differences in color. In some examples, the test fluid can have high vapor pressure and/or be water-dissolvable (e.g., the test fluid can be an alcohol or alcohol-based fluid, such as isopropanol) and, thus, the test fluid fallout can either evaporate relatively rapidly from measurement surfaces or can dissolve with the aid of a dissolving liquid. For example, if the flare burner operates in an offshore environment, the test fluid can be dissolved using sea water or similar fluid.

In some examples, during a start-up operation of a flare burner, the fallout controller controls one or more actuators (e.g., one or more control valves) to deliver the test fluid to the flare burner for combustion. In such examples, after combusting the test fluid for a period of time, the fallout controller controls the one or more actuators to isolate the test fluid from the flare burner and deliver a hydrocarbon fluid to the flare burner for combustion. In some examples, during a shut-down operation of the flare burner, the fallout controller controls the one or more actuators to isolate the hydrocarbon source from the flare burner and delivers the test fluid to the flare burner for combustion. Advantageously, the fallout controller can reduce fallout from the hydrocarbon source by isolating the hydrocarbon source during the start-up and shut-down operations of the flare burner.

In some disclosed examples, the fallout controller executes a calibration process to determine a correlation for each fluid of interest on each type of fallout measurement surface (e.g., a tile, a paper sheet, etc.) to convert a surface area of a fallout droplet to a volume of the fallout droplet. In some disclosed examples, the fallout controller processes the plurality of tiles and paper sheets after a flare burner operation using image processing and analytical techniques to determine a fallout surface density corresponding to fallen unburned fluid volume per unit of surface area at every point of the fallout measurement regions. In some disclosed examples, the fallout controller determines a total volume of fallout in the measurement regions. In response to determining the total fallout volume, the example fallout controller calculates a fallout efficiency corresponding to an amount of unburned fuel with respect to a total amount of fuel provided to the flare burner.

In some disclosed examples, the fallout controller generates a recommendation based on the fallout efficiency to adjust a parameter of the flare burner to reduce fallout pollution. In some disclosed examples, the fallout controller generates and transmits a command based on the fallout efficiency to adjust and/or otherwise control the flare burner to reduce fallout pollution during a continuous mode operation of the flare burner.

FIG. 1 is a schematic illustration of an example fallout controller 100 monitoring an example flare burner 102 in an example measurement environment 104. In FIG. 1, the fallout controller 100 monitors and/or otherwise controls an operation of the flare burner 102 by measuring fallout in the measurement environment 104. In some examples, the flare burner 102 operates in a waste-burning mode (e.g., the flare burner 102 performing a waste-burning operation), where the flare burner 102 burns waste fluids produced in exploration wells or burns waste fluids during well testing operations.

In some examples, the flare burner 102 operates in a transition mode or during a transition period or interval, such as a start-up mode (e.g., the flare burner 102 performing a start-up operation) or a shut-down mode (e.g., the flare burner 102 performing a shut-down operation). For example, during the transition mode, the flare burner 102 stabilizes a flame using a clean test fluid (e.g., a clean test fuel, a transparent non-polluting fuel, etc.) instead of a hydrocarbon fluid during startup of the flare burner 102. In other examples, the flare burner 102 can de-stabilize or extinguish the flame using the clean test fluid instead of the hydrocarbon fluid during shutdown of the flare burner 102. In FIG. 1, the fallout controller 100 measures fallout during a test operation of the flare burner 102 to estimate and/or otherwise determine expected fallout during a waste-burning operation using a current or instant configuration of the flare burner 102.

In the illustrated example of FIG. 1, the flare burner 102 is a type commonly used in the oil and gas industry. For example, the flare burner 102 can include an atomizing head including twelve nozzles and two pilot burners. Oil or another type of hydrocarbon source can be atomized into small droplets by means of an example pressurized air source 110. Combustion of the small droplets is initiated when the two pilot burners are ignited. The flare burner 102 of FIG. 1 is placed on an example pedestal platform 106 (e.g., a 5-meter-high pedestal platform) to prevent flame interaction with a ground surface 108 and to provide proper atmosphere air aspiration. In FIG. 1, the pedestal platform 106 is covered by heat-resistant materials or coverings. In FIG. 1, the flare burner 102 is inclined to the horizon at a 20-degree angle. Alternatively, any other configuration and/or type of liquid flare burner or liquid-gas flare burner can be used.

In the illustrated example of FIG. 1, the flare burner 102 is in fluid communication with the pressurized air source 110 via a first example supply line (e.g., an air supply line, a feed line, a fluid supply line, etc.) 112. In FIG. 1, the flare burner 102 is in fluid communication with an example test fluid source 114 and an example hydrocarbon source 116 via a second example supply line (e.g., a feed line, a fluid supply line, etc.) 118. In FIG. 1, a first example flowmeter 120 is coupled (e.g., fluidly coupled) to the first supply line 112 to measure flow parameter(s) associated with the pressurized air source 110. In FIG. 1, a second example flowmeter 122 is coupled (e.g., fluidly coupled) to the second supply line 118 to measure flow parameter(s) associated with the test fluid source 114 and/or the hydrocarbon source 116. For example, a flow parameter can be a density, a flow rate, a temperature, a viscosity, etc., of fluid flowing in the first supply line 112, the second supply line 118, etc. In such examples, the flowmeters 120, 122 transmit measurement data including the flow parameter(s) to the fallout controller 100 for processing.

In some examples the flare burner 102 blows compressed air from the pressurized air source 110 to assist the atomization of hydrocarbon fluid in the burner nozzles of the flare burner 102. In some examples, the flare burner 102 blows compressed air from the pressurized air source 110 to expel atomized fluid droplets from the burner nozzles into a flame plume 124.

In some examples, the hydrocarbon source 116 provides a liquid-containing fluid such as crude oil, condensate, wet gas, etc., produced from an exploration well or other hydrocarbon production source. In some examples, the test fluid source 114 provides and/or otherwise includes a clean test fluid, such as an alcohol-based fluid having an inorganic colorant (e.g., a blue colorant, a green colorant, etc.) supplied therein. For example, the test fluid source 114 can supply an isopropanol fluid that is colored blue or any other color that contrasts with a typical brown or black color of the hydrocarbon fluid from the hydrocarbon source 116. Alternatively, the hydrocarbon source 116 may have any other color. Alternatively, the clean test fluid may be transparent (e.g., color-less).

In the illustrated example of FIG. 1, the fallout controller 100 is in communication and/or otherwise communicatively coupled to the flare burner 102, the first flowmeter 120, and the second flowmeter 122 via an example communication link 126. In FIG. 1, the communication link 126 corresponds to one or more wired communication links. For example, the communication link 126 can include, correspond to, and/or otherwise be representative of one or more data buses (e.g., a controller area network (CAN), a fieldbus network (e.g., a Modbus network, a Profibus network, etc.), etc.), one or more Local Area Networks (LANs) (e.g., an Ethernet network, an Industrial Ethernet network, etc.), one or more fiber-optic networks, etc., and/or a combination thereof. Alternatively, any other wired and/or wireless network(s) may be used, such as one or more wireless LANs, one or more cellular networks, one or more private networks, one or more public networks, etc., and/or a combination thereof.

In the illustrated example of FIG. 1, the fallout controller 100 adjusts and/or otherwise controls the flow rates of the fluids from the pressurized air source 110, the test fluid source 114, and/or the hydrocarbon source 116. For example, the fallout controller 100 can measure a flow parameter of a fluid flowing through the first supply line 112 via the first flowmeter 120 and can adjust (e.g., increase, decrease, etc.) a flow rate of the fluid in the first supply line 112 based on the measured flow parameter. In other examples, the fallout controller 100 can measure a flow parameter of a fluid flowing through the second supply line 118 via the second flowmeter 122 and can adjust a flow rate of the fluid in the second supply line 118 based on the measured flow parameter.

In the illustrated example of FIG. 1, the first flowmeter 120 is a flowmeter (e.g., an air flowmeter) capable of measuring a flow rate of the fluid flowing through the first supply line 112. For example, the first flowmeter 120 can transmit first measurement data including a flow rate of the fluid flowing through the first supply line 112 to the fallout controller 100 for processing. In FIG. 1, the second flowmeter 122 is a flowmeter (e.g., a liquid flowmeter) capable of measuring a flow rate of the fluid flowing through the second supply line 118. For example, the second flowmeter 122 can transmit measurement data including a flow rate of the fluid flowing through the second supply line 118 to the fallout controller 100 for processing.

In the illustrated example of FIG. 1, the fallout controller 100 measures first fallout in a first example measurement region 128. As used herein, the first fallout is referred to as "near-field fallout" and the first measurement region 128 is referred to as the "near-field measurement region." In FIG. 1, the fallout controller 100 measures second fallout in a second example measurement region 130. As used herein, the second fallout is referred to as "far-field fallout" and the second measurement region 130 is referred to as the "far-field measurement region." Such references are by convention only and the type of fallout monitored and/or otherwise measured by the fallout controller 100 is not so limited. For example, in some operating conditions, the first measurement region 128 and the second measurement region 130 can be combined into a single measurement region or, in other operating conditions, can be separated into additional regions.

In the illustrated example of FIG. 1, the near-field measurement region 128 and the far-field measurement region 130 are circular sector shaped areas. Alternatively, any other shape of the near-field measurement region 128 and the far-field measurement region 130 may be used. For example, the first measurement region 128 and/or the second measurement region 130 can have a shape that is oval, rectangular, triangular, etc.

In the illustrated example of FIG. 1, the near-field measurement region 128 includes a plurality of first example measurement surfaces 132 arranged in a first example pattern 134. In FIG. 1, the first measurement surfaces 132 are heat-resistant measurement surfaces, such as ceramic tiles. For example, the first measurement surfaces 132 can be constructed from and/or otherwise be composed of a heat-resistant material capable of withstanding temperatures proximate the flare burner 102 up to and beyond 200 degrees Centigrade. In FIG. 1, each of the first measurement surfaces 132 are the same. For example, each of the first measurement surfaces 132 can be uniform in shape, size, color, and/or material. Alternatively, one or more of the first measurement surfaces 132 may not be the same and, thus, may not be uniform in shape, size, color, and/or material.

In some examples, the first measurement surfaces 132 are white in color. Alternatively, the first measurement surfaces 132 may be any other color, such as light blue, to provide a high contrast to hydrocarbon spots for image processing. In some examples, each of the first measurement surfaces 132 is disposed on and/or otherwise coupled to a pedestal structure or other suitable structure to elevate the first measurement surfaces 132 off the ground. As used herein, the "first measurement surfaces 132" and the "tiles 132" are used interchangeably. However, such interchangeability is for ease of understanding of the descriptions of the examples disclosed herein and are not so limited, as the first measurement surfaces 132 can be any other heat-resistant material that is different from tiles.

In the illustrated example of FIG. 1, the tiles 132 are arranged in the first pattern 134 to catch liquid droplet fallout during operation of the flare burner 102. For example, the second supply line 118 feeds fluid from the test fluid source 114 or the hydrocarbon source 116 into a nozzle of the flare burner 102. The nozzle with assistance of compressed air from the pressurized air source 110 via the first supply line 112 expels the combustible fluid (e.g., crude oil, one or more test fluids, etc.) as a combustible flow. The nozzle expels the combustible flow into open air in the vicinity of the flare burner 102 where the combustible flow is ignited in the flame plume 124. Due to the multi-phase composition of the combustible flow, some droplets of the test fluids as sprayed from the nozzle are not ignited because they are unable to reach a flame zone of the flame plume 124 and ultimately become near-field fallout. The near-field fallout is dispersed into the air and lands on the tiles 132 and the surrounding ground surface 108.

In the illustrated example of FIG. 1, the first pattern 134 includes lines of the tiles 132 arranged in a circular (e.g., semi-circular, less than semi-circular, more than semi-circular, etc.) sector shaped pattern. For example, the first pattern 134 can be an auditorium seating-like pattern or a sunray pattern. Alternatively, the first pattern 134 may be any other type of pattern such as an evenly spaced apart mesh pattern, a rectangular pattern, etc., and/or a combination thereof. Alternatively, the tiles 132 may not be evenly spaced. In some examples, the tiles 132 are placed such that approximately 1% to 10%, or 2% to 5%, of the surface area of the near-field measurement region 128 is covered by the tiles 132. Alternatively, any other surface area coverage of the near-field measurement region 128 may be used.

In the illustrated example of FIG. 1, the far-field measurement region 130 includes a plurality of second example measurement surfaces 136 arranged in a second example pattern 138. In FIG. 1, the second measurement surfaces 136 are paper sheets. As used herein, the "second measurement surfaces 136" and the "paper sheets 136" are used interchangeably. However, such interchangeability is for ease of understanding of the descriptions of the examples disclosed herein and are not so limited, as the second measurement surfaces 136 can be any other type of measurement surface that is different from paper sheets.

In the illustrated example of FIG. 1, the paper sheets 136 can be used to measure far-field fallout because the high temperatures of the flame plume 124 have dissipated before reaching the far-field measurement region 130 and, thus, eliminate a possibility of destroying the paper sheets 136. Alternatively, one or more of the paper sheets 136 may be replaced with any other type of droplet measurement surface such as ceramic tiles, fabric, etc., and/or a combination thereof. In FIG. 1, the paper sheets 136 are the same and, thus, uniform in shape, size, color, and material. Alternatively, one or more of the paper sheets 136 may not be the same and, thus, not uniform in shape, size, color, and/or material. The paper sheets 136 are white in color. Alternatively, any other color, such as light blue, may be used to provide a high contrast to hydrocarbon spots for image processing. In some examples, each of the paper sheets 136 is disposed on and/or otherwise coupled to a pedestal structure or other suitable structure to elevate the paper sheets 136 off the ground, prevent the paper sheets 136 from being moved due to wind or other means, and to minimize contamination by dust, mud, etc.

In the illustrated example of FIG. 1, the paper sheets 136 are arranged in the second pattern 138 to catch liquid droplet fallout during operation of the flare burner 102. For example, some droplets of the combustible flow as sprayed from the nozzle of the flare burner 102 such as larger high velocity droplets are not fully burned inside the flame plume 124 and are caught up by the wind and ultimately become far-field fallout. In FIG. 1, the far-field fallout is dispersed into the air and lands on the paper sheets 136.

In the illustrated example of FIG. 1, the second pattern 138 includes lines of the paper sheets 136 in a partially circular pattern. For example, the second pattern 138 can be an auditorium seating-like pattern or a sunray pattern. Alternatively, the second pattern 138 may be any other type of pattern such as an evenly spaced apart mesh pattern, a rectangular grid pattern, etc., and/or a combination thereof. Alternatively, the paper sheets 136 may not be evenly spaced. In some examples, the paper sheets 136 are placed such that approximately 1% to 10%, or 2% to 5%, of the surface area of the far-field measurement region 130 is covered by the paper sheets 136. Alternatively, any other surface area coverage of the far-field measurement region 130 may be used.

In the illustrated example of FIG. 1, the paper sheets 136 in the far-field measurement region 130 are arranged based on a first spatial density less than a second spatial density of the tiles 132 in the near-field measurement region 128. For example, the far-field measurement region 130 can have fewer paper sheets 136 per unit of area than the number of the tiles 132 in the near-field measurement region 128 per the same unit of area. In such examples, the fallout controller 100 can measure far-field fallout using distributed sample points to adequately approximate a fallout surface density distribution function.

In the illustrated example of FIG. 1, the near-field measurement region 128 and the far-field measurement region 130 are arranged symmetrically relative to the flare burner 102 to align with an example wind direction 142. Alternatively, one or both measurement regions 128, 130 may not be arranged symmetrically relative to the flare burner 102. In some examples, the wind direction 142 changes after the tiles 132 and the paper sheets 136 have been disposed in the respective measurement regions 128, 130. Advantageously, in such examples, the paper sheets 136 can be quickly moved along with the second pattern 138 to re-align with the change in the wind direction 142 compared to the tiles 132.

Figure 2:
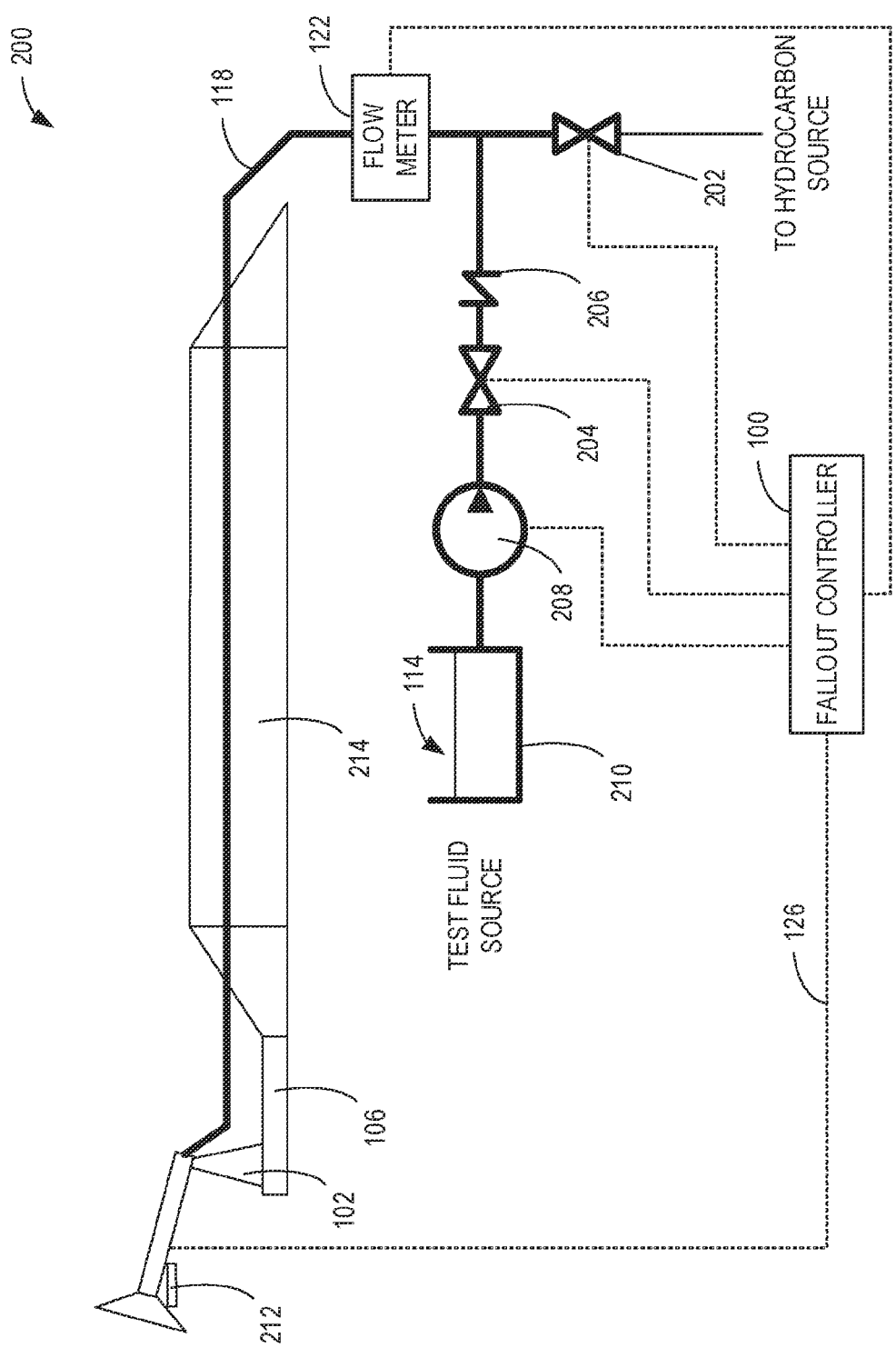
FIG. 2 is a schematic illustration of an example control system to control the example flare burner of FIG. 1.

FIG. 2 is a schematic illustration of an example control system 200 to control the flare burner 102 of FIG. 1. The control system 200 of FIG. 2 includes the fallout controller 100 of FIG. 1, a first example control valve 202, a second example control valve 204, an example check valve 206, an example pump 208, and an example tank 210. Also depicted in FIG. 2, the flare burner 102 includes example pilot burners 212 and an example burner boom 214, which is coupled to the pedestal platform 106 and/or, more generally, the flare burner 102.

In the illustrated example of FIG. 2, the flare burner 102, the first control valve 202, the second control valve 204, and the pump 208 are coupled (e.g., communicatively coupled, electrically coupled, etc.) to the fallout controller 100. For example, the fallout controller 100 can control (e.g., invoke control of) the control valves 202, 204 by transmitting a control signal to open, close, etc., the control valves 202, 204. In other examples, the fallout controller 100 can control (e.g., invoke control of) the pump 208 by increasing or decreasing a speed (e.g., a revolutions-per-minute parameter) of the pump 208. In FIG. 2, the first control valve 202 and the second control valve 204 are valve assemblies that include an actuator (e.g., a hydraulic actuator, a pneumatic actuator, an electric-over-hydraulic actuator, an electric-over-pneumatic actuator, etc.) and a valve (e.g., a butterfly valve, a gate valve, a globe valve, etc.). In FIG. 2, the pump 208 is an electrically controlled hydraulic pump. Alternatively, the pump 208 may be any other type of fluid pump. In FIG. 2, the tank 210 stores the clean test fluid of the test fluid source 114 of FIG. 1.

In the illustrated example of FIG. 2, the first control valve 202 is configured to be in fluid communication with the hydrocarbon source 116 of FIG. 1. For example, the fallout controller 100 can control the first control valve 202 to isolate the hydrocarbon source 116 from the flare burner 102. The first control valve 202 is coupled to the check valve 206, the second supply line 118 of FIG. 1, and the second flowmeter 122 of FIG. 1. The check valve 206 is coupled to the second control valve 204. In FIG. 2, the second control valve 204 is configured to be in fluid communication with the pump 208. The pump 208 is configured to be in fluid communication with the tank 210.

In example operation, the fallout controller 100 can determine to start-up the flare burner 102. During start-up, the fallout controller 100 can close (e.g., invoke operation of, invoke to close, etc.) the first control valve 202 to isolate the hydrocarbon source 116 from the flare burner 102. The fallout controller 100 can open (e.g., invoke operation of, invoke to open, etc.) the second control valve 204 to effectuate the flow of the test fluid source 114. The fallout controller 100 can invoke (e.g., turn on, activate, enable, increase a speed, etc.) the pump 208 to begin pumping the clean test fluid from the tank 210 to the flare burner 102 via the second control valve 204, the check valve 206, and the second flowmeter 122. The pilot burners 212 can combust the clean test fluid to trigger generation of the flame plume 124 of FIG. 1. For example, the pilot burners 212 can combust the clean test fluid to generate unburned test fluid droplets that can be deposited in the first measurement region 128, the second measurement region 130, etc., of FIG. 1. The fallout controller 100 can obtain measurement data, such as a flow rate of the clean test fluid in the second supply line 118, from the second flowmeter 122. The fallout controller 100 can determine to adjust a flow rate of the clean test fluid based on the measurement data. The fallout controller 100 can adjust the flow rate of the clean test fluid by adjusting a speed of the pump 208.

In example operation, the fallout controller 100 can determine to execute a waste-burning operation with the flare burner 102. During the waste-burning operation, the fallout controller 100 can close the second control valve 204 to isolate the test fluid source 114 from the flare burner 102. The fallout controller 100 can open the first control valve 202 to cause the flow of waste fuel, oil, etc., from the hydrocarbon source 116. The flare burner 102 can combust the waste fuel from the hydrocarbon source 116 during the waste-burning operation. The fallout controller 100 can obtain measurement data, such as a flow rate of the waste fuel in the second supply line 118, from the second flowmeter 122. The fallout controller 100 can determine to adjust a flow rate of the waste fuel based on the measurement data. The fallout controller 100 can adjust the flow rate of the waste fuel by adjusting a position of the first control valve 202 from a first position to a second position different from the first position. For example, the fallout controller 100 can increase the flow rate by opening the first control valve 202, decrease the flow rate by closing the first control valve 202, etc.

In example operation, the fallout controller 100 can determine to shut-down the flare burner 102 after the waste-burning operation. During shut-down, the fallout controller 100 can close the first control valve 202 to isolate the hydrocarbon source 116 from the flare burner 102. The fallout controller 100 can open the second control valve 204 to effectuate the flow of the test fluid source 114. The fallout controller 100 can invoke the pump 208 to begin pumping the clean test fluid from the tank 210 to the flare burner 102 via the second control valve 204, the check valve 206, and the second flowmeter 122. The fallout controller 100 can obtain measurement data, such as a flow rate of the clean test fluid in the second supply line 118, from the second flowmeter 122. The fallout controller 100 can determine to adjust a flow rate of the clean test fluid based on the measurement data. The fallout controller 100 can adjust the flow rate of the clean test fluid by adjusting the speed of the pump 208. The fallout controller 100 can extinguish the flame plume 124 of FIG. 1 by shutting down the pump 208 to stop the flow of the clean test fluid to the flare burner 102.

Figure 3:
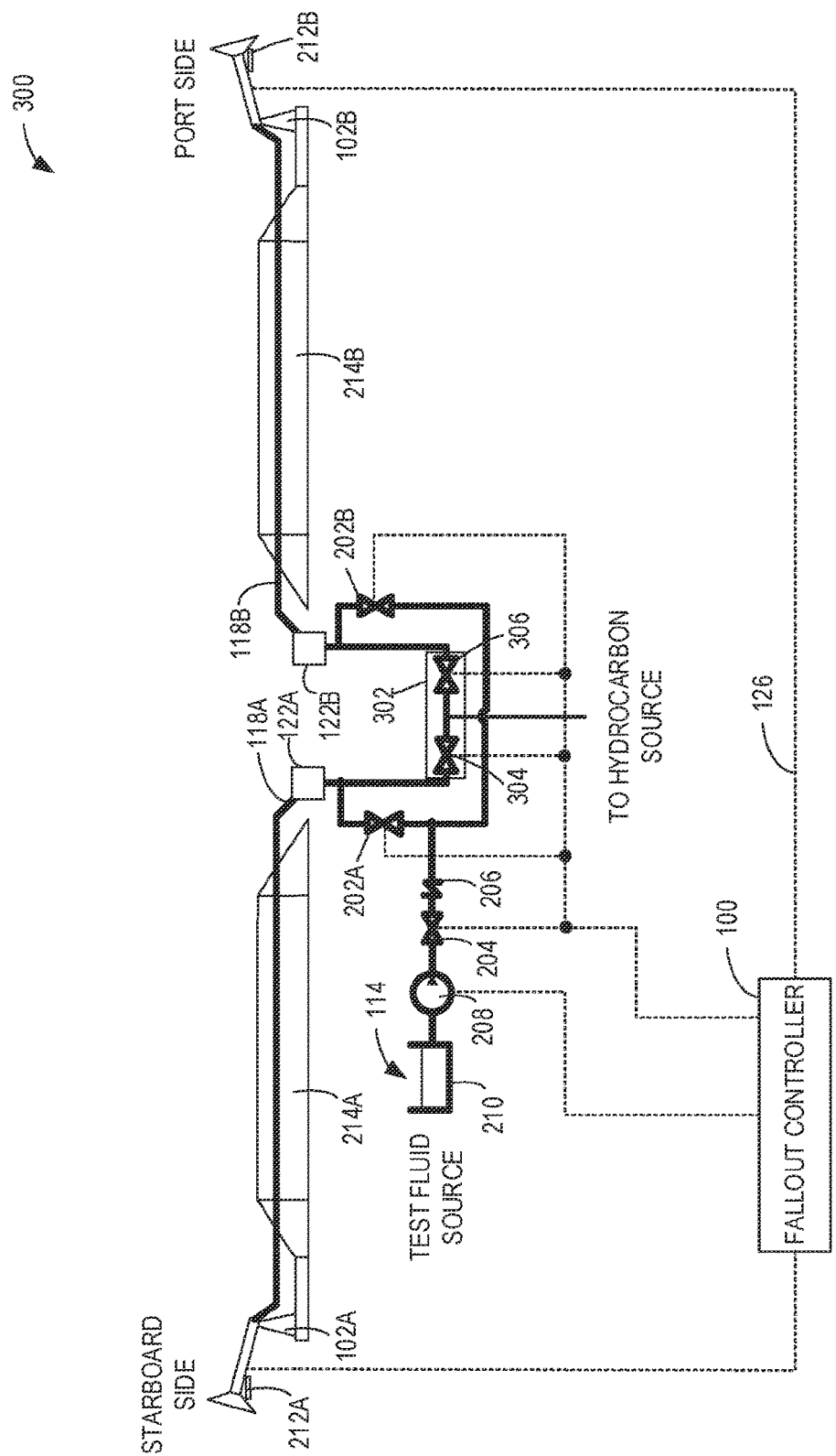
FIG. 3 is a schematic illustration of another example control system to control the example flare burner of FIG. 1.

FIG. 3 is a schematic illustration of another example control system 300 to control the flare burner 102 of FIG. 1. For example, the control system 300 of FIG. 3 can be onboard an offshore oilrig or a different oilfield environment. The control system 300 of FIG. 3 includes a first flare burner 102A and a first instance 118A of the second supply line 118 of FIGS. 1-2 on a starboard side of the offshore oilrig and a second flare burner 102B and a second instance 118B of the second supply line 118 of FIGS. 1-2 on a port side of the offshore oilrig. The first flare burner 102A has first pilot burners 212A and the second flare burner 102B has second pilot burners 212B. The first flare burner 102A and the second flare burner 102B can correspond to the flare burner 102 of FIGS. 1-2. The first instance of the 118A of the second supply line 118 and the second instance 118B of the second supply line 118 of FIG. 3 can correspond to the second supply line 118 of FIGS. 1-2. The first pilot burners 212A and the second pilot burners 212B can correspond to the pilot burners 212 of FIG. 2. Also, the first burner boom 214A and the second burner boom 214B can correspond to the burner boom 214 of FIG. 2. The control system 300 of FIG. 3 includes two instances 122A, 122B of the second flowmeter 122 of FIGS. 1-2.

In the illustrated example of FIG. 3, the control system 300 includes two instances 202A, 202B of the first control valve 202, the second control valve 204, the check valve 206, the pump 208, and the tank 210 of FIG. 2. The control system 300 includes an example manifold (e.g., an oil manifold) 302 including a first example manifold valve 304 and a second example manifold valve 306. In FIG. 3, the manifold valves 304, 306 are valve assemblies that include an actuator (e.g., a hydraulic actuator, a pneumatic actuator, an electric-over-hydraulic actuator, an electric-over-pneumatic actuator, etc.) and a valve (e.g., a butterfly valve, a gate valve, a globe valve, etc.).

In the illustrated example of FIG. 3, the first manifold valve 304 is coupled to the first flare burner 102A, the first instance 122A of the second flowmeter 122, the first instance 202A of the first control valve 202, the second manifold valve 306, and the hydrocarbon source 116 of FIG. 1. In FIG. 3, the second manifold valve 306 is coupled to the second flare burner 102B, the second instance 122B of the second flowmeter 122, the second instance 202B of the first control valve 202, the first manifold valve 304, and the hydrocarbon source 116. In FIG. 3, the instances 202A, 202B of the first control valve 202 are coupled to each other and the check valve 206.

In the illustrated example of FIG. 3, the control system 300 includes the fallout controller 100 of FIGS. 1-2 to control and/or otherwise monitor operation of the flare burners 102A, 102B. In FIG. 3, the fallout controller 100 is in communication with and/or otherwise coupled (e.g., communicatively coupled, electrically coupled, etc.) to the first flare burner 102A, the second flare burner 102B, the instances 202A, 202B of the first control valve 202, the second control valve 204, the pump 208, the first manifold valve 304, and the second manifold valve 306.

In example operation, during start-up or shut-down of the flare burners 102A, 102B, the fallout controller 100 can cause the flare burners 102A, 102B to burn a clean test fluid from the test fluid source 114. For example, the fallout controller 100 can generate command(s) to close the manifold valves 304, 306 and open the second control valve 204 and the instances 202A, 202B of the first control valve 202. In such examples, the fallout controller 100 can generate command(s) to invoke the pump 208 to pump the test fluid from the test fluid source 114 to the flare burners 102A, 102B for combustion. In some such examples, the fallout controller 100 can control the pump 208 based on first measurement data from the first instance 122A of the second flowmeter 122 and/or second measurement data from the second instance 122B of the second flowmeter 122.

In example operation, during a waste burning operation of the flare burners 102A, 102B, the fallout controller 100 can cause the flare burners 102A, 102B to burn a hydrocarbon fluid from the hydrocarbon source 116. For example, the fallout controller 100 can generate command(s) to open the manifold valves 304, 306 and close the second control valve 204 and the instances 202A, 202B of the first control valve 202. In such examples, the fallout controller 100 can generate command(s) to invoke (e.g., turn off, de-activate, disable, decrease a speed, etc.) the pump 208 to turn off. In some such examples, the fallout controller 100 can cause the flare burners 102A, 102B to combust the hydrocarbon fluid from the hydrocarbon source 116.

Figure 4:
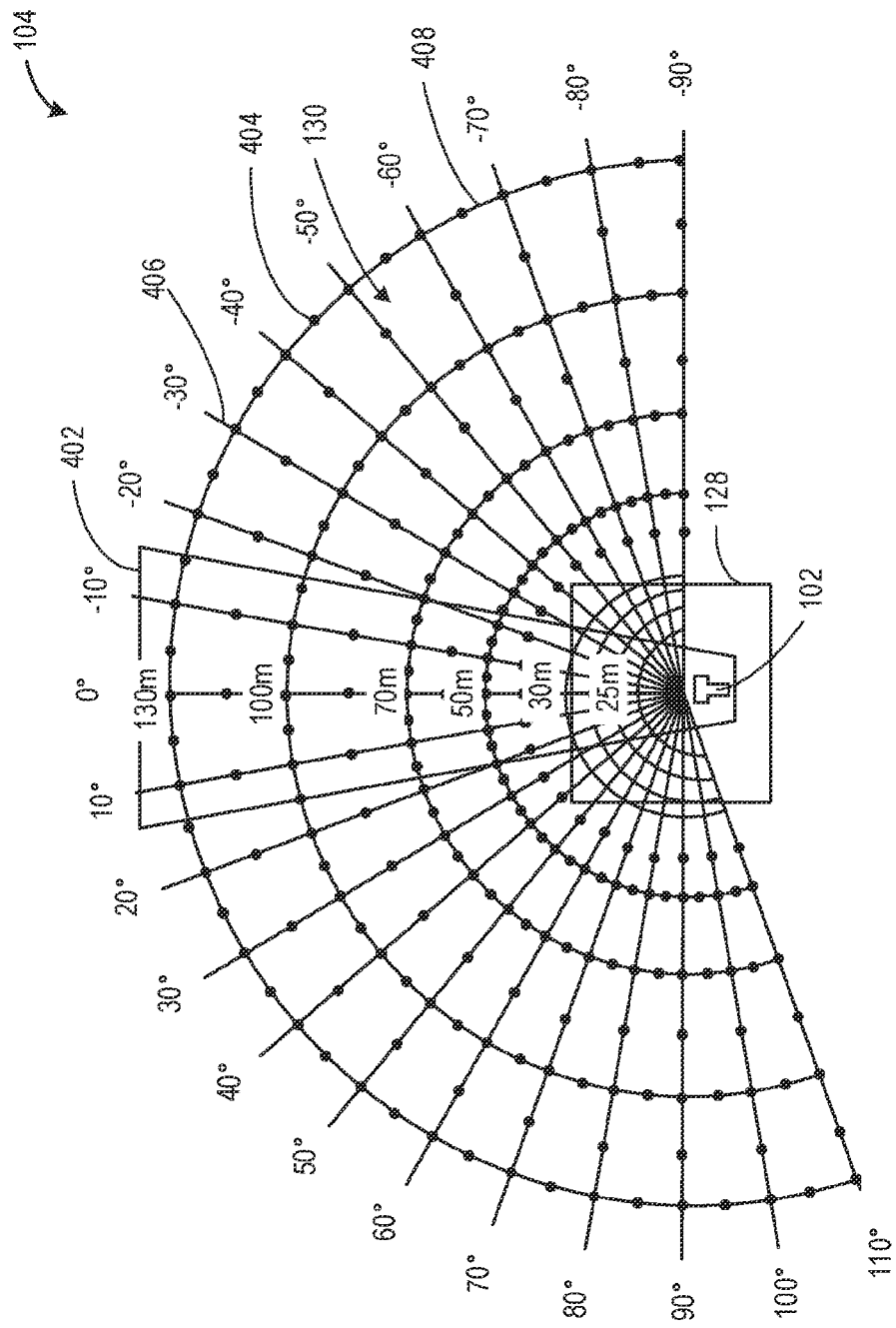
FIG. 4 is a plan view of the example measurement environment of FIG. 1 including an example near-field measurement region and an example far-field measurement region.

FIG. 4 is a plan view of the measurement environment 104 of FIG. 1 including the near-field measurement region 128 of FIG. 1 and the far-field measurement region 130 of FIG. 1. In FIG. 4, the measurement environment 104 includes the flare burner 102 of FIGS. 1-2. The flare burner 102 is disposed in the near-field measurement region 128. In FIG. 4, the near-field measurement region 128 is a circular sector shaped area with a radius of 25 meters. Alternatively, any other shape or radius of the near-field measurement region 128 may be used. The near-field measurement region 128 is depicted in greater detail in FIG. 5.

In the illustrated example of FIG. 4, the far-field measurement region 130 is an annulus-sector shaped area with a radial length (distance) of 105 meters. For example, the far-field measurement region 130 can begin at a first radius of 25 meters and end at a second radius of 130 meters. Alternatively, any other shape or size of the far-field measurement region 130 may be used depending on operational wind speed and direction and flare burner design. In FIG. 4, the near-field measurement region 128 and the far-field measurement region 130 include a far-field and near-field measurement region portion 402 that is depicted in greater detail in FIG. 6.

In the illustrated example of FIG. 4, the flare burner 102 can deposit fallout droplets on example fallout collection devices 404. In FIG. 4, the fallout collection devices 404 are disposed in the near-field measurement region 128 and the far-field measurement region 130. The fallout collection devices 404 are pedestal structures that include an instance of either one of the tiles 132 or one of the paper sheets 136 of FIG. 1. The fallout collection devices 404 can include a box with a moveable cover (e.g., a slider) that can be actuated by the fallout controller 100 of FIGS. 1-3 via a wired and/or a wireless connection. For example, the fallout controller 100 can transmit a command via a cable to one or a group of the fallout collection devices 404 to move the cover from an open position to a closed position. In such examples, the fallout controller 100 can prevent either the tile 132 or the paper sheet 136 included in the fallout collection device 404 from being exposed to fallout generated by the flare burner 102 during a transition interval. In other examples, the fallout controller 100 can transmit a command to one of the fallout collection devices 404 via a wireless connection (e.g., a Bluetooth® connection, a Wi-Fi Direct® connection, etc.) to move the cover from the closed position to the open position. In such examples, the fallout controller 100 can expose either the tile 132 or the paper sheet 136 included in the fallout collection device 404 to fallout generated by the flare burner 102 during a test operation.

In the illustrated example of FIG. 4, a first quantity of the fallout collection devices 404 is disposed in the near-field measurement region 128. For example, the near-field measurement region 128 can include thirty of the fallout collection devices 404. In FIG. 4, the first quantity of the fallout collection devices 404 is disposed at measurement points distributed in the non-uniform staggered order pattern in the near-field measurement region 128. Alternatively, the first quantity may be disposed at measurement points distributed in a different pattern, organization, or density of measurement points.

In FIG. 4, a second quantity of the fallout collection devices 404 is disposed in the far-field measurement region 130. For example, the far-field measurement region 130 can include ninety of the fallout collection devices 404. In FIG. 4, the second quantity of the fallout collection devices 404 is disposed at measurement points distributed along the radial rays 406 and the arcs 408 of the far-field measurement region 130. Alternatively, the second quantity may be disposed at measurement points distributed in a different pattern, organization, or density of measurement points. Alternatively, the near-field measurement region 128 and/or the far-field measurement region 130 may include a different quantity of the fallout collection devices 404. Alternatively, the first quantity and the second quantity may be the same.

Figure 5:
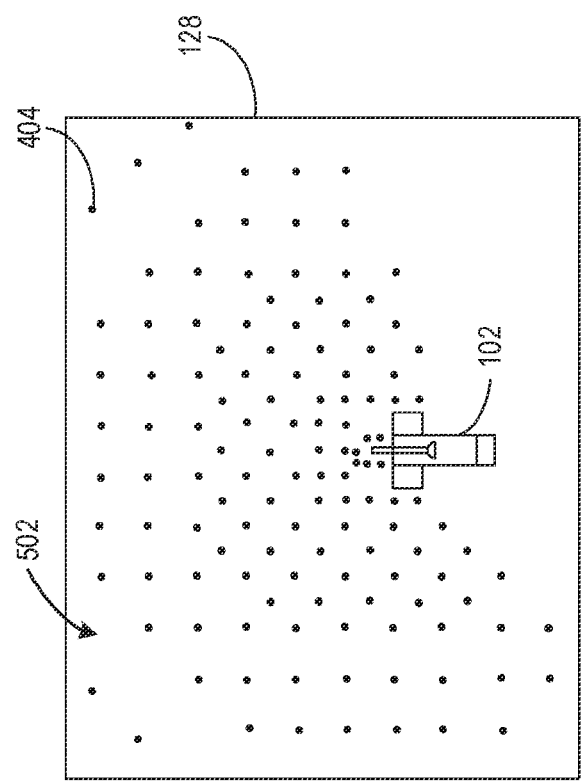
FIG. 5 is an enlarged plan view of the example near-field measurement region of FIGS. 1 and/or 4.

FIG. 5 is an enlarged plan view of the near-field measurement region 128 of FIGS. 1 and/or 4. In FIG. 5, the fallout collection devices 404 are disposed in the near-field measurement region 128 in an example non-uniform staggered order pattern 502. The fallout collection devices 404 surround the flare burner 102 at a plurality of measurement points including at measurement points located behind a tip of the flare burner 102.

Figure 6:
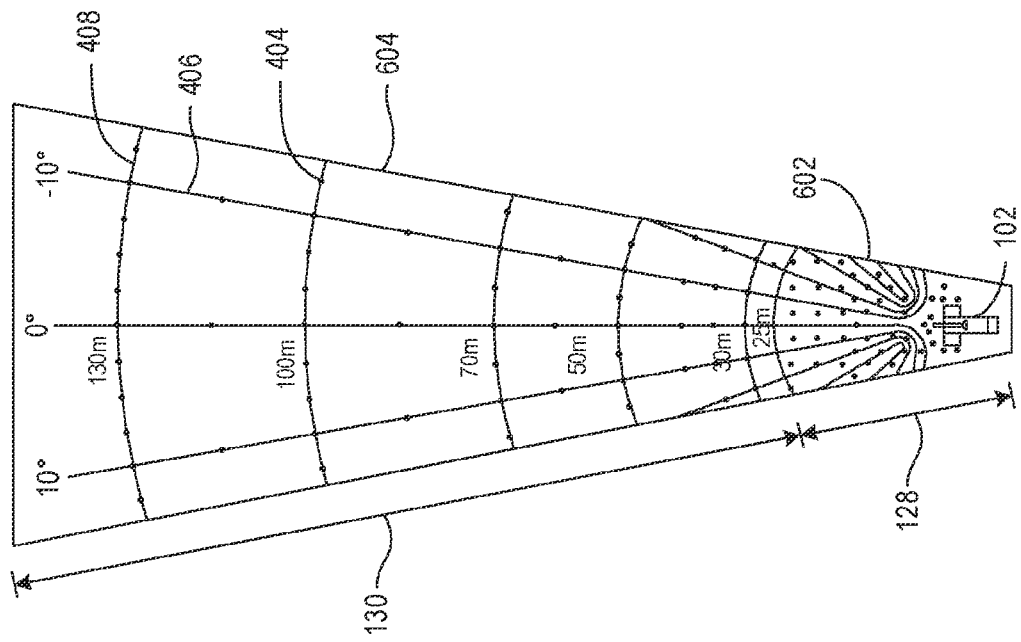
FIG. 6 is an enlarged plan view of the example far-field measurement region of FIGS. 1 and/or 4.

FIG. 6 is an enlarged plan view of example far-field measurement region portions 602 and example near-field measurement region portions 604 of the near-field measurement region 128 and the far-field measurement region 130 of FIGS. 1, 4, and/or 5. In FIG. 6, the fallout collection devices 404 are disposed in the far-field measurement region 130 along the rays 406 and the arcs 408 of FIG. 4. In some examples, the fallout collection devices 404 included in the near-field measurement region 128 and/or the far-field measurement region 130 have assigned coordinates in a similar manner as described below in connection with FIG. 7.

Figure 7:
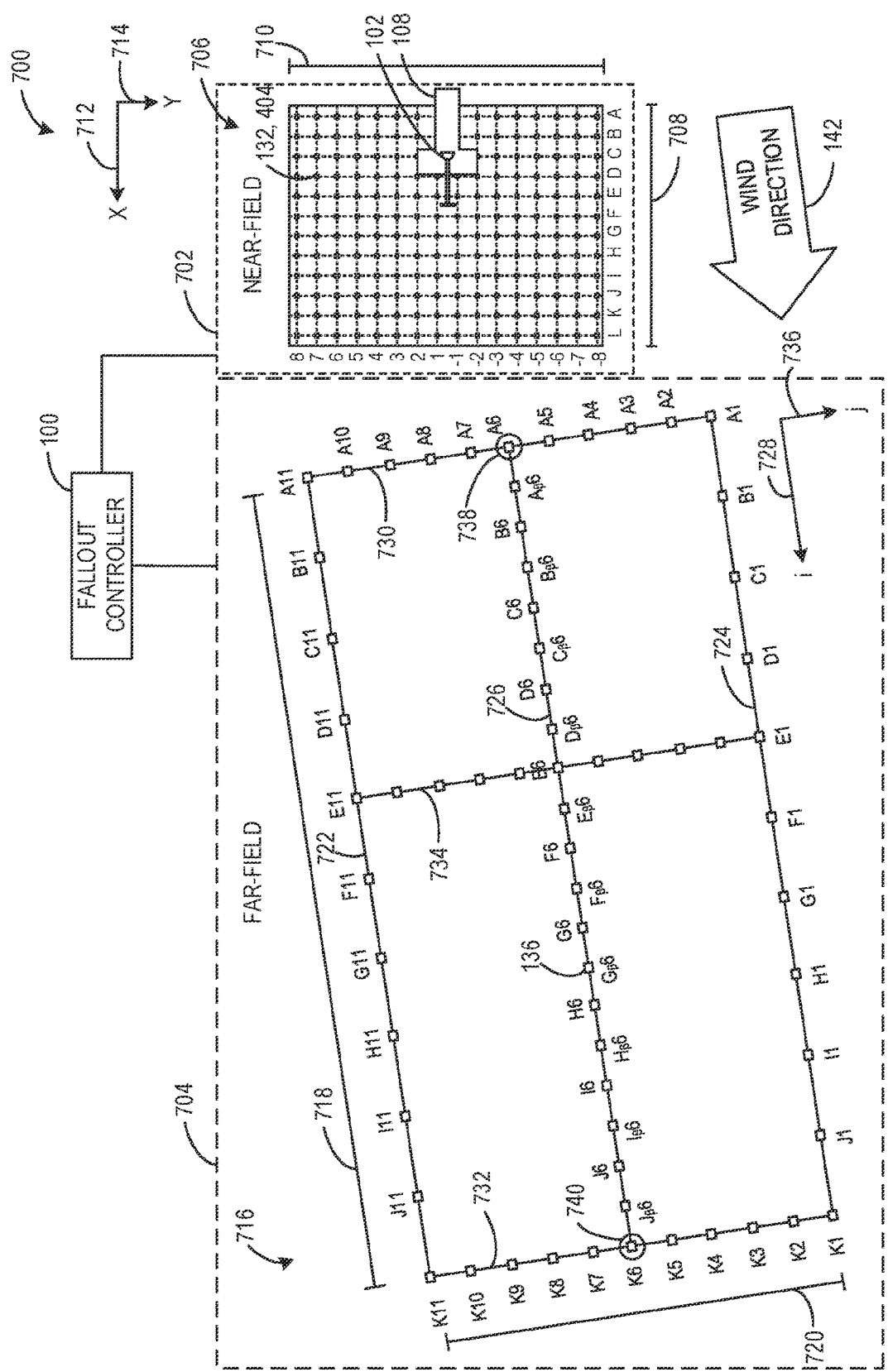
FIG. 7 is a schematic illustration of the example fallout controller of FIG. 1 monitoring the example flare burner of FIG. 1 in another example measurement environment.

FIG. 7 is a plan view of a second example measurement environment 700 including the flare burner 102 of FIGS. 1-6, a second example near-field measurement region 702, and a second example far-field measurement region 704. Alternatively, the second measurement environment 700 may include fewer or more measurement regions than depicted in FIG. 7. In FIG. 7, the second near-field measurement region 702 includes a third example pattern 706 that represents a stationary rectangular area with a first example length 708 of 22 meters and a first example width 710 of 30 meters. Alternatively, the first length 708 and/or the first width 710 of the second near-field measurement region 702 may be different. The second near-field measurement region 702 includes 192 of the tiles 132 of FIG. 1. In FIG. 7, the tiles 132 are uniformly distributed over the rectangular area and are spaced two meters apart. Alternatively, there may be fewer or more of the tiles 132 than depicted in FIG. 7. Alternatively, the tiles 132 may not be uniformly distributed and/or may be spaced less than or greater than two meters apart.

In the illustrated example FIG. 7, each of the tiles 132 has a first assigned coordinate (x) along a first axis 712 ranging from A to L and a second assigned coordinate (y) along a second axis 714 ranging from −8 to 8 to form an x; y coordinate pair. For example, a first one of the tiles 132 depicted in FIG. 7 is in the second near-field measurement region 702 with coordinates D;7. In FIG. 7, the first axis 712 and the second axis 714 are perpendicular. Alternatively, the first axis 712 and/or the second axis 714 may have a different range and/or type of coordinate designators.

In the illustrated example of FIG. 7, the fallout controller 100 of FIGS. 1, 2, and/or 3 detects unburned oil droplets in the second near-field measurement region 702. When the unburned oil droplets fall on the tiles 132, the droplets leave dark-colored traces that are clearly visible. The tiles 132 are photographed at the end of a test operation when the flare burner 102 has been extinguished. The fallout controller 100 obtains and processes the images of the tiles 132 to determine total oil fallout from the flare burner 102 during the test operation.

In the illustrated example of FIG. 7, the second far-field measurement region 704 includes a fourth example pattern 716 that represents a stationary rectangular area with a second example length 718 of 100 meters and a second example width 720 of 50 meters. Alternatively, the second length 718 and/or the second width 720 may be different. In FIG. 7, the second far-field measurement region 704 includes 67 of the paper sheets 136 of FIG. 1. Alternatively, there may be fewer or more paper sheets 136 than depicted in FIG. 7. Alternatively, one or more of the paper sheets 136 depicted in FIG. 7 may be replaced with one of the tiles 132.

In the illustrated example of FIG. 7, the fourth pattern 716 includes a first longitudinal side 722, a second longitudinal side 724, and a longitudinal midline 726. In FIG. 7, the first longitudinal side 722, the second longitudinal side 724, and the longitudinal midline 726 are parallel to each other and aligned with a third axis 728. In FIG. 7, the third axis 728 is aligned with the wind direction 142 of FIG. 1.

In the illustrated example of FIG. 7, the fourth pattern 716 includes a first lateral side 730, a second lateral side 732, and a lateral midline 734. In FIG. 7, the first lateral side 730, the second lateral side 732, and the lateral midline 734 are parallel to each other and aligned with a fourth axis 736. In FIG. 7, the fourth axis 736 is perpendicular to the wind direction 142. Alternatively, the fourth axis 736 may not be perpendicular to the wind direction 142.

In the illustrated example of FIG. 7, the longitudinal midline 726 intersects the first lateral side 730 at coordinate A6, which is at a first midpoint 738 of the first lateral side 730. The longitudinal midline 726 intersects the second lateral side 732 at coordinate K6, which is at a second midpoint 740 of the second lateral side 732. The lateral midline 734 intersects the first longitudinal side 722 at coordinate E11 and intersects the second longitudinal side 724 at coordinate E1. Alternatively, the longitudinal midline 726 may intersect the first lateral side 730 and/or the second lateral side 732 at different coordinates than depicted in FIG. 7. Alternatively, the lateral midline 734 may intersect the first longitudinal side 722 and/or the second longitudinal side 724 at different coordinates than depicted in FIG. 7.

In the illustrated example of FIG. 7, the fallout controller 100 detects unburned oil droplets in the second far-field measurement region 704. When the unburned oil droplets fall on the paper sheets 136, the paper sheets 136 absorb the droplets, leaving dark-colored traces that are clearly visible. The dark-colored traces are trapped on the paper sheets 136. In some examples, the paper sheets 136 can be stored without information loss and can be post-processed after a test operation of the flare burner 102. For example, the paper sheets 136 can be photographed at the end of a test operation when the flare burner 102 has been extinguished. In other examples, the fallout controller 100 can analyze and/or otherwise interpret droplet information stored by the paper sheets 136 based on effect(s) from droplet diffluence due to capillary effects. The fallout controller 100 can obtain and process the images of the paper sheets 136 to determine total oil fallout from the flare burner 102 during the test operation.

In the illustrated example of FIG. 7, the paper sheets 136 are not uniformly distributed in the fourth pattern 716 of the second far-field measurement region 704. Alternatively, the paper sheets 136 may be uniformly distributed. In FIG. 7, the first longitudinal side 722 and the second longitudinal side 724 include ones of the paper sheets 136 spaced at ten-meter distance intervals. Alternatively, the spacing of paper sheets 136 on the first longitudinal side 722 and/or the second longitudinal side 724 may be different. In FIG. 7, the longitudinal midline 726, the first lateral side 730, the second lateral side 732, and the lateral midline 734 include ones of the paper sheets 136 spaced at five-meter distance intervals. Alternatively, the spacing of the paper sheets 136 on the longitudinal midline 726, the first lateral side 730, the second lateral side 732, and/or the lateral midline 734 may be different.

In the illustrated example of FIG. 7, each of the paper sheets 136 of the second far-field measurement region 704 is assigned example coordinates (i;j) associated with a position of the paper sheet 136 in the second far-field measurement region 704. In FIG. 7, each of the paper sheets 136 on the first longitudinal line 722 has a corresponding coordinate in a range from A11-J11 where A and J represent the i coordinate and 11 represents the j coordinate to form i;j coordinate pairs. Each of the paper sheets 136 on the second longitudinal line 724 has a corresponding coordinate in a range from A1-J1. Each of the paper sheets 136 on the longitudinal midline 726 has a corresponding coordinate in a range from A6-K6 or $A_\beta 6$-$J_\beta 6$. Each of the paper sheets 136 on the first lateral side 730 has a corresponding coordinate in a range from A1-A11. Each of the paper sheets 136 on the second lateral side 732 has a corresponding coordinate in a range from K1-K11. Each of the paper sheets 136 on the lateral midline 734 has a corresponding coordinate ranging from E1-E11. Alternatively, any other range and/or type of coordinates may be used than those depicted in FIG. 7.

Figure 8A:
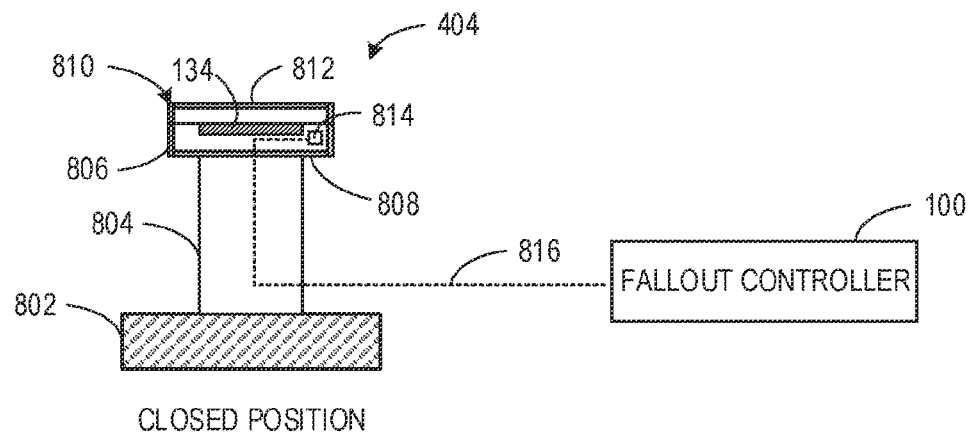
FIG. 8A depicts an example fallout collection device in a closed position.
Figure 8B:
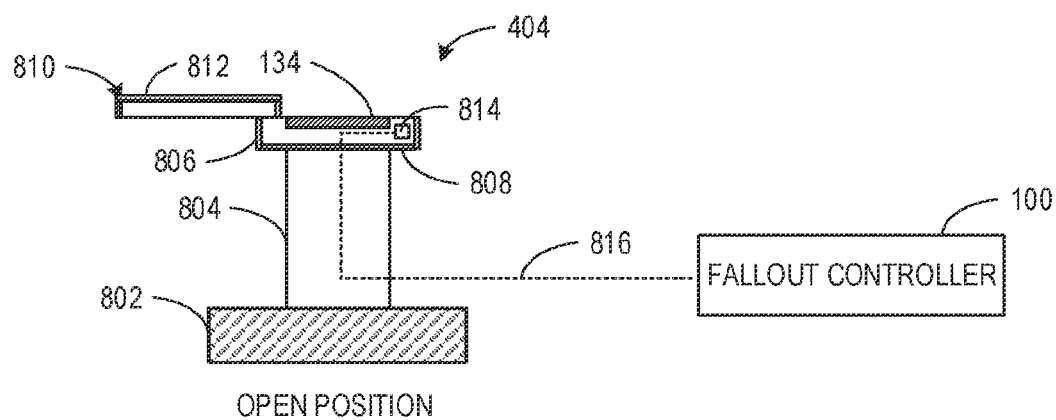
FIG. 8B depicts the example fallout collection device of FIG. 8A in an open position.

FIGS. 8A and 8B depict schematic illustrations of an example implementation of the fallout collection devices 404 of FIGS. 4-6 in a closed position (FIG. 8A) and an open position (FIG. 8B). The fallout collection device 404 of FIGS. 8A-8B is depicted as being disposed on a ground surface 802. The fallout collection device 404 of FIGS. 8A-8B includes an example pedestal structure 804 to elevate a fallout measurement surface such as one of the tiles 132 of FIG. 1 above the ground surface 802. Alternatively, the fallout collection device 404 may include one of the paper sheets 136 of FIG. 1. In FIGS. 8A-8B, the pedestal structure 804 is a concrete block. Alternatively, the pedestal structure 804 may be a cinder block or a metal-based support such as a stainless-steel support. Alternatively, the fallout collection device 404 may use a pole structure or any other shape or type of support structure in place of the pedestal structure 804.

In FIGS. 8A-8B, the example fallout collection device 404 includes an example housing 806 coupled to the pedestal structure 804. The housing 806 includes one of the tiles 132. Alternatively, the housing 806 may include one of the paper sheets 136. Alternatively, the housing 806 may include two or more of either the tiles 132 or the paper sheets 136. Alternatively, the housing 806 may include one or more of any other type of fallout measurement surface.

In the illustrated example of FIGS. 8A-8B, a first example thermo-insulation material 808 covers, surrounds, and/or otherwise encompasses the housing 806. The first thermo-insulation material 808 is a flame-retardant foil. Alternatively, the first thermo-insulation material 808 may be any other type of flame-retardant and/or heat-resistant material. The first thermo-insulation material 808 provides temperature insulation to electronic components included in the housing 806. Advantageously, by coupling the first thermo-insulation material 808 between the pedestal structure 804 and the housing 806, the electronic components included in the housing 806 can be insulated from heat stored by the pedestal structure 804 when the fallout collection device 404 is disposed in the near-field measurement region 128 of FIG. 1, the second near-field measurement region 702 of FIG. 7, etc.

The example implementation of the fallout collection device 404 of FIGS. 8A-8B includes an example slideably moveable surface 810 (e.g., a slideably moveable plate). The slideably moveable surface 810, also referred to herein as the slider 810, is operatively coupled to the housing 806. The slider 810 includes a top example surface 812. In some examples, the top surface 812 includes the first thermo-insulation material 808 coupled to the top surface 812 to isolate the slider structure and example electronic components 814 included in the housing 806 from high-temperature environment conditions of the near-field measurement region 128 of FIG. 1, the second near-field measurement region 702 of FIG. 7, etc. For example, the electronic components 814 can include one or more actuators (e.g., electric actuators, pneumatic actuators, etc.), controllers, motors (e.g., an electric motor with one or more gears, shafts, etc.), communication network devices (e.g., a wired communication network device, a wireless communication network device, etc., and/or a combination thereof), power supplies (e.g., a battery, an alternating current (AC) to direct current (DC) power supply, a DC/DC power supply, etc., and/or a combination thereof), voltage converters, etc., and/or a combination thereof.

In the illustrated example of FIGS. 8A-8B, the slider 810 is operative to move from a first position, or a first configuration, to a second position, or a second configuration. For example, the slider 810 of the fallout collection device 404 can move from a closed position, as depicted in FIG. 8A, to an open position, as depicted in FIG. 8B), in response to a command, a direction, an instruction, a signal, etc., from the fallout controller 100. For example, the fallout controller 100 can transmit a command to the electronic components 814 via an example communication link (e.g., a wired communication link, a wireless communication link, etc.) 816. In such examples, the fallout controller 100 can transmit the command to an actuator operatively coupled to the slider 810 to cause the slider 810 to move from the closed position to the open position.

In some examples, the fallout controller 100 prevents and/or otherwise protects the tile 132 from being exposed to fallout droplets during a transition interval by directing and/or otherwise maintaining the slider 810 in the closed position. In some examples, the fallout controller 100 exposes the tile 132 to fallout droplets from the flare burner 102 during a continuous mode operation by instructing and/or otherwise maintaining the slider 810 in the open position. In some examples, the fallout controller 100 invokes the slider 810 to move to the open position to expose the tile 132 to fallout droplets to measure fallout pollution from the flare burner 102 during a transition interval.

Figure 8C:
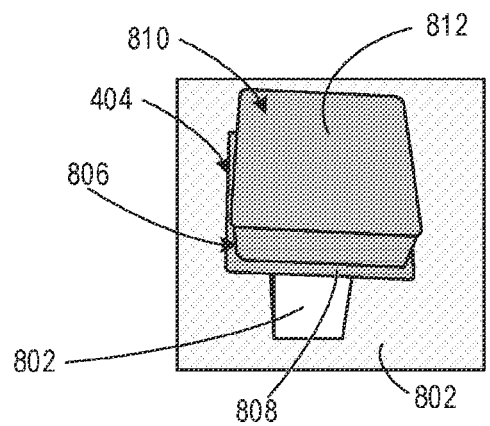
FIG. 8C depicts an isometric view of the example fallout collection device of FIGS. 8A-8B in the closed position.

FIG. 8C is an isometric view of the example fallout collection device 404 of FIGS. 8A-8B. In FIG. 8C, the fallout collection device 404 is in the closed configuration. For example, the slider 810 is positioned to prevent the exposure of the tile 132 to fallout droplets.

Figure 8D:
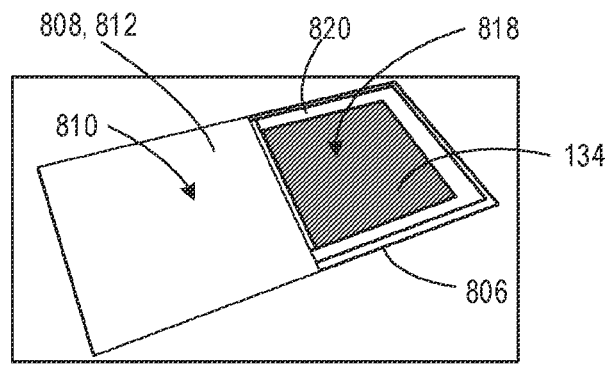
FIG. 8D depicts an isometric view of a portion of the example fallout collection device of FIGS. 8A-8C in the open position.

FIG. 8D is an isometric view of a portion of the fallout collection device 404 of FIGS. 8A-8C depicting the fallout collection device 404 in the open position. The slider 810 includes the first thermo-insulation material 808 coupled to the top and side surfaces 812 of the slider 810. Advantageously, the first thermo-insulation material 808 can protect the slider 810 from overheating and structural deformations.

In the illustrated example of FIG. 8D, the housing 806 includes a first example housing region 818. The first housing region 818 includes the tile 132 and a second example thermo-insulation material 820 surrounding the tile 132. In FIG. 8D, the tile 132 is also disposed on top of the second thermo-insulation material 820. In FIG. 8D, the second thermo-insulation material 820 is composed of a mineral rock wool. Alternatively, the second thermo-insulation material 820 may be a flame-retardant and/or a heat-resistant foam.

Figure 8E:
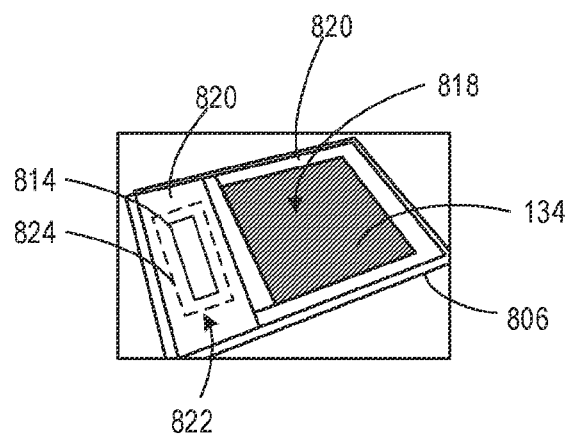
FIG. 8E depicts an isometric view of the portion of the example fallout collection device of FIG. 8D with a top surface removed.

FIG. 8E is an isometric view of the portion of the fallout collection device 404 of FIG. 8D with the slider 810 removed for clarity. In FIG. 8E, the slider 810 is removed to depict the housing 806 including the first housing region 818 of FIG. 8D and a second example housing region 822. The second housing region 822 includes the second thermo-insulation material 820 and an example electronic compartment 824, which includes the electronic components 814 of FIGS. 8A-8B. Alternatively, the housing 806 may include fewer or more housing regions than depicted in FIG. 8E.

Figure 9:
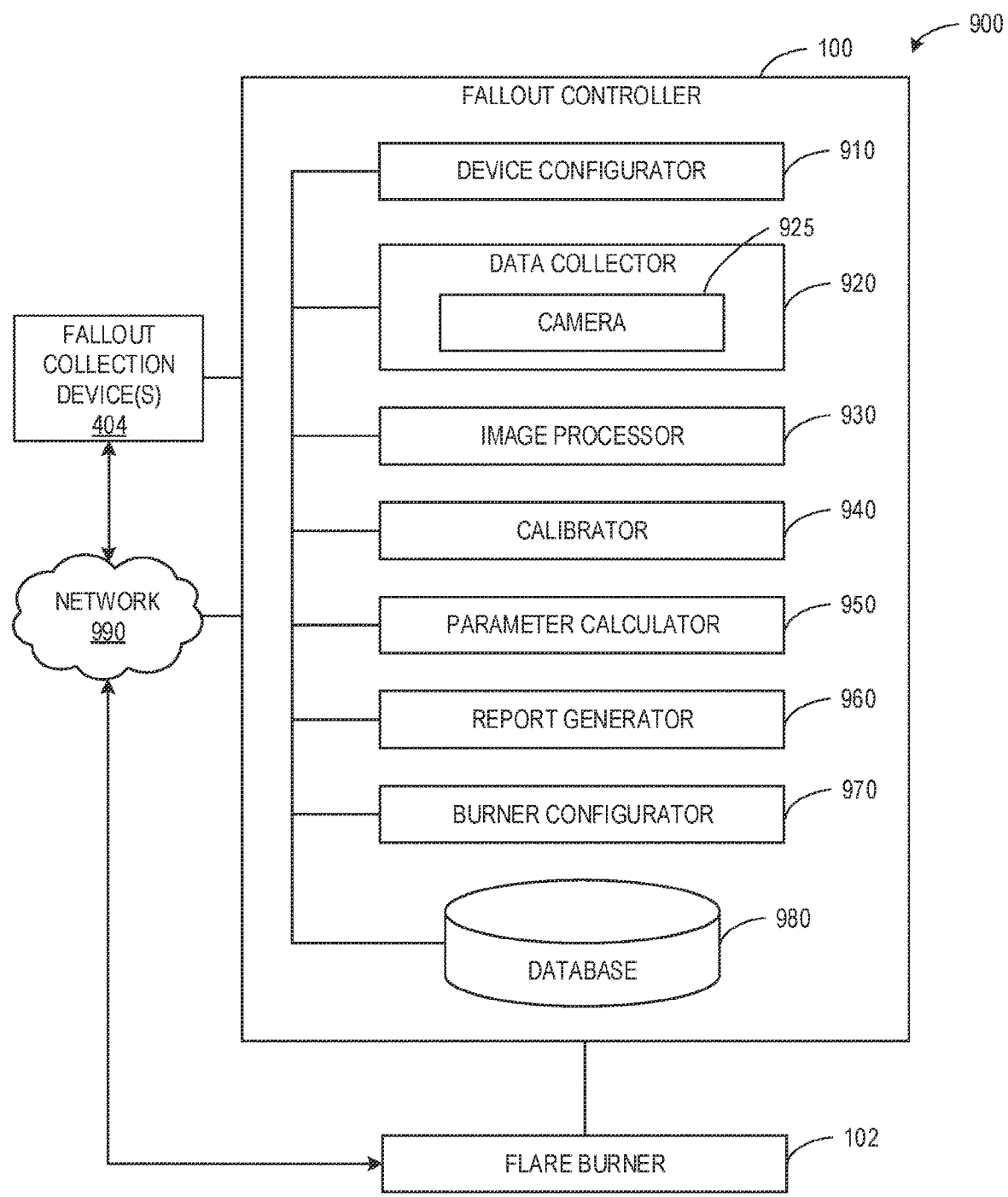
FIG. 9 is a block diagram of an example implementation of an example fallout controller system including the example fallout controller of FIG. 1.

FIG. 9 is a block diagram of an example implementation of an example fallout controller system 900 including the fallout controller 100 of FIGS. 1-3, 7, and 8A-8B. In FIG. 9, the fallout controller system 900 includes the fallout controller 100 to obtain and process fallout data (e.g., near-field fallout data, far-field fallout data, etc.) to modify a configuration of the flare burner 102 of FIGS. 1-7 based on the processed fallout data. In some examples, the fallout controller 100 is operative to adjust a configuration, a position, etc., of the fallout collection devices 404 of FIGS. 4-7 and/or FIGS. 8A-8E based on an operating mode of the flare burner 102. Alternatively, the fallout controller system 900 may not include the fallout collection devices 404.

In the illustrated example of FIG. 9, the fallout controller 100 includes an example device configurator 910, an example data collector 920, an example image processor 930, an example calibrator 940, an example parameter calculator 950, an example report generator 960, an example burner configurator 970, and an example database 980.

Alternatively, the fallout controller 100 of FIG. 9 may not include the device configurator 910.

In the illustrated example of FIG. 9, the fallout controller 100 includes the device configurator 910 to control and/or otherwise manage operation of one(s) of the fallout collection devices 404. In some examples, the device configurator 910 determines a status of the fallout collection devices 404 via an example network 990 (e.g., a direct wired or wireless connection). For example, the device configurator 910 may query one of the fallout collection devices 404 via the network 990 for an operational status, a position, etc., of the fallout collection device 404. In such examples, in response to the query, the fallout collection device 404 can transmit an operational status of operational when the fallout collection device 404 is operating without a fault condition or an operational status of non-responsive when the fallout collection device 404 is offline or is experiencing a fault condition. In other examples, in response to the query, the fallout collection device 404 can transmit a position of either open or closed, a percentage open or closed of the slider 810, etc. For example, the device configurator 910 can determine that one of the fallout collection devices 404 is open, 95% open, etc., based on querying the fallout collection device 404.

In some examples, the device configurator 910 instructs one or more of the fallout collection devices 404 to transition and/or otherwise move from a first position (e.g., a closed position) to a second position (e.g., an open position) based on an operation mode of the flare burner 102. For example, the device configurator 910 can instruct one or more of the fallout collection devices 404 to open and/or otherwise expose an enclosed one of the tiles 132, the paper sheets 136, etc., to fallout exposure from the flare burner 102 when the flare burner 102 is performing a continuous mode operation. In other examples, the device configurator 910 can instruct one or more of the fallout collection devices 404 to open and/or otherwise expose an enclosed one of the tiles 132, the paper sheets 136, etc., to fallout exposure from the flare burner 102 when the flare burner 102 is performing a start-up or a shut-down operation. In such examples, the device configurator 910 can transmit a command to one or more of the fallout collection devices 404 via the network 990 or via a direct wired or wireless connection.

In some examples, the device configurator 910 instructs one or more of the fallout collection devices 404 to transition and/or otherwise move from the second position (e.g., the open position) to the first position (e.g., the closed position) based on an operation mode of the flare burner 102. For example, the device configurator 910 can instruct one or more of the fallout collection devices 404 to close and/or otherwise isolate opened ones of the tiles 132, the paper sheets 136, etc., from fallout exposure from the flare burner 102 when the flare burner 102 is performing a start-up or a shut-down operation. In other examples, the device configurator 910 can instruct one or more of the fallout collection devices 404 to close and/or otherwise isolate opened ones of the tiles 132, the paper sheets 136, etc., from fallout exposure from the flare burner 102 when the flare burner 102 is performing a continuous mode operation. In such examples, the device configurator 910 can transmit a command to one or more of the fallout collection devices 404 via the network 990.

In the illustrated example of FIG. 9, the fallout controller 100 includes the data collector 920 to capture, measure, and/or otherwise obtain fallout data. In FIG. 9, the data collector 920 includes an example camera 925 to capture a still-image and/or video (e.g., one or more video frames) of a fallout measurement surface. The camera 925 of the illustrated example is a digital camera including an image sensor chip that translates light reflected from the tiles 132, the paper sheets 136, etc., into one or more machine-readable numbers (e.g., binary numbers, hex codes, etc.). For example, the camera 925 can capture and process an image of the tiles 132, the paper sheets 136, etc., and/or a combination thereof. For example, the camera 925 can generate a processed image of the tiles 132, the paper sheets 136, etc., including machine-readable numbers corresponding to detectable features included in the image of the tiles 132, the paper sheets 136, etc. In some examples, the camera 925 can transmit the processed image (e.g., the machine-readable numbers) of the tiles 132, the paper sheets 136, etc., to at least the image processor 930 of FIG. 9.

In the illustrated example of FIG. 9, the fallout controller 100 includes the data collector 920 to obtain images of fallout measurement surfaces such as ones of the tiles 132 and/or the paper sheets 136. In some examples, the data collector 920 obtains the images with the camera 925. For example, the data collector 920 can capture an image of one or more of the tiles 132 with a digital camera, a video camera, a scanner, etc., corresponding to the camera 925 of FIG. 9. In other examples, the data collector 920 can capture an image of one or more of the paper sheets 136 with the camera 925.

In some examples, the data collector 920 selects a fluid to process in a droplet size calibration operation. For example, the data collector 920 can select to sample and/or obtain a fluid from the test fluid source 114, the hydrocarbon source 116, etc., to process. In some examples, the data collector 920 obtains parameters (e.g., operation parameters) associated with the samples. For example, the data collector 920 can obtain an ambient temperature at which the sample was taken, a density of the sample, a viscosity of the sample, etc.

In some examples, the data collector 920 generates coordinates at which fallout measurement surfaces are disposed in a measurement region. For example, the data collector 920 can generate coordinate pairs for each of the tiles 132 and/or the paper sheets 136 of FIG. 1. For example, the data collector 920 can generate coordinates D;7 for a first one of the tiles 132 in the second near-field measurement region 702 of FIG. 7. In response to generating the coordinates, an operator or a technician can install and/or otherwise dispose the first one of the tiles 132 at the coordinates D;7 in the second near-field measurement region 702.

In the illustrated example of FIG. 9, the fallout controller 100 includes the image processor 930 to generate fallout data by translating and/or otherwise converting the images captured by the camera 925 and/or, more generally, the data collector 920, into digital data using computer-based image analysis. In some examples, fallout data includes near-field fallout data and/or far-field fallout data. As used herein, the term "fallout data" refers to digital information associated with fallout droplets on a fallout measurement surface such as the tiles 132 of FIG. 1 and/or the paper sheets 136 of FIG. 1. For example, near-field fallout data can include digital data associated with images captured with the camera 925 of near-field fallout droplets on the tiles 132 and/or, more generally the tiles 132. In other examples, far-field fallout data can include digital data associated with images captured with the camera 925 of far-field fallout droplets on the paper sheets 136 and/or, more generally, the paper sheets 136.

In some examples, the fallout data includes information associated with parameters of an operation (e.g., a test operation, a waste-burner operation, etc.) of the flare burner 102. For example, the fallout data can include operation parameters including an ambient temperature during the operation, a density of fluid provided by the test fluid source 114, a viscosity of the fluid provided by the test fluid source 114, etc. In some examples, the fallout data includes a weight of a fallout measurement surface. For example, the fallout data can include a weight of one of the tiles 132, one of the paper sheets 136, etc., without fallout droplets disposed thereon. In other examples, the fallout data can include a weight of one of the tiles 132, one of the paper sheets 136, etc., including fallout droplets disposed thereon. In some examples, the fallout data includes a surface area of a fallout droplet on a fallout measurement surface. For example, the fallout data can include a droplet diameter, a surface area (e.g., a spot area, a fallout spot area, etc.), etc., for a plurality of fallout droplets on one or more of the tiles 132, one or more of the paper sheets 136, etc.

In some examples, the image processor 930 identifies color boundaries of fallout droplets. For example, the image processor 930 can associate a pixel of an image with a blue color, a brown color, a black color, etc. For example, the image processor 930 can aggregate a plurality of pixels associated with a blue color to form or identify a spot corresponding to the test fluid source 114. In other examples, the image processor 930 can aggregate a plurality of pixels associated with a black color and/or a brown color to form or identify a spot corresponding to the hydrocarbon source 116.

In some examples, the image processor 930 crops images of fallout measurement surfaces by determining fallout data boundaries. For example, the image processor 930 can process an image of one of the tiles 132 by determining an outer boundary or edge of the fallout measurement surface image. The outer boundary can correspond to the fallout data boundary that defines an area in which all the fallout droplets and corresponding fallout data of a color boundary of interest are included. For example, the image processor 930 can determine an outer boundary of the fallout measurement surface image to include all of the brown and/or black colored spots and all of the surrounding white color clean surface. The image processor 930 can crop and/or otherwise eliminate information external to the fallout data boundary, such as a sidewall of the slider 810, a nameplate coupled to the fallout measurement surface, etc. In some examples, the image processor 930 performs a one-by-one pixel analysis of pixels included in the fallout data boundary. For example, the image processor 930 can group pixels of a fallout droplet together that can be used by the parameter calculator 950 to calculate a spot area of the fallout droplet based on the associated pixels of the fallout droplet.

In some examples, the image processor 930 performs a line-by-line recognition and eliminates pixels corresponding to the test fluid source 114 of FIGS. 1-3. For example, the image processor 930 can analyze fallout droplets included in a fallout data boundary and re-color ones of the fallout droplets that correspond to the test fluid source 114 to a background color of the image (e.g., re-color blue-colored isopropanol fallout droplets to a white color of the image background). For example, fallout associated with the test fluid source 114 can correspond to a start-up and/or shutdown operation of the flare burner 102 and are excluded when determining fallout corresponding to the continuous mode operation of the flare burner 102. In some examples, the image processor 930 can subtract re-colored fallout droplets from an overall area of a fallout measurement surface image and, thus, can make a correction of A eff as described below in the example of Equation (4).

In some examples, the image processor 930 calculates an area of a fallout droplet on a fallout measurement surface. For example, the image processor 930 can convert an image of one of the tiles 132 to fallout data. The image processor 930 can generate a fallout droplet by grouping pixels of similar colors or color boundaries. The image processor 930 can calculate an area of the fallout droplet based on the associated pixels. In some examples, the image processor 930 calculates an effective diameter of the fallout droplet spot based on the area of the fallout droplet spot as described below in connection with Equation (1):

$$D=\sqrt{4S/\pi} \qquad \text{Equation (1)}$$

In the example of Equation (1) above, an effective diameter of the fallout spot (D) is based on the spot area S.

In the illustrated example of FIG. 9, the fallout controller 100 includes the calibrator 940 to determine a correlation of spot size of fallout droplet on a fallout measurement surface to a volume of the fallout droplet. In some examples, the calibrator 940 selects a measurement surface type to process. For example, the calibrator 940 can select a tile measurement surface such as one of the tiles 132, or similar tile, and/or a paper sheet measurement surface such as one of the paper sheets 136, or similar paper sheet, to process. In some examples, the calibrator 940 generates a correlation, such as a spot area to droplet volume correlation (referred to herein as a "diffluence correlation" or "diffluence calibration correlation"), for each measurement surface type (e.g., a tile diffluence correlation, a paper sheet diffluence correlation, etc.) and/or fluid type (e.g., a first oil type diffluence correlation, a second oil type diffluence correlation, etc.). In such examples, the calibrator 940 can generate the correlation using any type and/or quantity of calibration methods.

In some examples, the calibrator 940 generates the diffluence correlation by comparing a first weight of a calibration measurement surface to a second weight of the calibration measurement surface. For example, the calibrator 940 can obtain the first weight corresponding to a calibration tile without fluid droplets. The calibrator 940 can obtain the second weight corresponding to the calibration tile including a plurality of specifically generated and/or deposited fluid droplets that are of the same type (e.g., the same type of oil) and same size (e.g., the same volume). For example, the plurality of the specifically generated and/or deposited fluid droplets can be generated using a chemical-precise syringe.

In some examples, the calibrator 940 generates the diffluence correlation based on the comparison. For example, the calibrator 940 can calculate a difference of the first weight and the second weight. The calibrator 940 can calculate a ratio of (1) the difference and (2) a quantity of the plurality of the fluid droplets and a density of the selected fluid to generate an average volume of each of the plurality of the fluid droplets. In some examples the calibrator 940 determines an average size (spot area or equivalent diameter) of each of the plurality of spots of the fluid droplets on the measurement surface and defines the diffluence correlation of droplet-volume-to-spot-size.

In some examples, the calibrator 940 generates a diffluence correlation function (e.g., a spot area to droplet volume correlation as a function of spot size) by calculating an average volume of a fluid droplet for a plurality of droplet sizes of the same fluid type. For example, the calibrator 940 can calculate a first average volume associated with a first size of a fluid type, a second average volume associated with a second size of the fluid type, etc. In some examples, the calibrator 940 generates the diffluence correlation function associated with the fluid type based on the calculated average volumes and corresponding average spot sizes for a plurality of fallout droplet sizes for the fluid type.

In the illustrated example of FIG. 9, the fallout controller 100 includes the parameter calculator 950 to calculate parameters associated with fallout droplets on a fallout measurement surface. In some examples, the parameter calculator 950 calculates a volume of a fallout droplet as described below in connection with the example of Equation (2):

$$V = f(S) \quad \text{Equation (2)}$$

In the example of Equation (2) above, the parameter calculator 950 can calculate the volume (V) of a fallout droplet based on (1) the corresponding fallout spot area (S) on the measurement surface and (2) the diffluence correlation function $f(S)$, which was defined as described above by the calibrator 940 for the fluid and measurement surface type. For example, the parameter calculator 950 can calculate a volume of hydrocarbon fallout droplet deposited on a surface of the tile 132.

In some examples, the parameter calculator 950 calculates a total volume of fallout droplets on one or more fallout measurement surfaces. For example, the image processor 930 can calculate data including a spot diameter and an area for a plurality of fallout droplets on one of the paper sheets 136 and transmit the data to the parameter calculator 950. The parameter calculator 950 can calculate a total volume ($V_0$) corresponding to the plurality of fallout droplets (indexed with i) on the single paper sheet 136 based on the plurality of spot diameters and associated areas ($S_i$) of the plurality of fallout droplets as described below in the example of Equation (3):

$$V_0 = \sum_i f(S_i). \quad \text{Equation (3)}$$

In some examples, the parameter calculator 950 calculates a total fallout volume as a sum of a near-field fallout volume and a far-field fallout volume. For example, the parameter calculator 950 can calculate the near-field fallout volume by calculating a fallout volume of each one of the tiles 132 in the near-field measurement region 128 of FIG. 1. The parameter calculator 950 can calculate the near-field fallout volume by extrapolating the plurality of fallout volumes of the tiles 132 to the entire near-field measurement region 128. In other examples, the parameter calculator 950 can calculate the far-field fallout volume by calculating a fallout volume of each one of the paper sheets 136 in the far-field measurement region 130 of FIG. 1. The parameter calculator 950 can calculate the far-field fallout volume by extrapolating the plurality of fallout volumes of the paper sheets 136 to the entire far-field measurement region 130. In some examples, the parameter calculator 950 calculates a fallout efficiency based on the total fallout volume.

In some examples, the parameter calculator 950 determines whether the fallout efficiency satisfies a fallout efficiency threshold. For example, the parameter calculator 950 can compare the fallout efficiency to the fallout efficiency threshold and determine that the fallout efficiency satisfies the fallout efficiency threshold based on the comparison. For example, the parameter calculator 950 can determine that a fallout efficiency (e.g., a calculated fallout efficiency) of 99% satisfies a fallout efficiency threshold of 98% based on the fallout efficiency being greater than the fallout efficiency threshold. In other examples, the parameter calculator 950 can determine that a fallout efficiency of 97% does not satisfy a fallout efficiency threshold of 98% based on the fallout efficiency being less than the fallout efficiency threshold. For example, the parameter calculator 950 can determine that the configuration of the flare burner 102 generates more fallout than a fallout tolerance level required for a waste-burning operation.

In some examples, the parameter calculator 950 calculates a fallout surface density. The fallout surface density can correspond to fallen unburned oil volume per unit of surface area. In some examples, the parameter calculator 950 calculates the fallout surface density ($\sigma$) (e.g., a density expressed in terms of microliters per square meter) at every point with coordinates (x; y) of the first pattern 134 and/or the second pattern 138 of FIG. 1 as described below in the example of Equation (4):

$$\sigma(x; y) = \frac{V_0(x; y)}{A_{\textit{eff}}(x; y)} \quad \text{Equation (4)}$$

In the example of Equation (4) above, the term $V_0$ represents the total fallout droplet volume of the corresponding tile 132 or paper sheet 136 of FIG. 1 located at the coordinate (x; y). In the example of Equation (4) above, the term $A_{\textit{eff}}$ represents an effective surface area of the corresponding tile 132 or paper sheet 136.

In the illustrated example of FIG. 9, the fallout controller 100 includes the report generator 960 to generate a report or a log associated with a test operation of the flare burner 102. In some examples, the report generator 960 generates a report associated with a plurality of the tiles 132 and/or a plurality of the paper sheets 136. In some examples, the report generator 960 generates a report for each of the tiles 132 and/or each of the paper sheets 136. For example, the report for one of the tiles 132 and/or one of the paper sheets 136, etc., can include a quantity of separate fallout droplets recognized by the image processor 930, an average diameter of the identified fallout droplets, a scaling coefficient, a covering factor of fallout droplets (e.g., a percentage of the tile 132 or the paper sheet 136 covered with the fallout droplets), a total volume of the identified fallout droplets, etc.

In some examples, the report generator 960 generates the report to include a histogram or other plot type based on the volumes associated with the identified fallout droplets. In some examples, the report includes a configuration, a position, etc., of the fallout collection devices 404. In some examples, the report includes coordinates of the tiles 132, the paper sheets 136, and/or the fallout collection devices 404. In some examples, the report includes operating parameters, a configuration, a position, etc. of the flare burner 102.

In some examples, the report generator 960 generates a recommendation to adjust and/or otherwise modify the flare burner 102 of FIG. 1 based on the total fallout volume, the fallout efficiency, etc., associated with a test operation of the flare burner 102. For example, the report generator 960 can generate a recommendation to adjust a flow rate of one or more of the pressurized air source 110, the test fluid source 114, the hydrocarbon source 116, etc., of FIGS. 1-3. In other examples, the report generator 960 can generate a recommendation to adjust a configuration of the flare burner 102, such as an angle of inclination of the flare burner 102.

In the illustrated example of FIG. 9, the fallout controller 100 includes the burner configurator 970 to adjust a configuration or a parameter of the flare burner 102. In some examples, the burner configurator 970 adjusts a configuration of the flare burner 102 based on a recommendation generated by the report generator 960. For example, the burner configurator 970 can adjust a flow rate of one or more of the pressurized air source 110, the test fluid source 114, the hydrocarbon source 116, etc., of FIGS. 1-3 based on the recommendation generated by the report generator 960. In other examples, the burner configurator 970 can adjust an angle of inclination associated with the flare burner 102 based on the recommendation prepared by the report generator 960.

In some examples, the burner configurator 970 operates the flare burner 102. For example, the burner configurator 970 can direct the flare burner 102 to operate using pressurized air from the pressurized air source 110 of FIG. 1. In such examples, the burner configurator 970 can flush out the flare burner 102 by using the pressurized air source 110.

In some examples, the burner configurator 970 instructs the flare burner 102 to operate using fluid from the test fluid source 114 during a start-up and/or a shut-down operation. For example, the burner configurator 970 can invoke the flare burner 102 to use the test fluid source 114 to initialize the flame plume 124 during a start-up operation or de-stabilize the flame plume 124 while extinguishing the flame plume 124 during a shut-down operation. In such examples, the burner configurator 970 can control the first control valve 202, the second control valve 204, and/or the pump 208 of FIGS. 2-3, and/or, the first manifold valve 304 and/or the second manifold valve 306 of FIG. 3. For example, the burner configurator 970 can adjust a speed of the pump 208, open one(s) of the first control valve 202, the second control valve 204, the first manifold valve 304 and/or the second manifold valve 306, close one(s) of the first control valve 202, the second control valve 204, and/or the pump 208 of FIGS. 2-3, and/or, the first manifold valve 304 and/or the second manifold valve 306, etc., as described above in connection with FIGS. 2 and/or 3.

In some examples, the burner configurator 970 operates the flare burner 102 by using the hydrocarbon source 116 of FIGS. 1-3. For example, the burner configurator 970 can instruct the flare burner 102 to perform a continuous mode operation by burning fluid from the hydrocarbon source 116. For example, the burner configurator 970 can control the first control valve 202, the second control valve 204, and/or the pump 208 of FIGS. 2-3, and/or, the first manifold valve 304 and/or the second manifold valve 306 of FIG. 3 as described above in connection with FIGS. 2 and/or 3 to operate the flare burner 102 using the hydrocarbon source 116.

In the illustrated example of FIG. 9, the fallout controller 100 includes the database 980 to record data (e.g., diffluence correlation functions, test operation parameters, fallout efficiencies, droplet volumes, etc.). The database 980 can be implemented by a volatile memory (e.g., a Synchronous Dynamic Random Access Memory (SDRAM), Dynamic Random Access Memory (DRAM), RAMBUS® Dynamic Random Access Memory (RDRAM®), etc.) and/or a non-volatile memory (e.g., flash memory). The database 980 can additionally or alternatively be implemented by one or more double data rate (DDR) memories, such as DDR, DDR2, DDR3, mobile DDR (mDDR), etc. The database 980 can additionally or alternatively be implemented by one or more mass storage devices such as hard disk drive(s), compact disk drive(s) digital versatile disk drive(s), etc. While in the illustrated example the database 980 is illustrated as a single database, the database 980 can be implemented by any number and/or type(s) of databases. Furthermore, the data stored in the database 980 can be in any data format such as, for example, binary data, comma delimited data, tab delimited data, structured query language (SQL) structures, etc.

In the fallout controller system 900 of FIG. 9, the fallout controller 100, the flare burner 102, and the fallout collection device(s) 404 are communicatively coupled to the network 990. The network 990 of the illustrated example of FIG. 9 is the Internet. However, the network 990 can be implemented using any suitable wired and/or wireless network(s) including, for example, one or more data buses, one or more Local Area Networks (LANs), one or more wireless LANs, one or more cellular networks, one or more private networks, one or more public networks, etc. In some examples, the network 990 of FIG. 9 can implement the communication link 126 of FIGS. 1-3 and/or the communication link 816 of FIGS. 8A-8B.

In some examples, the network 990 enables the fallout controller 100 to be in communication with the flare burner 102, the fallout collection device(s) 404, and/or an external computing device coupled to the network 990. For example, the fallout controller 100 can obtain information (e.g., a configuration of the flare burner 102, a parameter of the flare burner 102, etc.) from the flare burner 102 via the network 990. In other examples, the fallout controller 100 can obtain information (e.g., a configuration, a position, etc.) from the fallout collection device(s) 404 via the network 990.

In some examples, the network 990 enables the fallout controller 100 to communicate with an external computing device (e.g., a database, a server, etc.) to store the information obtained by the fallout controller 100. In such examples, the network 990 enables the fallout controller 100 to retrieve and/or otherwise obtain the stored information for processing. In some examples, the fallout controller 100 is communicatively coupled to the fallout collection device(s) 404 and/or the flare burner 102 not through the network 990. For example, the fallout controller 100 may be communicatively coupled with the fallout collection device(s) 404 and/or the flare burner 102 via a direct wired or wireless connection.

In some examples, the network 990 is a cloud-based network, which can perform cloud-based data storage, analytics, big data analysis, deep machine learning, etc., to enable multi-well, multi-flare burning-scale modeling, digital oilfield high-efficiency operations and automation, oil-gas well testing management and/or optimization based on information obtained and/or processed by the fallout controller 100. The fallout controller 100 can be an Internet of Things (IoT) device enabled to facilitate capturing, communicating, analyzing, and acting on data generated by networked objects and machines. A plurality of fallout controllers 100 of FIG. 9 can additionally or alternatively be deployed via the network 990 to monitor a plurality of the flare burners 102.

While an example manner of implementing the fallout controller 100 of FIG. 1 is illustrated in FIG. 9, one or more of the elements, processes, and/or devices illustrated in FIG. 9 may be combined, divided, re-arranged, omitted, eliminated, and/or implemented in any other way. Further, the example device configurator 910, the example data collector 920, the example camera 925, the example image processor 930, the example calibrator 940, the example parameter calculator 950, the example report generator 960, the example burner configurator 970, the example database 980, and/or, more generally, the example fallout controller 100 of FIG. 1 may be implemented by hardware, software, firmware, and/or any combination of hardware, software, and/or firmware. Thus, for example, any of the example device configurator 910, the example data collector 920, the example camera 925, the example image processor 930, the example calibrator 940, the example parameter calculator 950, the example report generator 960, the example burner configurator 970, the example database 980, and/or, more generally, the example fallout controller 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example device configurator 910, the example data collector 920, the example camera 925, the example image processor 930, the example calibrator 940, the example parameter calculator 950, the example report generator 960, the example burner configurator 970, and/or the example database 980 is/are hereby expressly defined to include a non-transitory computer readable storage device or storage disk such as a memory, a digital versatile disk (DVD), a compact disk (CD), a Blu-ray disk, etc., including the software and/or firmware. Further still, the example fallout controller 100 of FIG. 1 may include one or more elements, processes, and/or devices in addition to, or instead of, those illustrated in FIG. 9, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
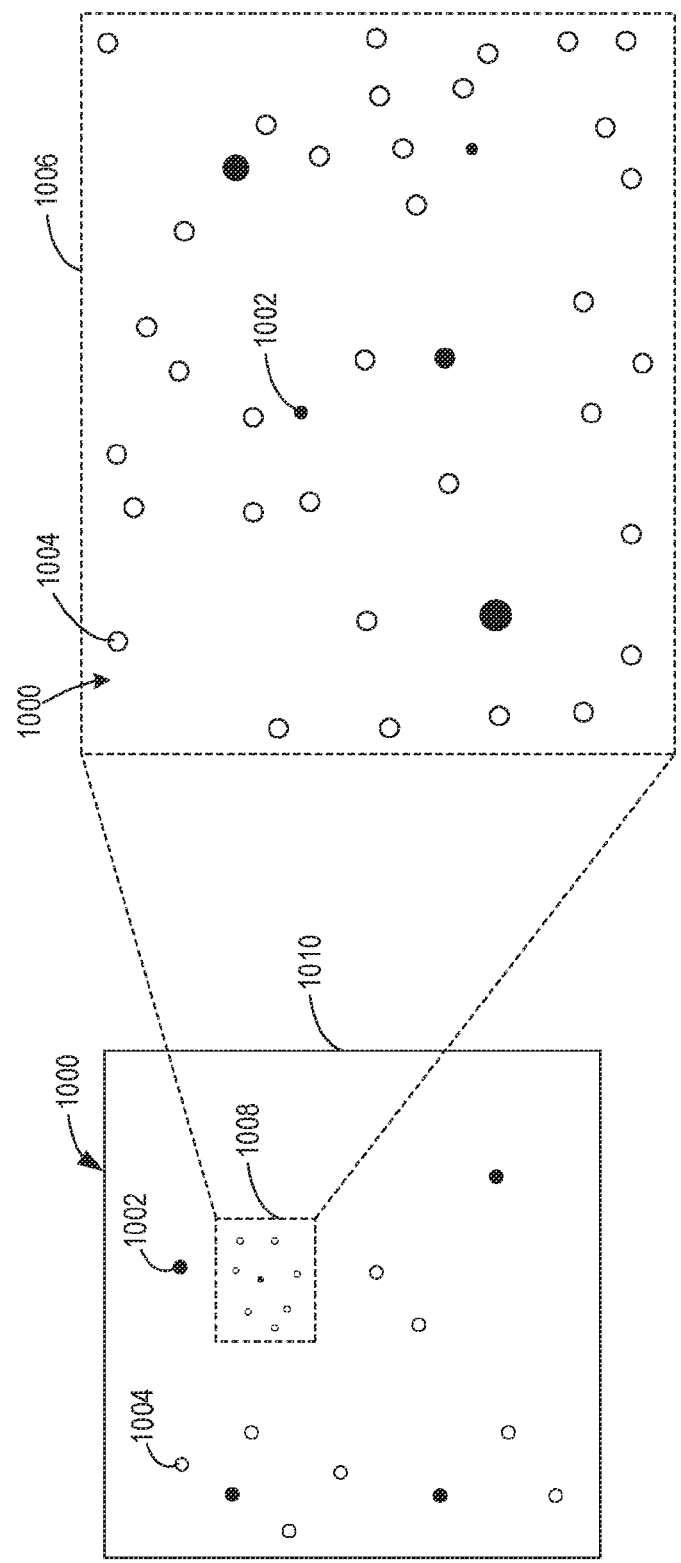
FIG. 10 depicts an example image captured by a camera of a tile measurement surface after a flare burner operation.

FIG. 10 depicts an example image 1000 of one of the tiles 132 of FIG. 1 after a flare burner operation (e.g., a test operation, a waste-burner operation, etc.). For example, the image 1000 of FIG. 10 can be captured by the camera 925 of FIG. 9 and/or, more generally, the fallout controller 100 of FIGS. 1-3, 7, 8A-8B, and 9. In FIG. 10, the image 1000 includes first fallout droplets 1002 represented by filled circles and second fallout droplets 1004 represented by non-filled circles. In FIG. 10, the first fallout droplets 1002 are from the hydrocarbon source 116 of FIGS. 1-3 and correspond to fallout during a continuous mode operation of the flare burner 102. For example, the first fallout droplets 1002 can be a brown color or a black color. FIG. 10 depicts an enlarged view 1006 of a portion 1008 of the image 1000 for clarity. FIG. 10 also depicts a fallout data boundary 1010.

In the illustrated example of FIG. 10, the second fallout droplets 1004 are from the test fluid source 114 of FIGS. 1-3 and correspond to fallout during a start-up operation or a shut-down operation of the flare burner 102. For example, the second fallout droplets 1004 can correspond to the test fluid source 114 including an inorganic colorant. In such example, the second fallout droplets 1004 can have a blue color or other color that contrasts to brown or black. Alternatively, in examples where the test fluid source 114 is clear and transparent and/or has a high vapor saturation pressure, the image 1000 may not include the second fallout droplets 1004 because the second fallout droplets 1004 are not visible and/or evaporate prior to capturing of the image 1000. In such examples, no colorant may be added to the test fluid source 114 and, thus, the clean test fluid deposited on the tile 132 may, not leave color traces (e.g., colored spots, such as the second fallout droplets 1004). Advantageously, the elimination of the second fallout droplets 1004 can improve image processing of the image 1000 by using simpler image-processing techniques, using fewer computational resources (e.g., fewer processor, memory, storage, etc., resources).

The image 1000 of the illustrated example of FIG. 10 is of one of the tiles 132 not included in one of the fallout collection devices 404 because of the presence of the second fallout droplets 1004. Alternatively, in examples where the tile 132 is included in one of the fallout collection devices 404 of FIGS. 4-8B, the image 1000 alternatively may include only the first fallout droplets 1002. Advantageously, in such examples, the fallout controller 100 can perform flare burner fallout measurements without the use of the test fluid source 114 because the slider 810 of fallout collection devices 404 can shield the tile 132 from fallout exposure of the flare burner 102.

Figure 11:
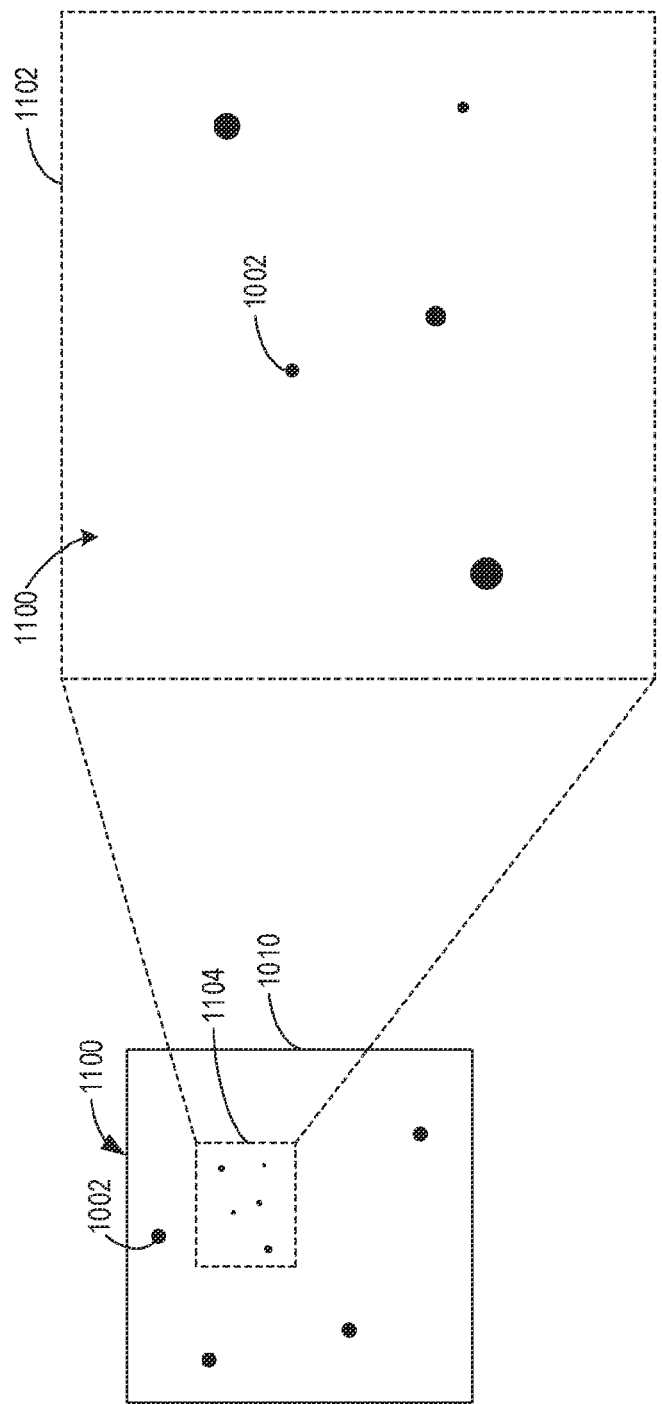
FIG. 11 depicts an example computer-processed image of the example image of FIG. 10 generated by the example fallout manager apparatus of FIGS. 1 and/or 9.

FIG. 11 depicts an example processed image (e.g., computer-processed image) 1100 of the image 1000 of FIG. 10. For example, the processed image 1100 can be generated by the image processor 930 of FIG. 9 and/or, more generally, the fallout controller 100 of FIGS. 1-3, 7, 8A-8B, and 9. In FIG. 11, the processed image 1100 is a monochrome bitmap image. Alternatively, the processed image 1100 may be a non-monochrome image and/or a non-bitmap (BMP) image (e.g., a JPEG image, a PNG image, etc.). The fallout controller 100 generates the processed image 1100 by removing the second fallout droplets 1004 of FIG. 10. The second fallout droplets 1004 are removed to prevent fallout droplets associated with a start-up operation and/or a shut-down operation from impacting a fallout measurement corresponding to a continuous mode operation of the flare burner 102 of FIGS. 1-7 and 9. FIG. 11 also depicts an enlarged view 1102 of a portion 1104 of the processed image 1100 for clarity.

The fallout controller 100 can generate the processed image 1100 by cropping the image 1000 of FIG. 10 based on the fallout data boundary 1010 of FIG. 10. For example, the fallout controller 100 can determine the fallout data boundary 1010 of FIG. 10 by identifying an outer boundary within that an entirety of the measurement surface is included. The fallout controller 100 can crop the image 1000 of FIG. 10 to a size of the fallout data boundary 1010 to generate the processed image 1100 of FIG. 11. In response to cropping the image 1000, the fallout controller 100 can calculate a scaling coefficient (e.g., a conversion from a physical length to a quantity of pixels) based on a size of the processed image 1100 of FIG. 11 with respect to a physical size of the fallout measurement surface.

In the illustrated example of FIG. 11, the fallout controller 100 generates spot arrays based on recognizing pixels included in the processed image 1100 occupied by the first fallout droplets 1002 of FIG. 10 according to a corresponding color boundary (e.g., a brown color boundary, a black color boundary, etc.). For example, the fallout controller 100 can identify a first pixel of the processed image 1100 and associate a brown color boundary corresponding to the hydrocarbon source 116 of FIGS. 1-3 to the first pixel. The fallout controller 100 can associate the first pixel and pixels proximate to the first pixel of the same brown color boundary to a spot array to generate or identify a fallout spot. The fallout controller 100 can create the spot array to include coordinates of each of the associated pixels. The fallout controller 100 can calculate a spot area based on the spot array (e.g., the identified spot) and calculate a diameter of a fallout spot based on the spot area as described above in the example of Equation (1).

Figure 12:
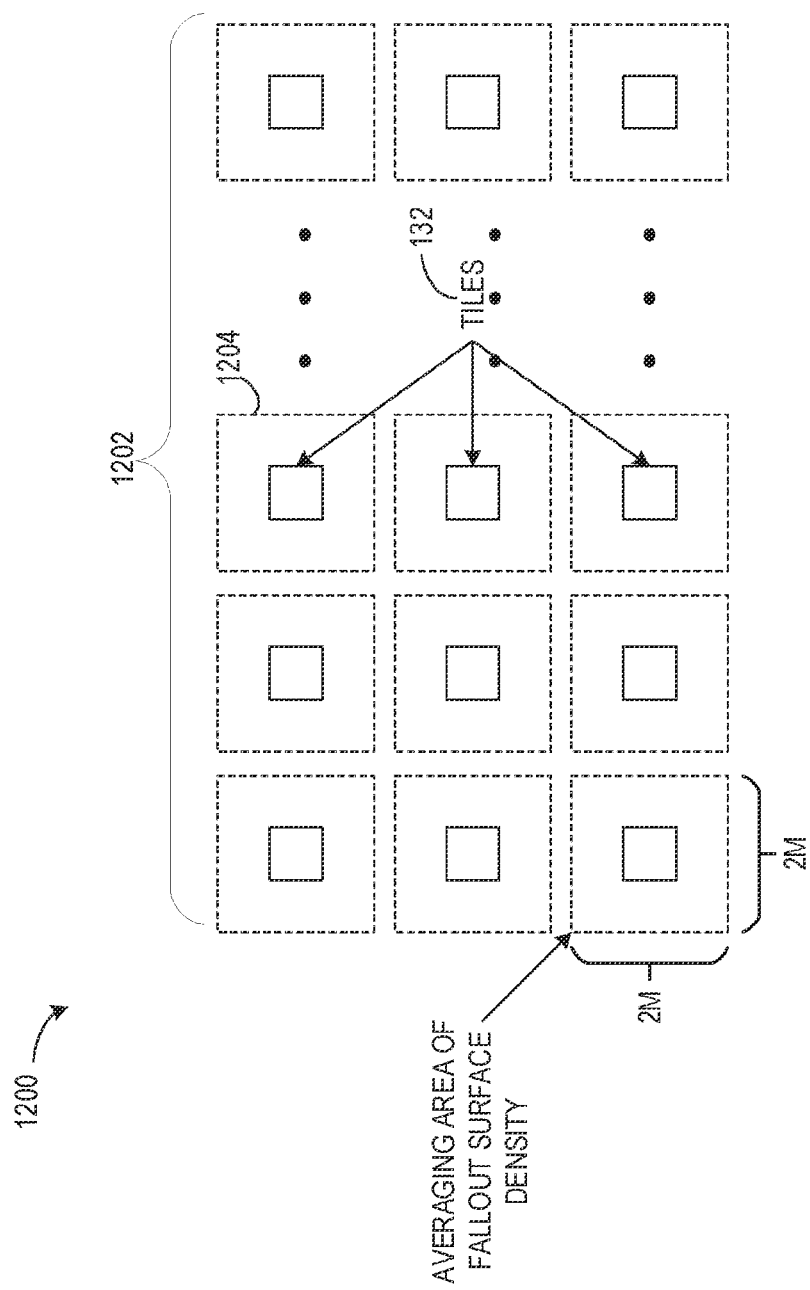
FIG. 12 is a schematic illustration of an example extrapolation operation executed by the example fallout controller of FIGS. 1 and/or 9 to calculate an example total near-field fallout volume.

FIG. 12 is a schematic illustration of an example extrapolation operation 1200 to calculate a total near-field fallout volume. For example, the extrapolation operation 1200 of FIG. 12 can be executed by the parameter calculator 950 of FIG. 9 and/or, more generally, the fallout controller of FIGS. 1-3, 7, 8A-8B, and 9. The total near-field fallout volume represents an estimate of a total volume of fallout disposed in a near-field measurement region 1202 (e.g., the near-field measurement region 128 of FIG. 1, the second near-field measurement region 702 of FIG. 7, etc.).

In some examples, the fallout controller 100 calculates the total near-field fallout volume by calculating a surface density associated with the hydrocarbon fluid droplets according to the example of Equation (4) above. The calculated surface density can be based on the processed image 1100 of FIG. 11 that includes fallout disposed on the individual tiles 132 of FIG. 1 after a flare burner operation. In response to calculating the surface density for each of the tiles 132, the fallout controller 100 can extrapolate the fallout disposed on the tiles 132 to an entirety of the near-field measurement region 1202.

In the illustrated example of FIG. 12, the fallout controller 100 defines and/or otherwise generates example geometric areas 1204 that surround the tiles 132. In FIG. 12, the geometric areas 1204 are squares with dimensions of two meters (2 M) by two meters, allocated according to the first pattern 134 of FIG. 1. Alternatively, the geometric areas 1204 may be any other geometric shape (e.g., rectangles, triangles, etc.) and/or dimension size, and/or one or more of the geometric areas 1204 may be different from each other. In FIG. 12, a center of each of the geometric areas 1204 coincides with a center of a respective one of the tiles 132 to ensure that the near-field measurement region 1202 becomes uniformly paved and/or otherwise represented by a plurality of the geometric areas 1204.

In the illustrated example of FIG. 12, the fallout controller 100 calculates a total near-field fallout volume by calculating a fallout volume for each of the tiles 132 (indexed with j) and corresponding geometric areas 1204 as described below in the example of Equation (5):

$$V_{near-field} = \sum_{j} \sigma_j(x; y) \cdot S_{square\,j} \quad \text{Equation (5)}$$

In the example of Equation (5) above, the term $V_{near-field}$ represents the total near-field fallout volume of the near-field measurement region 1202. In Equation (5), the term $S_{square\,j}$ represents a surface area corresponding to each one of the geometric areas 1204, associated with tile with index j. In the example of FIG. 12, the surface area of the geometric areas 1204 is four square meters. In the example of Equation (5) above, the term $\sigma_j(x; y)$ represents a fallout surface density of the hydrocarbon fallout droplets, calculated according to the example of Equation (4) above based on the processed image 1100 of fallout disposed on the tile with index j and coordinates (x; y).

Figure 13:
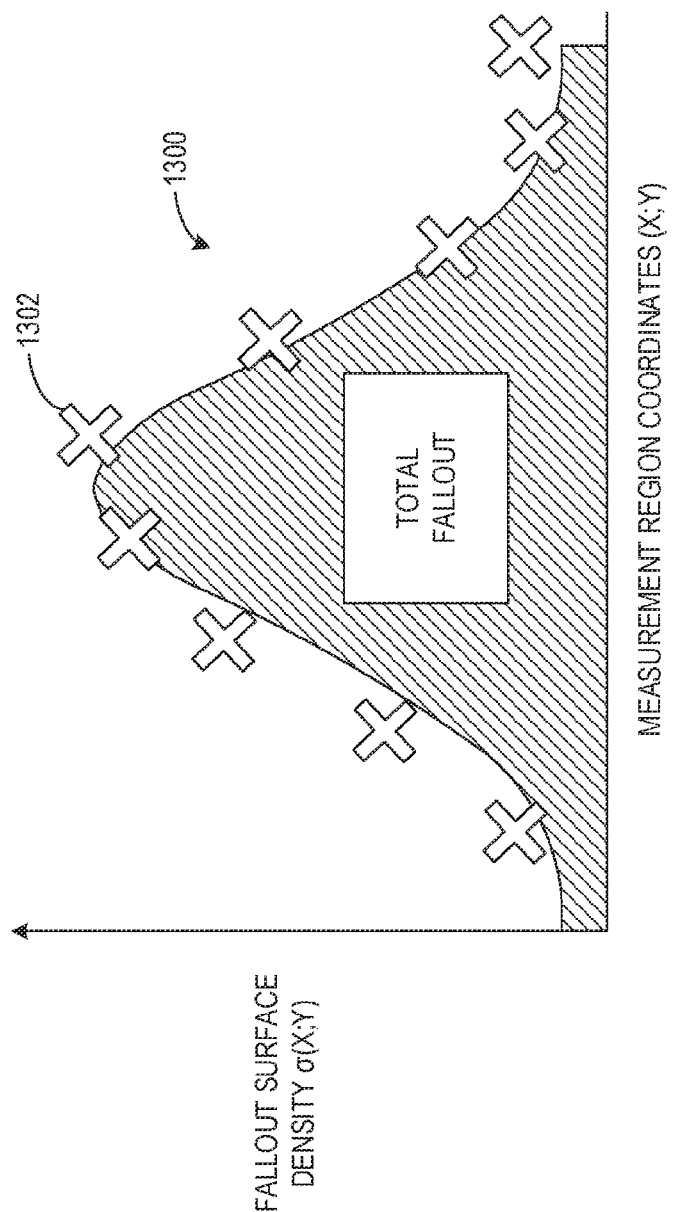
FIG. 13 depicts an example bell-shaped peak function generated by the example fallout controller of FIGS. 1 and/or 9 to calculate an example total far-field fallout volume.

FIG. 13 depicts an example bell-shaped peak function 1300 generated by the fallout controller 100 of FIGS. 1-3, 7, 8A-8B, and 9 to calculate a total far-field fallout volume. In some examples, the bell-shaped peak function 1300 can be used to calculate a total near-field fallout volume. For example, the fallout controller 100 can approximate and/or otherwise determine the total near-field fallout value based on an actual fallout distribution of the tiles 132, which can be defined by combustion conditions. In such examples, the combustion conditions can be an operation mode of the flare burner 102 of FIGS. 1-7 and 9, a wind direction, parameter(s) of the test fluid source 114, parameter(s) of the hydrocarbon source 116, etc., and/or a combination thereof. Advantageously, in some such examples, the fallout controller 100 can determine the total far-field fallout volume and the total near-field fallout volume using a two-dimensional (2D) Lognormal-Gaussian distribution.

Figure 14:
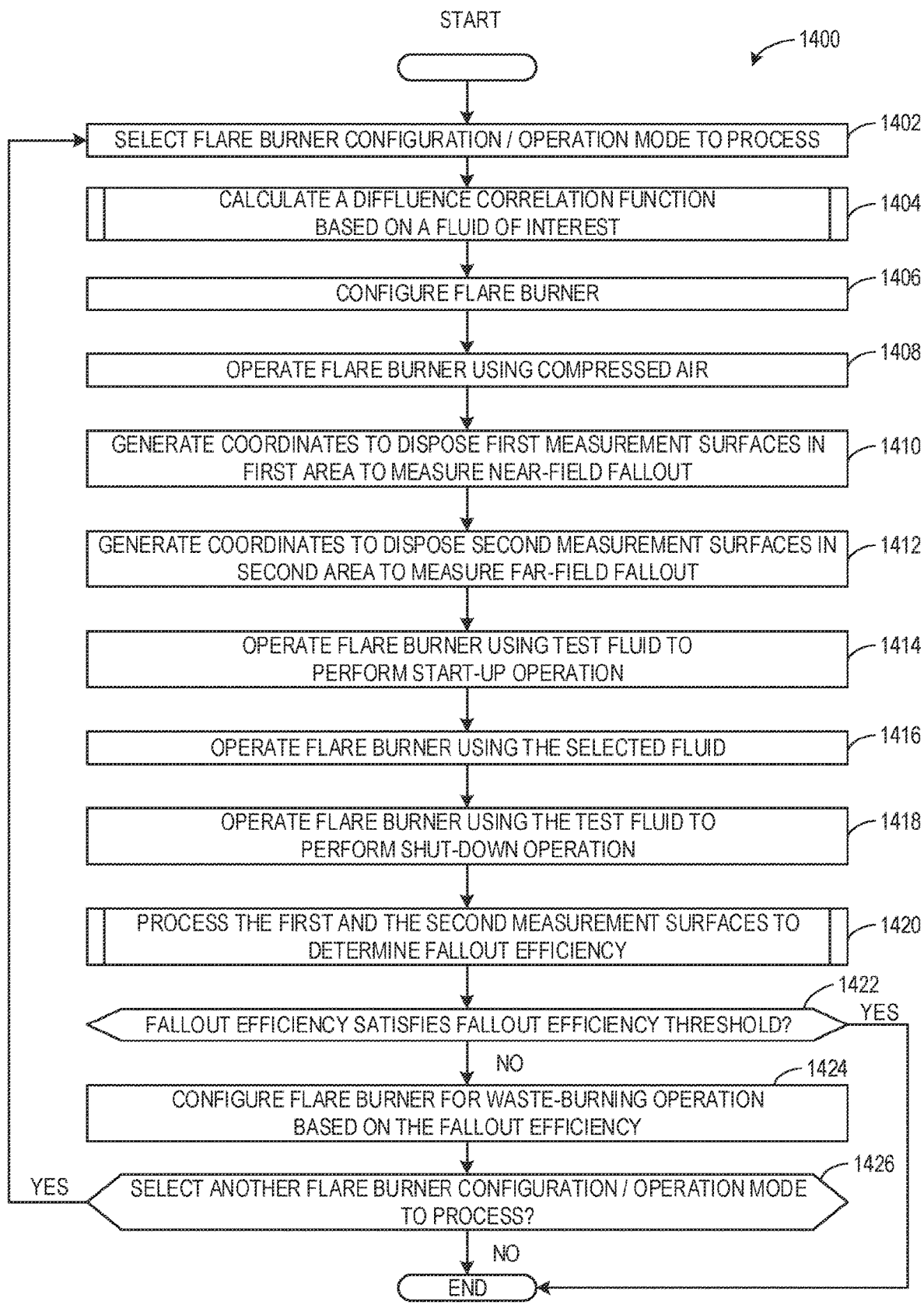
FIG. 14 is a flowchart representative of example machine readable instructions that may be executed to implement the example fallout controller of FIGS. 1 and/or 9 to configure the example flare burner of FIG. 1 for an example waste-burning operation based on fallout efficiency.

In the illustrated example of FIG. 14, the bell-shaped peak function 1300 is a 2D-peak function (e.g., a two-dimensional peak function, a 2D-Gaussian function, a 2D Lognormal-Gaussian distribution, etc.). Alternatively, the bell-shaped peak function 1300 may be any other type of 2D single or multiple-peak function. In FIG. 13, the fallout controller 100 uses the 2D-peak function 1300 as an approximation function for the fallout surface density ($\sigma(x; y)$) for each set of coordinates (x; y) of the far-field measurement region 130 of FIG. 1, the second far-field measurement region 704 of FIG. 7, etc. In FIG. 13, the fallout controller 100 can generate the 2D-peak function 1300 by fitting a 2D-Gaussian function to the measured distribution of fallout data on the measurement surfaces using one or more parameters. For example, the fallout controller 100 can fit the fallout data using six parameters associated with the fallout data including amplitude, mean coordinates ($x_0$, $y_0$), longitudinal dispersion (typically along wind), lateral dispersion (across wind), and angle-to-grid axis (e.g., an average wind direction angle). Alternatively, any other set of parameters may be used for the bell-shaped peak function 1300.

In the illustrated example of FIG. 13, the fallout controller 100 maps fallout data associated with the paper sheets 136 of FIG. 1, or any other measurement surfaces, are to the 2D-peak function 1300. In FIG. 13, fallout data associated with nine of the paper sheets 136, or nine of any other type of measurement surface, are depicted as being mapped to the 2D-peak function 1300 using "X" symbols 1302. Alternatively, fewer or more than nine of the data points of paper sheets 136 (or other measurement surfaces) may be fitted to the 2D-peak function 1300.

In the illustrated example of FIG. 13, the fallout controller 100 utilizes the 2D-peak function 1300 to determine a fallout surface density at any point in the far-field measurement regions 130, 704, at any point outside the far-field measurement regions 130, 704 including a region between a respective one of the far-field measurement regions 130, 704 and a respective one of the near-field measurement regions 128, 702. For example, the fallout controller 100 can determine a fallout surface density at any point on the first longitudinal side 722, the second longitudinal side 724, the longitudinal midline 726, etc., of FIG. 7.

In the illustrated example of FIG. 13, the fallout controller 100 determines the total far-field (remote) fallout volume by evaluating an integral over the 2D-peak function 1300. The integral spans a respective one of the far-field measurement regions 130, 704 (and beyond it as the whole area where the function is at a level above zero) as described below in the example of Equation (6):

$$V_{far-field} = \iint_{far-field} \sigma(x;y) \cdot dx \cdot dy \quad \text{Equation (6)}$$

In the example of Equation (6) above, the fallout controller 100 can determine the total far-field fallout volume ($V_{far-field}$) by calculating the 2D-integral using a fallout surface density spanning a respective one of the far-field measurement regions 130, 704.

In some examples, the fallout controller 100 calculates the total fallout volume ($V_{FO_{total}}$) of the measurement environment 104 of FIG. 1, the second measurement environment 700 of FIG. 7, etc., including a total near-field fallout volume ($V_{near-field}$) associated with a respective one of the near-field measurement regions 128, 702 and a total far-field fallout volume ($V_{far-field}$) associated with a respective one of the far-field measurement regions 130, 704 as described below in the example of Equation (7):

$$V_{FO_{total}} = V_{near-field} + V_{far-field} \quad \text{Equation (7)}$$

In response to calculating the total fallout volume, the fallout controller 100 can calculate the fallout efficiency as described below in the example of Equation (8):

$$\eta_{FO} = \left(1 - \frac{V_{FO_{total}}}{Q_{fluid} * T}\right) * 100\% \quad \text{Equation (8)}$$

In the example of Equation (8) above, the term $\eta_{FO}$ represents the fallout efficiency (expressed in percent), the term $V_{FO_{total}}$ represents the total fallout volume, the term $Q_{fluid}$ represents a fluid volumetric flowrate, and the term T represents flaring operation time. The fluid volumetric flowrate can represent a flowrate of the hydrocarbon source 116 of FIGS. 1-3 during a continuous mode operation of the flare burner 102 of FIGS. 1-7 and 9. In operation, the fallout controller 100 calculates the fallout efficiency based on a ratio of the total fallout volume and a quantity of fluid from the hydrocarbon source 116 for a period of time (e.g., for a duration of a continuous mode operation, for a duration of a test operation, etc., of the flare burner 102).

Flowcharts representative of example hardware logic, machine readable instructions, hardware implemented state machines, and/or any combination thereof for implementing the example fallout controller of FIGS. 1-3, 7, 8A-8B, and 9 are shown in FIGS. 14-17. The machine readable instructions may be one or more executable programs or portion(s) of an executable program for execution by a computer processor such as the processor 1812 shown in the example processor platform 1800 discussed below in connection with FIG. 18. The program may be embodied in software stored on a non-transitory computer readable storage medium such as a CD-ROM, a floppy disk, a hard drive, a DVD, a Blu-ray disk, or a memory associated with the processor 1812, but the entire program and/or parts thereof could alternatively be executed by a device other than the processor 1812 and/or embodied in firmware or dedicated hardware. Further, although the example program is described with reference to the flowcharts illustrated in FIGS. 14-17, many other methods of implementing the example fallout controller 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 14-17 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 14 is a flowchart representative of example machine readable instructions 1400 that can be executed to implement the fallout controller 100 of FIGS. 1-3, 7, 8A-8B, and 9 to configure the flare burner 102 of FIGS. 1-7 and 9 to perform a waste-burning operation. The machine readable instructions 1400 of FIG. 14 begin at block 1402, at which the fallout controller 100 selects a flare burner configuration/operation mode to process. For example, the burner configurator 970 (FIG. 9) can select a start-up operation, a shut-down operation, a waste-burning operation, etc., of the flare burner 102 to execute.

At block 1404, the fallout controller 100 calculates a diffluence correlation function based on a fluid of interest. For example, the calibrator 940 can calculate a diffluence correlation function for the hydrocarbon source 116 of FIGS. 1-3. In such examples, the calibrator 940 (FIG. 9) can output a droplet volume of fluid droplets from the hydrocarbon source 116 as a function of spot size of the fluid droplets. An example process that can be used to implement block 1404 is described below in connection with FIG. 15.

At block 1406, the fallout controller 100 configures a flare burner. For example, the burner configurator 970 can configure a parameter or operating condition of the flare burner 102.

At block 1408, the fallout controller 100 operates the flare burner using compressed air. For example, the burner configurator 970 can operate the flare burner 102 using pressurized air from the pressurized air source 110 of FIG. 1 to flush fluid from the flare burner 102.

At block 1410, the fallout controller 100 generates coordinates to dispose first measurement surfaces in a first area to measure near-field fallout. For example, the data collector 920 (FIG. 9) can generate coordinates (x; y) of the tiles 132 to cause a disposition of the tiles 132 in the near-field measurement region 128 of FIGS. 1 and 4-6, the second near-field measurement region 702 of FIG. 7, etc. In such examples, a technician or operator can install the tiles 132 at the coordinates generated by the data collector 920 in the near-field measurement region 128. For example, the data collector 920 can generate coordinates D;7 for a first one of the tiles 132 in FIG. 7 and an operator can install the first one of the tiles 132 at the coordinates D;7 in the near-field measurement region 702 of FIG. 7. In other examples, the technician or operator can install ones of the fallout collection devices 404 including ones of the tiles 132 at the coordinates generated by the data collector 920 in the second near-field measurement region 702.

At block 1412, the fallout controller 100 generates coordinates to dispose second measurement surfaces in a second area to measure far-field fallout. For example, the data collector 920 can generate coordinates (i;j) of the paper sheets 136 to cause a disposition of the paper sheets 136 in the far-field measurement region 130 of FIGS. 1 and 4-6, the second far-field measurement region 704 of FIG. 7. For example, a technician or operator can install the paper sheets 136 at the coordinates generated by the data collector 920 in the far-field measurement region 130. In other examples, the technician or operator can install ones of the fallout collection devices 404 including ones of the paper sheets 136 at the coordinates generated by the data collector 920 in the second far-field measurement region 704.

At block 1414, the fallout controller 100 operates the flare burner using test fluid to perform a start-up operation. For example, the burner configurator 970 can direct the flare burner 102 to operate using fluid from the test fluid source 114 of FIGS. 1-3 to initialize the flame plume 124 of FIG. 1. In such examples, the burner configurator 970 can control one(s) of the first control valve 202, the second control valve 204, and/or the pump 208 of FIG. 2 to invoke the flare burner 102 to operate using fluid from the test fluid source 114. In other examples, the device configurator 910 (FIG. 9) can direct the fallout collection devices 404 in respective one(s) of the near-field measurement regions 128, 702 to move to the closed position to prevent fallout droplets from being deposited on the tiles 132 and/or the paper sheets 136 during the start-up operation.

At block 1416, the fallout controller 100 operates the flare burner using the selected fluid. For example, the burner configurator 970 can instruct the flare burner 102 to operate by burning fluid from the hydrocarbon source 116 of FIGS. 1-3. In such examples, the burner configurator 970 can control one(s) of the first control valve 202, the second control valve 204, and/or the pump 208 of FIG. 2 to invoke the flare burner 102 to operate using fluid from the hydrocarbon source 116. In other examples, the device configurator 910 can instruct the fallout collection devices 404 in respective one(s) of the near-field measurement regions 128, 702 to move from the closed position to the open position to expose the tiles 132 and/or the paper sheets 136 to the fallout droplets.

At block 1418, the fallout controller 100 operates the flare burner using the test fluid to perform a shut-down operation. For example, the burner configurator 970 can direct the flare burner 102 to operate using fluid from the test fluid source 114 while extinguishing the flame plume 124. In such examples, the burner configurator 970 can control one(s) of the first control valve 202, the second control valve 204, and/or the pump 208 of FIG. 2 to invoke the flare burner 102 to operate using fluid from the test fluid source 114. In other examples, the device configurator 910 can direct the fallout collection devices 404 in respective one(s) of the near-field measurement regions 128, 702 to move from the open position to the closed position to prevent fallout droplets from being deposited on the tiles 132 and/or the paper sheets 136 during the shut-down operation.

At block 1420, the fallout controller 100 processes the first and the second measurement surfaces to determine fallout efficiency. For example, the parameter calculator 950 (FIG. 9) can calculate a fallout efficiency based on the total near-field fallout volume, the total far-field fallout volume, and a quantity of fluid processed by the flare burner 102. An example process that can be used to implement block 1420 is described below in connection with FIG. 16.

At block 1422, the fallout controller 100 determines whether the fallout efficiency satisfies a fallout efficiency threshold. For example, the parameter calculator 950 can compare the fallout efficiency to the fallout efficiency threshold and determine that the fallout efficiency satisfies the fallout efficiency threshold based on the comparison. For example, the parameter calculator 950 can determine that the configuration of the flare burner 102 generates less fallout than a fallout tolerance level required for a waste-burning operation.

If, at block 1422, the fallout controller 100 determines that the fallout efficiency satisfies the fallout efficiency threshold, the machine readable instructions 1400 conclude. If, at block 1422, the fallout controller 100 determines that the fallout efficiency does not satisfy the fallout efficiency threshold, then, at block 1424, the fallout controller 100 configures the flare burner for a waste-burning operation based on the fallout efficiency. For example, the report generator 960 (FIG. 9) can generate a recommendation to adjust a parameter of the flare burner 102 to increase the fallout efficiency for a waste-burning operation of fluid from an exploration oil well. For example, the burner configurator 970 can adjust the flare burner 102 based on the recommendation prepared by the report generator 960. In such examples, the burner configurator 970 can adjust an inclination angle of the flare burner 102 based on the recommendation.

In response to configuring the flare burner at block 1424, the fallout controller 100 determines whether to select another flare burner configuration/operation mode to process at block 1426. For example, the data collector 920 can determine to select another flare burner configuration and/or operation mode of the flare burner 102 to process. If, at block 1426, the fallout controller 100 determines to select another flare burner configuration/operation mode to process, control returns to block 1402 to select another flare burner configuration/operation mode to process. If, at block 1426, the fallout controller 100 determines not to select another flare burner configuration/operation mode to process, the example machine readable instructions 1400 of FIG. 14 conclude.

Figure 15:
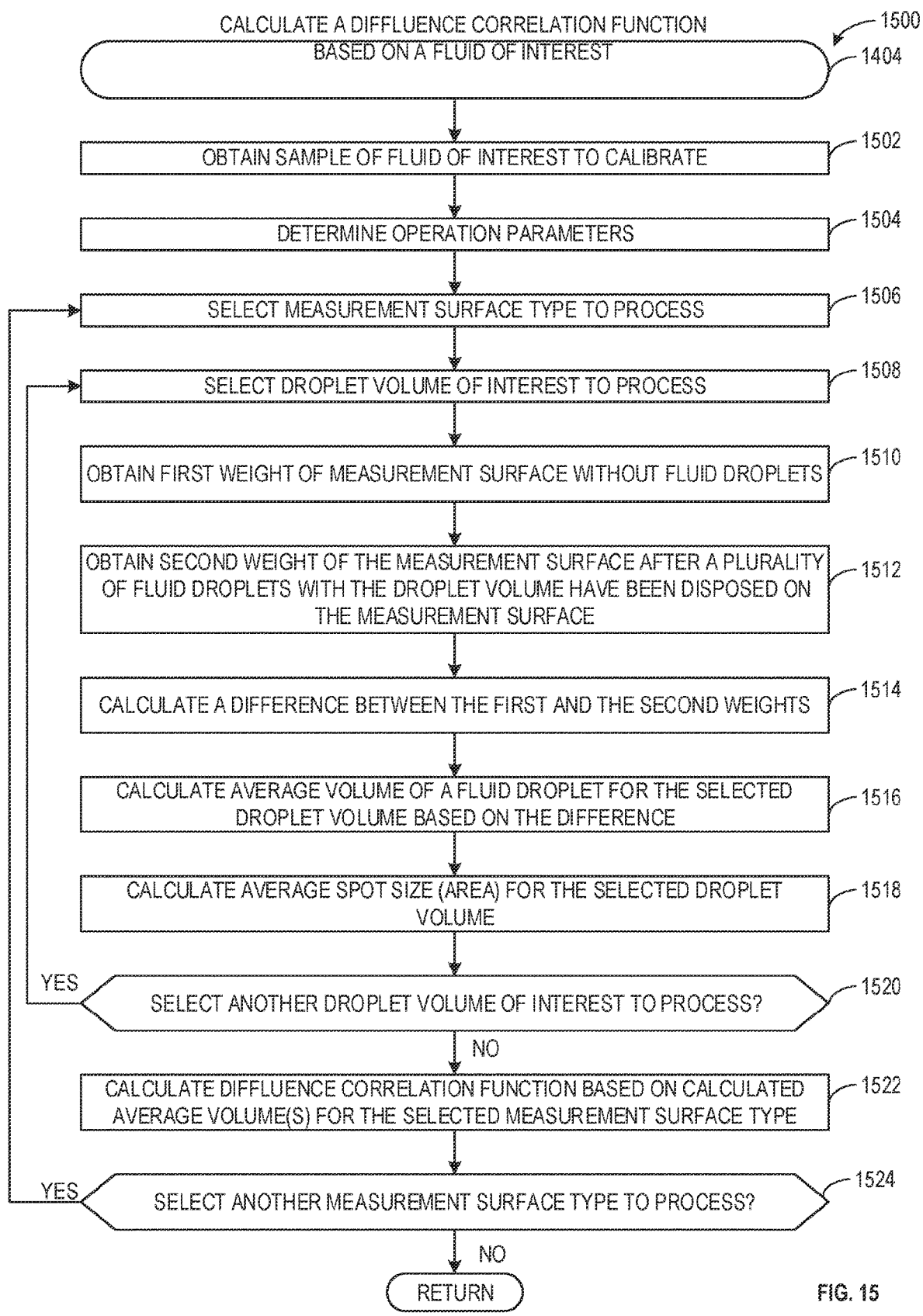
FIG. 15 is a flowchart representative of example machine readable instructions that may be executed to implement the example fallout controller of FIGS. 1 and/or 9 to calculate an example diffluence correlation function based on an example fluid of interest.

FIG. 15 is a flowchart representative of example machine readable instructions 1500 that can be executed to implement the fallout controller 100 of FIGS. 1-3, 7, 8A-8B, and 9 to calculate a diffluence correlation function based on a fluid of interest. The machine readable instructions 1500 can be used to implement block 1404 of the machine readable instructions 1400 of FIG. 14. The machine readable instructions 1500 begin at block 1502, at which the fallout controller 100 obtains a sample of a fluid of interest to calibrate. For example, the data collector 920 (FIG. 9) can obtain a quantity of fluid from the hydrocarbon source 116 of FIGS. 1-3 to process.

At block 1504, the fallout controller 100 determines operation parameters. For example, the data collector 920 can obtain data such as an ambient temperature during the test operation, a density of the sample fluid, a viscosity of the sample fluid, etc.

At block 1506, the fallout controller 100 selects a measurement surface type to process. For example, the calibrator 940 (FIG. 9) can select one of the tiles 132 of FIG. 1 to process. In other examples, the calibrator 940 can select one of the paper sheets 136 of FIG. 1 to process.

At block 1508, the fallout controller 100 selects a droplet volume of interest to process. For example, the calibrator 940 can select a first droplet volume of interest to process.

At block 1510, the fallout controller 100 obtains a first weight of the measurement surface without fluid droplets. For example, the calibrator 940 can measure one of the tiles 132 without fluid deposits.

At block 1512, the fallout controller 100 obtains a second weight of the measurement surface after a plurality of fluid droplets with the droplet volume have been disposed on the measurement surface. For example, the calibrator 940 can measure the one of the tiles 132 with a plurality of fluid deposits.

At block 1514, the fallout controller 100 calculates a difference between the first and the second weights. For example, the calibrator 940 can calculate a difference between the first weight and the second weight.

At block 1516, the fallout controller 100 calculates an average volume of a fluid droplet for the selected droplet volume based on the difference. For example, the calibrator 940 can determine an average volume of the fluid deposits by calculating a ratio of (1) the weight difference and (2) a quantity of the plurality of fluid droplets on the one of the tiles and a density associated with the fluid droplets. Alternatively, one or more of blocks 1510, 1512, 1514, and/or 1516 may be combined, divided, re-arranged, omitted, eliminated, and/or implemented in any other way in response to using a different calibration method (e.g., use of a chemical-precise syringe).

At block 1518, the fallout controller 100 calculates an average spot size (area) for the selected droplet volume. For example, the image processor 930 (FIG. 9) can calculate the average spot size based on the example of Equation (1) above.

At block 1520, the fallout controller 100 determines whether to select another droplet volume of interest to process. For example, the calibrator 940 can select a second droplet volume of interest to process.

If, at block 1520, the fallout controller 100 determines to select another droplet volume of interest to process, control returns to block 1508 to select another droplet volume of interest to process. If, at block 1520, the fallout controller determines not to select another droplet volume of interest to process, then, at block 1522, the fallout controller 100 calculates a diffluence correlation function based on calculated average volume(s) for the selected measurement surface type. For example, the calibrator 940 can generate a diffluence correlation function for the one of the tiles 132.

At block 1524, the fallout controller 100 determines whether to select another measurement surface type to process. For example, the calibrator 940 can select one of the paper sheets 136 to process. If, at block 1524, the fallout controller 100 determines to select another measurement surface type to process, control returns to block 1506 to select another measurement surface type to process. If, at block 1524, the fallout controller 100 determines not to select another measurement surface type to process, control returns to block 1406 of the machine readable instructions 1400 of FIG. 14 to configure the flare burner.

Figure 16:
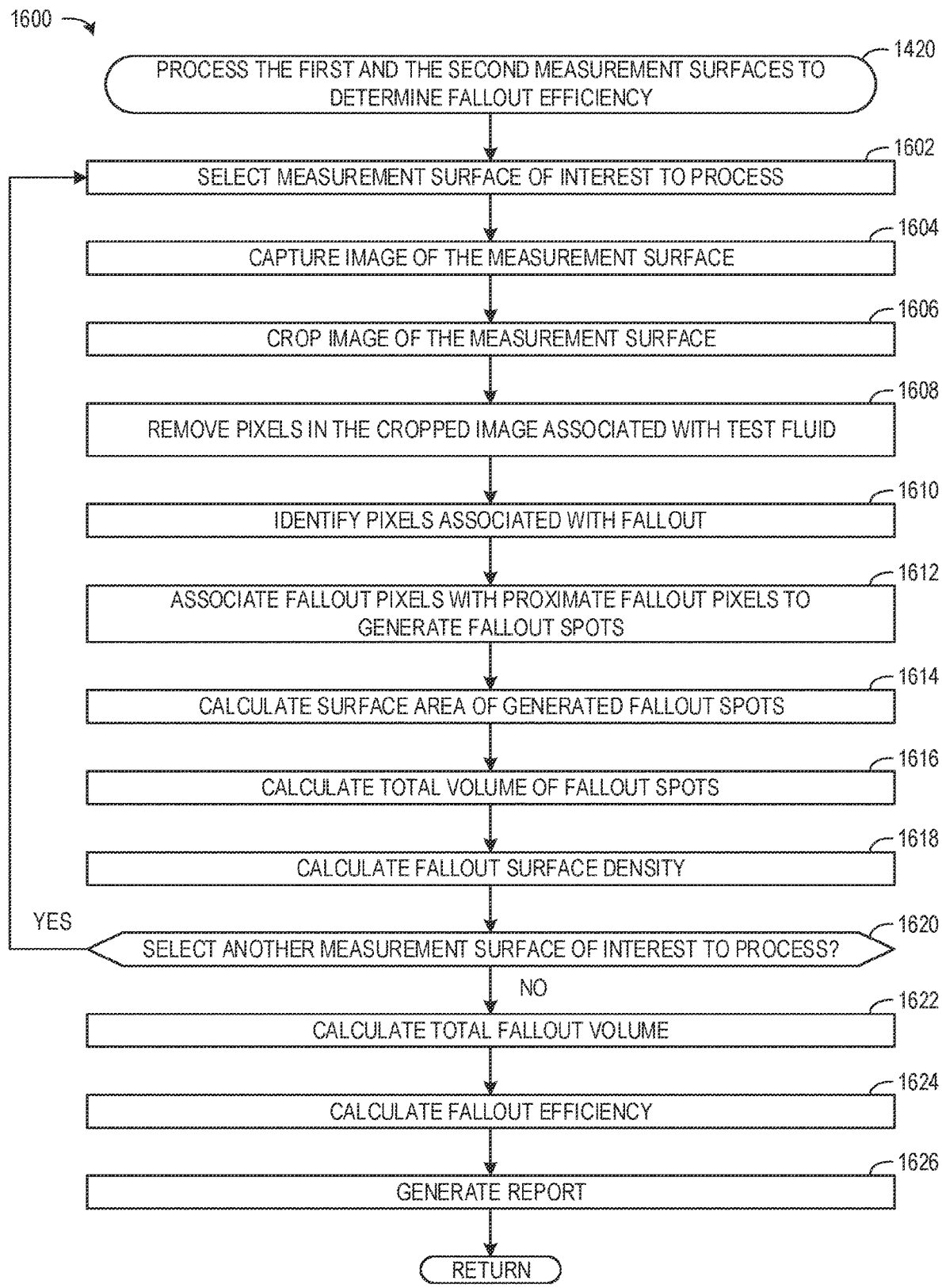
FIG. 16 is a flowchart representative of example machine readable instructions that may be executed to implement the example fallout controller of FIGS. 1 and/or 9 to process first example measurement surfaces and second example measurement surfaces to determine fallout efficiency.

FIG. 16 is a flowchart representative of example machine readable instructions 1600 that can be executed to implement the fallout controller 100 of FIGS. 1-3, 7, 8A-8B, and 9 to process the first and the second measurement surfaces to determine fallout efficiency. The machine readable instructions 1600 can be used to implement block 1420 of the machine readable instructions 1400 of FIG. 14. The machine readable instructions 1600 of FIG. 16 begin at block 1602, at which the fallout controller 100 selects a measurement surface of interest to process. For example, the data collector 920 (FIG. 9) can select one of the tiles 132 of FIG. 1 to process after a test operation of the flare burner 102 of FIGS. 1-7 and 9. In other examples, the data collector 920 can select one of the tiles 132 or one of the paper sheets 136 of FIG. 1 included in one of the fallout collection devices 404 of FIGS. 4-8E to process after the test operation.

At block 1604, the fallout controller 100 captures an image of the measurement surface. For example, the camera 925 (FIG. 9) and/or, more generally, the data collector 920, can capture an image of one of the tiles 132.

At block 1606, the fallout controller 100 crops an image of the measurement surface. For example, the image processor 930 (FIG. 9) can crop the image 1000 of FIG. 10 to generate the processed image 1100 of FIG. 11.

At block 1608, the fallout controller 100 removes pixels in the cropped image associated with the test fluid. For example, the image processor 930 can re-color pixels associated with the test fluid source 114 in the processed image 1100 to a background color of the processed image 1100.

At block 1610, the fallout controller 100 identifies pixels associated with fallout. For example, the image processor 930 can associate pixels included in the processed image 1100 to a black color boundary, a brown color boundary, etc., associated with the hydrocarbon source 116 of FIGS. 1-3.

At block 1612, the fallout controller 100 associates fallout pixels with proximate fallout pixels to generate fallout spots. For example, the image processor 930 can group a first pixel and pixels proximate to the first pixel of the same brown or black color boundary to a spot array to generate a fallout spot. The image processor 930 can create the spot array to include coordinates of each of the associated pixels.

At block 1614, the fallout controller 100 calculates a surface area of generated fallout spots. For example, the parameter calculator 950 (FIG. 9) can calculate a spot area of a fallout spot based on the spot array and calculate a diameter of the fallout spot based on the spot area as described above in Equation (1) for a plurality of fallout spots.

At block 1616, the fallout controller 100 calculates a total volume of fallout spots. For example, the parameter calculator 950 can calculate a total volume of the plurality of fallout spots included in the processed image 1100.

At block 1618, the fallout controller 100 calculates a fallout surface density. For example, the parameter calculator 950 can calculate a fallout surface density based on the total volume of the plurality of the fallout spots included in the processed image 1100.

At block 1620, the fallout controller 100 determines whether to select another measurement surface of interest to process. For example, the fallout controller 100 can select a second one of the tiles 132 of FIG. 1 to process after a test operation of the flare burner 102 of FIGS. 1-7.

If, at block 1620, the fallout controller 100 determines to select another measurement surface of interest to process, control returns to block 1602 to select another measurement surface of interest to process. If, at block 1620, the fallout controller 100 determines not to select another measurement surface of interest to process, then, at block 1622, the fallout controller 100 calculates a total fallout volume. For example, the parameter calculator 950 can calculate a total fallout volume ($V_{FO_{total}}$) of the measurement environment 104 of FIG. 1 including a total near-field fallout volume ($V_{near\text{-}field}$) associated with the near-field measurement region 128 and a total far-field fallout volume ($V_{far\text{-}field}$) associated with the far-field measurement region 130 of FIG. 1. In such examples, the parameter calculator 950 can calculate the total near-field fallout volume as described above in connection with FIG. 12 and calculate the total far-field fallout volume as described above in connection with FIG. 13. In some such examples, the parameter calculator 950 can calculate a first fallout volume (e.g., the total far-field fallout volume) associated with the unburned fallout droplets captured by the first measurement surfaces (e.g., the tiles 132 of FIG. 1) and a second fallout volume (e.g., the total near-field fallout volume) associated with the unburned fallout droplets captured by the second measurement surfaces (e.g., the paper sheets 136 of FIG. 1).

At block 1624, the fallout controller 100 calculates a fallout efficiency. For example, the parameter calculator 950 can calculate a fallout efficiency of the flare burner 102 of FIGS. 1-7 as described above in connection with the example of Equation (8).

At block 1626, the fallout controller 100 generates a report. For example, the report generator 960 (FIG. 9) can generate a report including the fallout efficiency, a recommendation to adjust a parameter of the flare burner 102, etc. For example, the flare burner 102 can be adjusted to improve a fallout efficiency based on a recommendation included in the report generated by the report generator 960. In response to generating the report at block 1626, control returns to block 1422 of the machine readable instructions 1400 of FIG. 14 to determine whether the fallout efficiency satisfies the fallout efficiency threshold.

Figure 17:
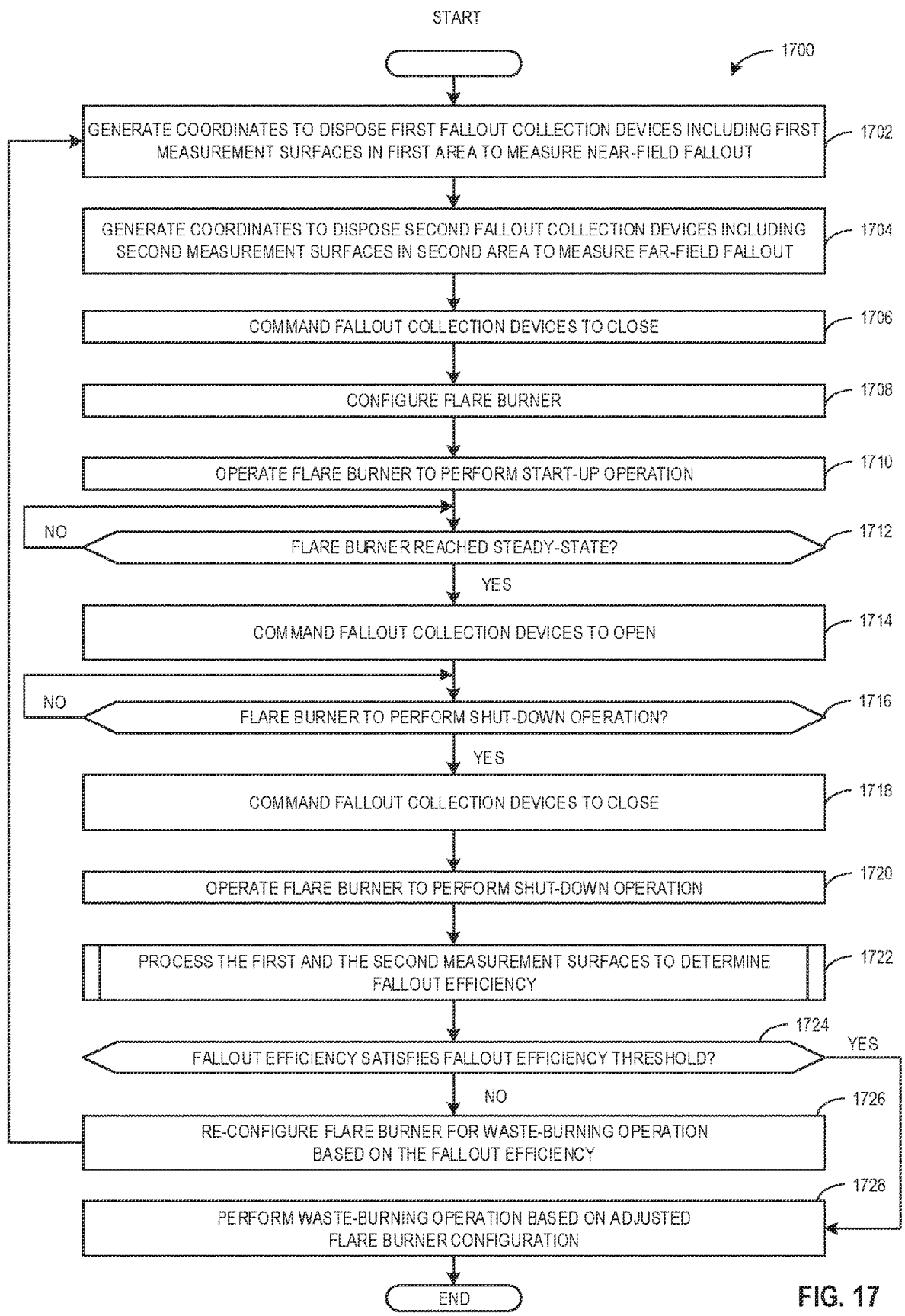
FIG. 17 is a flowchart representative of example machine readable instructions that may be executed to implement the example fallout controller of FIGS. 1 and/or 9 to perform an example waste-burning operation based on an example adjusted flare burner configuration.

FIG. 17 is a flowchart representative of example machine readable instructions 1700 that can be executed to implement the fallout controller 100 of FIGS. 1-3, 7, 8A-8B, and 9 to configure the flare burner 102 of FIGS. 1-7 in coordination with the fallout collection devices 404 of FIGS. 4-8E. The machine readable instructions 1700 of FIG. 17 begin at block 1702, at which the fallout controller 100 generates coordinates to dispose first fallout collection devices in a first area to measure near-field fallout. For example, the data collector 920 (FIG. 9) can generate coordinates along the rays 406 and arcs 408 of the near-field measurement region 128 as depicted in FIG. 4 to cause a disposition of the fallout collection devices 404 in the near-field measurement region 128. In such examples, the technician or operator can install ones of the fallout collection devices 404 including ones of the tiles 132 at the coordinates generated by the data collector 920 in the near-field measurement region 128.

At block 1704, the fallout controller 100 generates coordinates to dispose second fallout collection devices in a second area to measure far-field fallout. For example, the data collector 920 can generate coordinates along the rays 406 and the arcs 408 of the far-field measurement region 130 as depicted in FIG. 4 to cause a disposition of the fallout collection devices 404 in the far-field measurement region 130. In such examples, the technician or operator can install ones of the fallout collection devices 404 including ones of the paper sheets 136 at the coordinates generated by the data collector 920 in the far-field measurement region 130.

At block 1706, the fallout controller 100 commands the fallout collection devices to close. For example, the device configurator 910 (FIG. 9) can query a status of the fallout collection devices 404. In such examples, the device configurator 910 can instruct ones of the fallout collection devices 404 that return a status of open to move to the closed position to prevent fallout droplets from being deposited on the tiles 132 and/or the paper sheets 136 during the start-up operation of the flare burner 102 of FIGS. 1-7.

At block 1708, the fallout controller 100 configures the flare burner. For example, the burner configurator 970 (FIG. 9) can configure a parameter or operating condition of the flare burner 102 of FIGS. 1-7.

At block 1710, the fallout controller 100 operates the flare burner to perform a start-up operation. For example, the burner configurator 970 can direct the flare burner 102 to operate using fluid from the test fluid source 114 of FIGS. 1-3 to initialize the flame plume 124 of FIG. 1. In such examples, the burner configurator 970 can control one(s) of the first control valve 202, the second control valve 204, and/or the pump 208 of FIG. 2 to invoke the flare burner 102 to operate using fluid from the test fluid source 114. In other examples, the burner configurator 970 can direct the flare burner 102 to operate using fluid from the hydrocarbon source 116 of FIGS. 1-3 to initialize the flame plume 124. In such examples, the burner configurator 970 can control one(s) of the first control valve 202, the second control valve 204, and/or the pump 208 of FIG. 2 to invoke the flare burner 102 to operate using fluid from the hydrocarbon source 116 and, thus, isolate the flare burner 102 from the test fluid source 114.

At block 1712, the fallout controller 100 determines whether the flare burner has reached steady-state. For example, the data collector 920 (FIG. 9) can obtain flare burner data from the flare burner 102 and the burner configurator 970 can determine that the flare burner 102 is producing the flame plume 124 in accordance with steady-state (e.g., a steady-state operation) or continuous mode operation based on the flare burner data.

If, at block 1712, the fallout controller 100 determines that the flare burner has not reached steady-state, control waits at block 1712 until the flare burner has reached steady-state. If, at block 1712, the fallout controller 100 determines that the flare burner has reached steady-state, then, at block 1714, the fallout controller 100 commands the fallout collection devices 404 to open. For example, the device configurator 910 can instruct the fallout collection devices 404 in the near-field measurement region 128 and/or the far-field measurement region 130 to move to the open position to expose the tiles 132 and/or the paper sheets 136 to the fallout droplets generated by the flare burner 102.

At block 1716, the fallout controller 100 determines whether the flare burner is to perform a shut-down operation. For example, the burner configurator 970 can determine that a time duration of the flare burner operation has satisfied a time duration threshold. In such examples, the burner configurator 970 can determine that the flare burner 102 is to perform a shut-down operation.

If, at block 1716, the fallout controller 100 determines that the flare burner is not to perform the shut-down operation, control returns to wait at block 1716 until the flare burner is to perform the shut-down operation. If, at block 1716, the fallout controller 100 determines that the flare burner is to perform the shut-down operation, then, at block 1718, the fallout controller 100 commands the fallout collection devices to close. For example, the device configurator 910 can direct the fallout collection devices 404 in the near-field measurement region 128 and/or the far-field measurement region 130 to move from the open position to the closed position to prevent fallout droplets from being deposited on the tiles 132 and/or the paper sheets 136 during the shut-down operation.

At block 1720, the fallout controller 100 operates the flare burner to perform the shut-down operation. For example, the burner configurator 970 can direct the flare burner 102 to operate using fluid from the test fluid source 114 while extinguishing the flame plume 124 after the fallout collection devices 404 have closed. In such examples, the burner configurator 970 can control one(s) of the first control valve 202, the second control valve 204, and/or the pump 208 of FIG. 2 to invoke the flare burner 102 to operate using fluid from the test fluid source 114 and, thus, isolate the flare burner 102 from the hydrocarbon source 116.

At block 1722, the fallout controller 100 processes the first and the second measurement surfaces to determine fallout efficiency. For example, the parameter calculator 950 (FIG. 9) can calculate a fallout efficiency based on the total near-field fallout volume, the total far-field fallout volume, and a quantity of fluid processed by the flare burner 102. An example process that can be used to implement block 1722 is described in connection with the example machine readable instructions 1600 of FIG. 16.

At block 1724, the fallout controller 100 determines whether the fallout efficiency satisfies a fallout efficiency threshold. For example, the parameter calculator 950 can compare the fallout efficiency to the fallout efficiency threshold and determine that the fallout efficiency satisfies the fallout efficiency threshold based on the comparison. In such examples, the parameter calculator 950 can determine that the configuration of the flare burner 102 generates less fallout than a fallout tolerance level required for a waste-burning operation based on the comparison.

If, at block 1724, the fallout controller 100 determines that the fallout efficiency does not satisfy the fallout efficiency threshold, then, at block 1726, the fallout controller 100 re-configures the flare burner for a waste-burning operation based on the fallout efficiency. For example, the report generator 960 (FIG. 9) can generate a recommendation to adjust a parameter of the flare burner 102 to increase the fallout efficiency for a waste-burning operation of fluid from an exploration oil well. In such examples, the burner configurator 970 can adjust the flare burner 102 based on the recommendation prepared by the report generator 960. In response to re-configuring the flare burner at block 1726, control returns to block 1702 to generates coordinates to dispose first fallout collection devices in a first area to measure near-field fallout.

If, at block 1724, the fallout controller 100 determines that the fallout efficiency satisfies the fallout efficiency threshold, control proceeds to block 1728 to perform a waste-burning operation based on the adjusted flare burner configuration. For example, the burner configurator 970 can direct the flare burner 102 to perform a continuous mode operation using the parameter associated with the recommendation prepared by the report generator 960. In response to performing the waste-burning operation based on the adjusted flare burner operation at block 1728, the machine readable instructions 1700 of FIG. 17 conclude.

Figure 18:
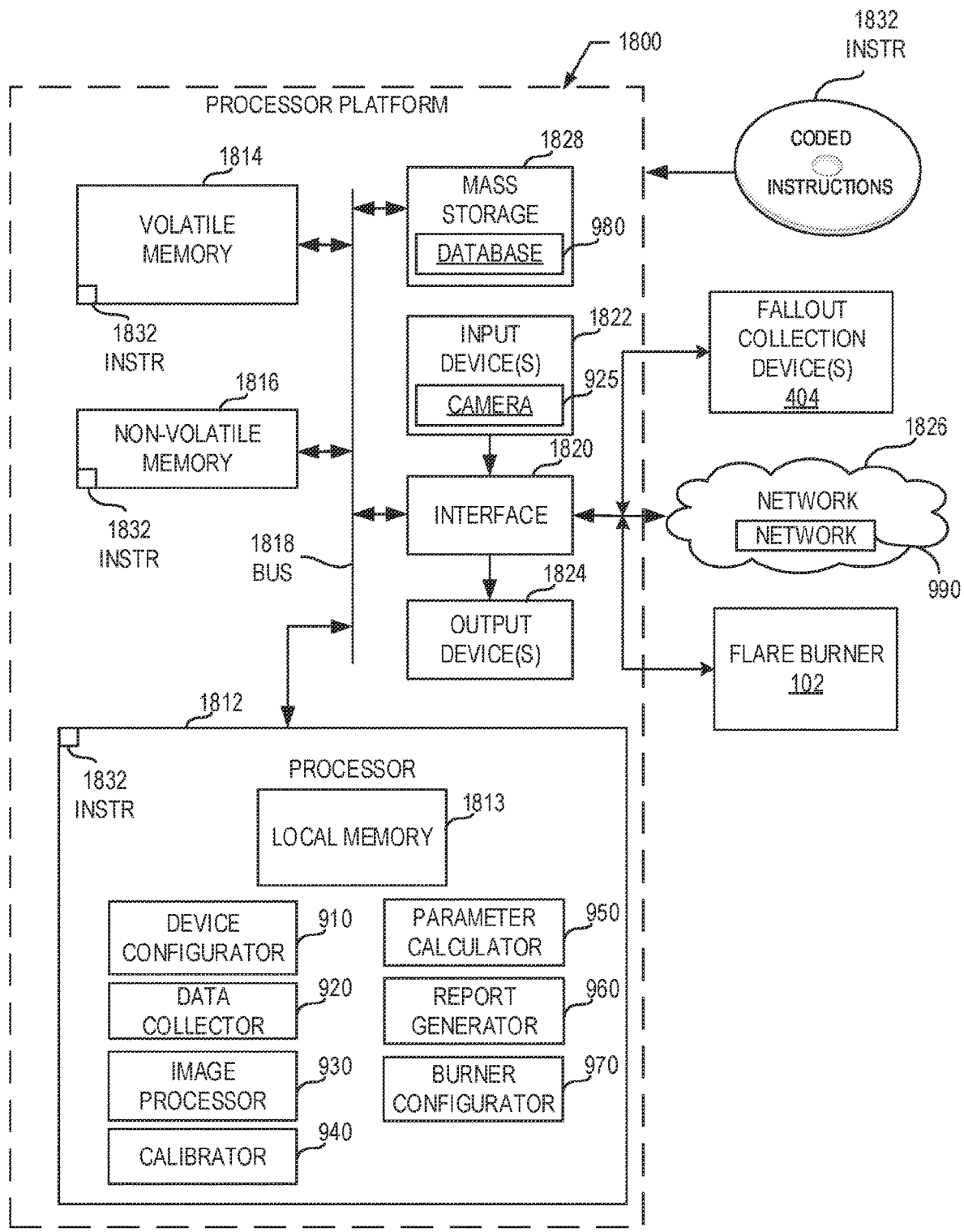
FIG. 18 is a block diagram of an example processing platform structured to execute the instructions of FIGS. 14-17 to implement the example fallout controller of FIGS. 1 and/or 9.

FIG. 18 is a block diagram of an example processor platform 1800 structured to execute the instructions of FIGS. 14-17 to implement the fallout controller 100 of FIGS. 1-3, 7, 8A-8B, and 9. The processor platform 1800 can be, for example, a server, a personal computer, a workstation, a self-learning machine (e.g., a neural network), a mobile device (e.g., a cell phone, a smart phone, a tablet such as an iPad™), a personal digital assistant (PDA), a headset or other wearable device, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1812 implements the device configurator 910, the data collector 920, the image processor 930, the calibrator 940, the parameter calculator 950, the report generator 960, and the burner configurator 970 of FIG. 9.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by SDRAM, DRAM, RDRAM®, and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, and/or a PCI express interface.

In the illustrated example, one or more input devices 1822 are connected to the interface circuit 1820. The input device(s) 1822 permit(s) a user to enter data and/or commands into the processor 1812. The input device(s) 1822 can be implemented by, for example, an audio sensor, a microphone, a camera (still or video), a keyboard, a button, a mouse, a touchscreen, a track-pad, a trackball, an isopoint device, and/or a voice recognition system. In this example, the input device(s) 1822 implement the camera 925 of FIG. 9. Alternatively, the processor 1812 may implement the camera 925 or portion(s) thereof.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 1820 of the illustrated example, thus, typically includes a graphics driver card, a graphics driver chip, and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc. In this example, the network 1826 implements the network 990 of FIG. 9.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and digital versatile disk (DVD) drives. In this example, the one or more mass storage devices 1828 implement the database 980 of FIG. 9.

The machine executable instructions 1832 of FIGS. 14-17 may be stored in the mass storage device 1828, in the volatile memory 1814, in the non-volatile memory 1816, and/or on a removable non-transitory computer readable storage medium such as a CD or DVD.

From the foregoing, it will be appreciated that example systems, methods, apparatus, and articles of manufacture have been disclosed that improve measuring of flare burner fallout. Examples disclosed herein improve measuring of fallout from a flare burner by disposing a plurality of heat-resistant tiles in a measurement region to capture the flare burner fallout. Examples disclosed herein calculate a surface density of fallout droplets for each of the tiles and extrapolates the volume of the fallout droplets to the entire measurement region via approximation procedures as described herein.

Additionally, the example systems, methods, apparatus, and articles of manufacture disclosed herein improve measuring of flare burner fallout from the flare burner by disposing a plurality of paper sheets in a far-field measurement region (e.g., a low heat measurement region) to capture the far-field fallout. By using paper sheets, the far-field measurement region can be quickly altered in response to changes in environment conditions such as the wind direction. The use of paper sheets can prevent information loss compared to tiles as fallout droplets stain the paper sheets and can be stored for long periods of time prior to processing. The above-described examples reduce the number of measurement surfaces previously needed by performing the fallout measurement techniques described herein.

The example systems, methods, apparatus, and articles of manufacture disclosed herein improve the accuracy of measuring continuous flaring operation fallout by preventing fallout measurement surfaces from being exposed to hydrocarbon fallout generated during a transition interval of the flare burner. Examples disclosed herein include using a clean test fluid (e.g., a combustible non-hydrocarbon dissolving fluid that is either colorless or having a color contrasting to the hydrocarbons) for the flare burner start-up and shut-down operations to eliminate the hydrocarbon fallout generated during the transition interval. By reducing and/or otherwise eliminating hydrocarbon fallout deposits on the fallout measurement surfaces that are associated with the transition interval, the examples disclosed herein substantially improve the accuracy of measuring continuous flaring operation hydrocarbon fallout.

The example systems, methods, apparatus, and articles of manufacture disclosed herein improve the fallout efficiency of hydrocarbon flaring operation by eliminating hydrocarbon fallout generated during a transition interval of the flare burner. The example systems, methods, apparatus, and articles of manufacture disclosed herein include using a clean test fluid (e.g., a combustible non-hydrocarbon fluid with high vapor pressure and/or water-dissolvable, such as an alcohol-based fluid (e.g., isopropanol)) for the flare burner start-up and shutdown to eliminate the hydrocarbon fallout generated during the transition interval. By reducing and/or otherwise eliminating hydrocarbon fallout associated with the transition interval, the examples drastically improves the fallout efficiency of hydrocarbon flaring operation.

The example systems, methods, apparatus, and articles of manufacture disclosed herein improve the accuracy of measuring continuous flaring operation fallout by preventing fallout measurement surfaces from being exposed to fallout generated during a transition interval of the flare burner. Examples disclosed herein include actuatable moveable surfaces that can either expose the fallout measurement surface to or isolate the fallout measurement surface from fallout generated during the transition interval. By reducing and/or otherwise eliminating fallout deposits on the fallout measurement surfaces that are associated with the transition interval, the examples drastically improves the accuracy of measuring continuous flaring operation fallout.

Example methods, apparatus, systems, and articles of manufacture to measure flare burner fallout are disclosed herein. Further examples and combinations thereof include the following:

Example 1 includes an apparatus for monitoring unburned fallout droplets from a liquid flare burner, the apparatus comprising a device configurator to invoke a first control valve to isolate the liquid flare burner from a test fluid source, and invoke a second control valve to fluidly couple the liquid flare burner to a hydrocarbon source to generate the unburned fallout droplets, the unburned fallout droplets to be captured by first measurement surfaces in a first measurement region and second measurement surfaces in a second measurement region, a parameter calculator to calculate a first fallout volume associated with the unburned fallout droplets captured by the first measurement surfaces, calculate a second fallout volume associated with unburned fallout droplets captured by the second measurement surfaces, and determine a fallout efficiency of the liquid flare burner based on the first fallout volume and the second fallout volume, and a burner configurator to, in response to the fallout efficiency not satisfying a fallout efficiency threshold, adjust a configuration of the liquid flare burner based on the fallout efficiency.

Example 2 includes the apparatus of example 1, wherein the first measurement surfaces are heat-resistant tiles and the second measurement surfaces are paper sheets.

Example 3 includes the apparatus of example 1, further including a data collector to capture an image of a third measurement surface included in the first measurement surfaces, an image processor to generate a processed image of the third measurement surface based on the image, and identify spots associated with the unburned fallout droplets, and the parameter calculator to calculate a fallout surface density of the third measurement surface based on a first volume of the identified spots and an area of the third measurement surface, determine a second volume of a geometric area including the third measurement surface based on the fallout surface density, and calculate the first fallout volume based on a sum of determined ones of the second volumes for a plurality of the geometric areas.

Example 4 includes the apparatus of example 3, wherein the area is a first area, and the parameter calculator is to calculate the fallout surface density of the third measurement surface by determining a surface area of a first spot of the identified spots, calculating a third volume of the first spot based on the surface area and a diffluence calibration correlation, calculating a fourth volume including a respective volume of the identified spots of the third measurement surface, the fourth volume including the third volume, and determining the fallout surface density based on a ratio of the third volume and a second area of the processed image.

Example 5 includes the apparatus of example 1, further including a data collector to capture an image of a third measurement surface included in the second measurement surfaces, an image processor to generate a first processed image of the third measurement surface based on the image, identify spots associated with the unburned fallout droplets, and generate first fallout data based on the identified spots, and the parameter calculator to generate second fallout data corresponding to a plurality of processed images corresponding to the second measurement surfaces, the plurality of the processed images including the first processed image, fit the second fallout data to a two-dimensional peak function, and integrate the two-dimensional peak function with respect to an entirety of the second measurement region to calculate the second fallout volume.

Example 6 includes the apparatus of example 1, wherein the device configurator is to invoke the second control valve to isolate the liquid flare burner from the hydrocarbon source, and invoke the first control valve to fluidly couple the liquid flare burner to the test fluid source to generate unburned test fluid droplets, the unburned test fluid droplets to be captured by the first measurement surfaces and the second measurement surfaces.

Example 7 includes the apparatus of example 1, wherein the test fluid source is an alcohol-based fluid and the hydrocarbon source is crude oil.

Example 8 includes a method for monitoring unburned fallout droplets from a liquid flare burner, the method comprising invoking a first control valve to isolate the liquid flare burner from a test fluid source, invoking a second control valve to fluidly couple the liquid flare burner to a hydrocarbon source to generate the unburned fallout droplets, the unburned fallout droplets to be captured by first measurement surfaces in a first measurement region and second measurement surfaces in a second measurement region, calculating a first fallout volume associated with the unburned fallout droplets captured by the first measurement surfaces, calculating a second fallout volume associated with unburned fallout droplets captured by the second measurement surfaces, determining a fallout efficiency of the liquid flare burner based on the first fallout volume and the second fallout volume, and in response to the fallout efficiency not satisfying a fallout efficiency threshold, adjusting a configuration of the liquid flare burner based on the fallout efficiency.

Example 9 includes the method of example 8, wherein the first measurement surfaces are heat-resistant tiles and the second measurement surfaces are paper sheets.

Example 10 includes the method of example 8, further including capturing an image of a third measurement surface included in the first measurement surfaces, generating a processed image of the third measurement surface based on the image, identifying spots associated with the unburned fallout droplets, calculating a fallout surface density of the third measurement surface based on a first volume of the identified spots and an area of the third measurement surface, determining a second volume of a geometric area including the third measurement surface based on the fallout surface density, and calculating the first fallout volume based on a sum of determined ones of the second volumes for a plurality of the geometric areas.

Example 11 includes the method of example 10, wherein the area is a first area, and further including determining a surface area of a first spot of the identified spots, calculating a third volume of the first spot based on the surface area and a diffluence calibration correlation, calculating a fourth volume including a respective volume of the identified spots of the third measurement surface, the fourth volume including the third volume, and determining the fallout surface density based on a ratio of the third volume and a second area of the processed image.

Example 12 includes the method of example 8, further including capturing an image of a third measurement surface included in the second measurement surfaces, generating a first processed image of the third measurement surface based on the image, identifying spots associated with the unburned fallout droplets, generating first fallout data based on the identified spots, generating second fallout data corresponding to a plurality of processed images corresponding to the second measurement surfaces, the plurality of the processed images including the first processed image, fitting the second fallout data to a two-dimensional peak function, and integrating the two-dimensional peak function with respect to an entirety of the second region to calculate the second fallout volume.

Example 13 includes the method of example 8, further including invoking the second control valve to isolate the liquid flare burner from the hydrocarbon source, and invoking the first control valve to fluidly couple the liquid flare burner to the test fluid source to generate unburned test fluid droplets, the unburned test fluid droplets to be captured by the first measurement surfaces and the second measurement surfaces.

Example 14 includes the method of example 8, wherein the test fluid source is an alcohol-based fluid and the hydrocarbon source is crude oil.

Example 15 includes a non-transitory computer readable storage medium comprising instructions that, when executed, cause at least one processor to at least invoke a first control valve to isolate a liquid flare burner from a test fluid source, invoke a second control valve to fluidly couple the liquid flare burner to a hydrocarbon source to generate unburned fallout droplets, the unburned fallout droplets to be captured by first measurement surfaces in a first measurement region and second measurement surfaces in a second measurement region, calculate a first fallout volume associated with the unburned fallout droplets captured by the first measurement surfaces, calculate a second fallout volume associated with unburned fallout droplets captured by the second measurement surfaces, determine a fallout efficiency of the liquid flare burner based on the first fallout volume and the second fallout volume, and in response to the fallout efficiency not satisfying a fallout efficiency threshold, adjust a configuration of the liquid flare burner based on the fallout efficiency.

Example 16 includes the non-transitory computer readable storage medium of example 15, wherein the first measurement surfaces are heat-resistant tiles and the second measurement surfaces are paper sheets.

Example 17 includes the non-transitory computer readable storage medium of example 15, wherein the instructions, when executed, cause the at least one processor to capture an image of a third measurement surface included in the first measurement surfaces, generate a processed image of the third measurement surface based on the image, identify spots associated with the unburned fallout droplets, calculate a fallout surface density of the third measurement surface based on a first volume of the identified spots and an area of the third measurement surface, determine a second volume of a geometric area including the third measurement surface based on the fallout surface density, and calculate the first fallout volume based on a sum of determined ones of the second volumes for a plurality of the geometric areas.

Example 18 includes the non-transitory computer readable storage medium of example 17, wherein the area is a first area, and the instructions, when executed, cause the at least one processor to determine a surface area of a first spot of the identified spots, calculate a third volume of the first spot based on the surface area and a diffluence calibration correlation, calculate a fourth volume including a respective volume of the identified spots of the third measurement surface, the fourth volume including the third volume, and determine the fallout surface density based on a ratio of the third volume and a second area of the processed image.

Example 19 includes the non-transitory computer readable storage medium of example 15, wherein the instructions, when executed, cause the at least one processor to capture an image of a third measurement surface included in the second measurement surfaces, generate a first processed image of the third measurement surface based on the image, identify spots associated with the unburned fallout droplets, generate first fallout data based on the identified spots, generate second fallout data corresponding to a plurality of processed images corresponding to the second measurement surfaces, the plurality of the processed images including the first processed image, fit the second fallout data to a two-dimensional peak function, and integrate the two-dimensional peak function with respect to an entirety of the second region to calculate the second fallout volume.

Example 20 includes the non-transitory computer readable storage medium of example 15, wherein the instructions, when executed, cause the at least one processor to invoke the second control valve to isolate the liquid flare burner from the hydrocarbon source, and invoke the first control valve to fluidly couple the liquid flare burner to the test fluid source to generate unburned test fluid droplets, the unburned test fluid droplets to be captured by the first measurement surfaces and the second measurement surfaces.

Example 21 includes the non-transitory computer readable storage medium of example 15, wherein the test fluid source is an alcohol-based fluid and the hydrocarbon source is crude oil.

Example 22 includes an apparatus for monitoring unburned fallout droplets from a liquid flare burner, the apparatus comprising a data collector to generate first coordinates to dispose first fallout collection devices in a first measurement region to measure first fallout from the liquid flare burner, generate second coordinates to dispose second fallout collection devices in a second measurement region to measure second fallout from the liquid flare burner, a device configurator to, in response to the liquid flare burner reaching steady-state operation, direct the first fallout collection devices and the second fallout collection devices to move from a closed position to an open position, a parameter calculator to determine a fallout efficiency of the liquid flare burner based on a first volume of the first fallout and a second volume of the second fallout, and a burner configurator to, in response to the fallout efficiency not satisfying a fallout efficiency threshold, adjust a configuration of the liquid flare burner.

Example 23 includes the apparatus of example 22, wherein the first fallout collection devices include first fallout measurement surfaces and the second fallout collection devices include second fallout measurement surfaces, the first fallout measurement surfaces different from the second fallout measurement surfaces.

Example 24 includes the apparatus of example 23, wherein the first fallout measurement surfaces are heat-resistant tiles and the second fallout measurement surfaces are paper sheets.

Example 25 includes the apparatus of example 22, wherein the device configurator is to direct the first fallout collection devices and the second fallout collection devices to move to the closed position when the flare burner is to perform a start-up operation, and the burner configurator is to direct the liquid flare burner to perform the start-up operation when the first fallout collection devices and the second fallout collection devices are in the closed position.

Example 26 includes the apparatus of example 22, wherein the device configurator is to instruct the first fallout collection devices and the second fallout collection devices to move to the closed position when the liquid flare burner is to perform a shut-down operation and the burner configurator is to instruct the liquid flare burner to perform the shut-down operation when the first fallout collection devices and the second fallout collection devices are in the closed position.

Example 27 includes the apparatus of example 22, wherein the first fallout collection devices and the second fallout collection devices include a housing including a fallout measurement surface, and a slideably moveable surface coupled to the housing, the slideably moveable surface to move from the closed position to the open position to expose the fallout measurement surface to capture the unburned fallout droplets from the liquid flare burner.

Example 28 includes the apparatus of example 22, wherein the device configurator is communicatively coupled to the first fallout collection devices and the second fallout collection devices via a network.

Example 29 includes a method for monitoring unburned fallout droplets from a liquid flare burner, the method comprising generating first coordinates to dispose first fallout collection devices in a first measurement region to measure first fallout from the liquid flare burner, generating second coordinates to dispose second fallout collection devices in a second measurement region to measure second fallout from the liquid flare burner, in response the liquid flare burner reaching steady-state operation, directing the first fallout collection devices and the second fallout collection devices to move from a closed position to an open position, determining a fallout efficiency of the liquid flare burner based on a first volume of the first fallout and a second volume of the second fallout, and in response to the fallout efficiency not satisfying a fallout efficiency threshold, adjusting a configuration of the flare burner.

Example 30 includes the method of example 29, wherein the first fallout collection devices include first fallout measurement surfaces and the second fallout collection devices include second fallout measurement surfaces, the first fallout measurement surfaces different from the second fallout measurement surfaces.

Example 31 includes the method of example 30, wherein the first fallout measurement surfaces are heat-resistant tiles and the second fallout measurement surfaces are paper sheets.

Example 32 includes the method of example 29, further including directing first fallout collection devices and the second fallout collection devices to move to the closed position when the flare burner is to perform a start-up operation, and directing the liquid flare burner to perform the start-up operation when the first fallout collection devices and the second fallout collection devices are in the closed position.

Example 33 includes the method of example 29, further including instructing the first fallout collection devices and the second fallout collection devices to move to the closed position when the liquid flare burner is to perform a shut-down operation, and instructing the liquid flare burner to perform the shut-down operation when the first fallout collection devices and the second fallout collection devices are in the closed position.

Example 34 includes the method of example 29, wherein the first fallout collection devices and the second fallout collection devices include a housing including a fallout measurement surface, and a slideably moveable surface coupled to the housing, and further including moving the slideably moveable surface from the closed position to the open position to expose the fallout measurement surface to capture the unburned fallout droplets from the liquid flare burner.

Example 35 includes the method of example 29, wherein directing the first fallout collection devices and the second fallout collection devices to move from the closed position to the open position includes transmitting one or more commands to the first fallout collection devices and the second fallout collection devices via a network.

Example 36 includes a non-transitory computer readable storage medium comprising instructions that, when executed, cause at least one processor to at least generate first coordinates to dispose first fallout collection devices in a first measurement region to measure first fallout from a liquid flare burner, generate second coordinates to dispose second fallout collection devices in a second measurement region to measure second fallout from the liquid flare burner, in response the liquid flare burner reaching steady-state operation, direct the first fallout collection devices and the second fallout collection devices to move from a closed position to an open position, determine a fallout efficiency of the liquid flare burner based on a first volume of the first fallout and a second volume of the second fallout, and in response to the fallout efficiency not satisfying a fallout efficiency threshold, adjust a configuration of the liquid flare burner.

Example 37 includes the non-transitory computer readable storage medium of example 36, wherein the first fallout collection devices include first fallout measurement surfaces and the second fallout collection devices include second fallout measurement surfaces, the first fallout measurement surfaces different from the second fallout measurement surfaces.

Example 38 includes the non-transitory computer readable storage medium of example 37, wherein the first fallout measurement surfaces are heat-resistant tiles and the second fallout measurement surfaces are paper sheets.

Example 39 includes the non-transitory computer readable storage medium of example 36, wherein the instructions, when executed, cause the at least one processor to direct first fallout collection devices and the second fallout collection devices to move to the closed position when the flare burner is to perform a start-up operation, and direct the liquid flare burner to perform the start-up operation when the first fallout collection devices and the second fallout collection devices are in the closed position.

Example 40 includes the non-transitory computer readable storage medium of example 36, wherein the instructions, when executed, cause the at least one processor to instruct the first fallout collection devices and the second fallout collection devices to move to the closed position when the liquid flare burner is to perform a shut-down operation, and instruct the liquid flare burner to perform the shut-down operation when the first fallout collection devices and the second fallout collection devices are in the closed position.

Example 41 includes the non-transitory computer readable storage medium of example 36, wherein the first fallout collection devices and the second fallout collection devices include a housing including a fallout measurement surface, and a slideably moveable surface coupled to the housing, and the instructions, when executed, cause the at least one processor to move the slideably moveable surface from the closed position to the open position to expose the fallout measurement surface to capture at least one of the first fallout or the second fallout from the liquid flare burner.

Example 42 includes the non-transitory computer readable storage medium of example 36, wherein the at least one processor is communicatively coupled to the first fallout collection devices and the second fallout collection devices via a network.

In the specification and appended claims: the terms "connect," "connection," "connected," "in connection with," and "connecting" are used to mean "in direct connection with" or "in connection with via one or more elements;" and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "upper" and "lower," "upwardly" and "downwardly," "upstream" and "downstream;" "above" and "below;" and other like terms indicating relative positions above or below a given point or element are used in this description to more clearly describe some embodiments of the disclosure.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. An apparatus for monitoring unburned fallout droplets from a liquid flare burner, the apparatus comprising:
  memory storing computer-executable code; and
  at least one hardware processor configured to:
    generate first coordinates to dispose first fallout collection devices in a first measurement region to measure first fallout from the liquid flare burner;
    generate second coordinates to dispose second fallout collection devices in a second measurement region to measure second fallout from the liquid flare burner;
    in response to the liquid flare burner reaching steady-state operation, direct the first fallout collection devices and the second fallout collection devices to move from a closed position to an open position;
    determine a fallout efficiency of the liquid flare burner based on a first volume of the first fallout and a second volume of the second fallout; and
    in response to the fallout efficiency not satisfying a fallout efficiency threshold, adjust a configuration of the liquid flare burner.

2. The apparatus of claim 1, wherein;
  the first fallout collection devices include first fallout measurement surfaces;
  the second fallout collection devices include second fallout measurement surfaces; and
  the first fallout measurement surfaces are different from the second fallout measurement surfaces.

3. The apparatus of claim 2, wherein:
  the first fallout measurement surfaces are heat-resistant tiles; and
  the second fallout measurement surfaces are paper sheets.

4. The apparatus of claim 1, wherein the at least one hardware processor is further configured to:
  direct the first fallout collection devices and the second fallout collection devices to move to the closed position for a start-up operation of the liquid flare burner; and
  direct the liquid flare burner to perform the start-up operation when the first fallout collection devices and the second fallout collection devices are in the closed position.

5. The apparatus of claim 1, wherein the at least one hardware processor is further configured to;
  instruct the first fallout collection devices and the second fallout collection devices to move to the closed position for a shut-down operation of the liquid flare burner; and
  instruct the liquid flare burner to perform the shut-down operation when the first fallout collection devices and the second fallout collection devices are in the closed position.

6. The apparatus of claim 1, wherein the first fallout collection devices and the second fallout collection devices include:
  a housing including a fallout measurement surface; and
  a slideably moveable surface coupled to the housing wherein:
    the slideably moveable surface is configured to move from the closed position to the open position; and
    in the open position, the fallout measurement surface is exposed and captures the unburned fallout droplets from the liquid flare burner.

7. The apparatus of claim 1, wherein the at least one hardware processor is communicatively coupled to the first fallout collection devices and the second fallout collection devices via a network.

8. A method for monitoring unburned fallout droplets from a liquid flare burner, the method comprising:
generating first coordinates to dispose first fallout collection devices in a first measurement region;
disposing the first fallout collection devices in a first measurement region;
measuring first fallout from the liquid flare burner in the first measurement region;
generating second coordinates to dispose second fallout collection devices in a second measurement region;
disposing second fallout collection devices in a second measurement region;
measuring second fallout from the liquid flare burner in the second measurement region;
in response the liquid flare burner reaching steady-state operation, directing the first fallout collection devices and the second fallout collection devices to move from a closed position to an open position;
determining a fallout efficiency of the liquid flare burner based on a first volume of the first fallout and a second volume of the second fallout; and
in response to the fallout efficiency not satisfying a fallout efficiency threshold, adjusting a configuration of the liquid flare burner.

9. The method of claim 8, wherein:
the first fallout collection devices include first fallout measurement surfaces;
the second fallout collection devices include second fallout measurement surfaces; and
the first fallout measurement surfaces are different from the second fallout measurement surfaces.

10. The method of claim 9, wherein;
the first fallout measurement surfaces are heat-resistant tiles; and
the second fallout measurement surfaces are paper sheets.

11. The method of claim 8, further comprising:
directing first fallout collection devices and the second fallout collection devices to move to the closed position for a start-up operation of the liquid flare burner; and
directing the liquid flare burner to perform the start-up operation when the first fallout collection devices and the second fallout collection devices are in the closed position.

12. The method of claim 8, further comprising:
instructing the first fallout collection devices and the second fallout collection devices to move to the closed position for a shut-down operation of the liquid flare burner; and
instructing the liquid flare burner to perform the shut-down operation when the first fallout collection devices and the second fallout collection devices are in the closed position.

13. The method of claim 8, wherein;
the first fallout collection devices and the second fallout collection devices include:
a housing including a fallout measurement surface; and
a slideably moveable surface coupled to the housing;
the method further comprises moving the slideably moveable surface from the closed position to the open position;
in the open position, the fallout measurement surface is exposed; and
the method further comprises capturing the unburned fallout droplets from the liquid flare burner when the fallout measurement surface is exposed.

14. The method of claim 8, wherein directing the first fallout collection devices and the second fallout collection devices to move from the closed position to the open position includes transmitting one or more commands to the first fallout collection devices and the second fallout collection devices via a network.

15. A non-transitory computer readable storage medium comprising instructions that, when executed, cause at least one hardware processor to at least:
generate first coordinates to dispose first fallout collection devices in a first measurement region;
dispose the first fallout collection devices in a first measurement region;
measure first fallout from a liquid flare burner in the first measurement region;
generate second coordinates to dispose second fallout collection devices in a second measurement region;
dispose second fallout collection devices in a second measurement region;
measure second fallout from the liquid flare burner in the second measurement region;
in response the liquid flare burner reaching steady-state operation, direct the first fallout collection devices and the second fallout collection devices to move from a closed position to an open position;
determine a fallout efficiency of the liquid flare burner based on a first volume of the first fallout and a second volume of the second fallout; and
in response to the fallout efficiency not satisfying a fallout efficiency threshold, adjust a configuration of the liquid flare burner.

16. The non-transitory computer readable storage medium of claim 15, wherein:
the first fallout collection devices include first fallout measurement surfaces;
the second fallout collection devices include second fallout measurement surfaces; and
the first fallout measurement surfaces are different from the second fallout measurement surfaces.

17. The non-transitory computer readable storage medium of claim 16, wherein:
the first fallout measurement surfaces are heat-resistant tiles; and
the second fallout measurement surfaces are paper sheets.

18. The non-transitory computer readable storage medium of claim 15, wherein the instructions, when executed, further cause the at least one hardware processor to:
direct first fallout collection devices and the second fallout collection devices to move to the closed position when the liquid flare burner is to perform a start-up operation; and
direct the liquid flare burner to perform the start-up operation when the first fallout collection devices and the second fallout collection devices are in the closed position.

19. The non-transitory computer readable storage medium of claim 15, wherein the instructions, when executed, cause the at least one hardware processor to:
instruct the first fallout collection devices and the second fallout collection devices to move to the closed position for a shut-down operation of the liquid flare burner; and instruct the liquid flare burner to perform the shut-down operation when the first fallout collection devices and the second fallout collection devices are in the closed position.

20. The non-transitory computer readable storage medium of claim 15, wherein:
   the first fallout collection devices and the second fallout collection devices include;
      a housing including a fallout measurement surface; and
      a slideably moveable surface coupled to the housing;
   the instructions, when executed, further cause the at least one hardware processor to move the slideably moveable surface from the closed position to the open position;
   in the open position, the fallout measurement surface is exposed; and
   the instructions, when executed, further cause the at least one hardware processor to capture at least one of the first fallout or the second fallout from the liquid flare burner when the fallout measurement surface is exposed.

21. The non-transitory computer readable storage medium of claim 15, wherein the at least one hardware processor is communicatively coupled to the first fallout collection devices and the second fallout collection devices via a network.

* * * * *